United States Patent
Gupta et al.

(10) Patent No.: US 12,283,127 B2
(45) Date of Patent: Apr. 22, 2025

(54) METHOD FOR OBTAINING DATA FROM AN IMAGE OF AN OBJECT OF A USER THAT HAS A BIOMETRIC CHARACTERISTIC OF THE USER

(71) Applicant: Identy Inc., Dover, DE (US)

(72) Inventors: Hardik Gupta, Jabalpur (IN); Satheesh Murugan, Ramapurum (IN); Saneesh Bhaskaran, Bengaluru (IN)

(73) Assignee: Identy Inc., Dover, DE (US)

( * ) Notice: Subject to any disclaimer, the term of this patent is extended or adjusted under 35 U.S.C. 154(b) by 141 days.

(21) Appl. No.: 17/642,123

(22) PCT Filed: Sep. 10, 2020

(86) PCT No.: PCT/IB2020/058405
§ 371 (c)(1),
(2) Date: Mar. 10, 2022

(87) PCT Pub. No.: WO2021/048777
PCT Pub. Date: Mar. 18, 2021

(65) Prior Publication Data
US 2022/0383663 A1 Dec. 1, 2022

(30) Foreign Application Priority Data

Sep. 12, 2019 (IN) .............................. 201941036800

(51) Int. Cl.
*G06V 40/13* (2022.01)
*G06V 10/25* (2022.01)
(Continued)

(52) U.S. Cl.
CPC .......... *G06V 40/1312* (2022.01); *G06V 10/25* (2022.01); *G06V 10/764* (2022.01);
(Continued)

(58) Field of Classification Search
CPC .......... G06V 40/1312; G06V 40/1365; G06V 40/1388; G06V 40/45; G06V 40/1318;
(Continued)

(56) References Cited

U.S. PATENT DOCUMENTS

| | | | |
|---|---|---|---|
| 8,437,513 B1 * | 5/2013 | Derakhshani | G06F 18/00 382/117 |
| 2008/0025579 A1 | 1/2008 | Sidlauskas et al. | |

(Continued)

OTHER PUBLICATIONS

Yang et al., Learn Convolutional Network for Face Anti-Spoofing, 2014.*

(Continued)

*Primary Examiner* — John B Strege
(74) *Attorney, Agent, or Firm* — Lowenstein Sandler LLP

(57) ABSTRACT

A method includes obtaining, by a processing device from an optical sensor of a mobile device, an image of an object. The method further includes processing, by the processing device, the image to identify the object in the image. Processing the image includes calculating at least one of a distance map or a reflection pattern. Processing the image further includes comparing the calculated distance map or the calculated reflection pattern with a known distance map or a known reflection pattern to determine whether the image contains a spoof or a real object. The method further includes obtaining, by the processing device from the image, data including a biometric characteristic of the user. The method further includes sending, by the processing device to a third party computing device, data including at least the biometric characteristic.

17 Claims, 19 Drawing Sheets

(51) Int. Cl.
  *G06V 10/764* (2022.01)
  *G06V 10/82* (2022.01)
  *G06V 40/12* (2022.01)
  *G06V 40/40* (2022.01)

(52) U.S. Cl.
  CPC .......... *G06V 10/82* (2022.01); *G06V 40/1365* (2022.01); *G06V 40/1388* (2022.01); *G06V 40/45* (2022.01)

(58) Field of Classification Search
  CPC ...... G06V 10/25; G06V 10/764; G06V 10/82; G06V 10/141; G06F 18/24133
  See application file for complete search history.

(56) References Cited

U.S. PATENT DOCUMENTS

| | | | |
|---|---|---|---|
| 2016/0335483 A1 | 11/2016 | Pfursich et al. | |
| 2018/0165508 A1 | 6/2018 | Othman et al. | |
| 2018/0349721 A1* | 12/2018 | Agrawal | G06V 40/45 |
| 2020/0050818 A1* | 2/2020 | He | G06V 40/1394 |
| 2020/0334347 A1* | 10/2020 | Hoyos | H04L 63/0861 |
| 2021/0344675 A1* | 11/2021 | Cui | G06V 40/45 |
| 2022/0383663 A1* | 12/2022 | Gupta | G06V 10/764 |
| 2023/0118532 A1* | 4/2023 | Benderius | G06V 40/171 |
| | | | 382/118 |

OTHER PUBLICATIONS

PCT International Search Report for PCT Application No. PCT/IB2020/058405, mailed Sep. 12, 2020, 3 pages.

Atoum Youself, et al., "Face anti-spoofing using patch and depth-based CNNs", 2017 IEEE International Joint Conference on Biometrics (IJCB), IEEE, Oct. 1, 2017 (Oct. 1, 2017), pp. 319-328, XP033308629, DOI: 10.1109/BTAS.2017.8272713, [retrieved on Jan. 29, 2018], Sections 1-4.

Di Tang et al., "Face Flashing: a Secure Liveness Detection Protocol based on Light Reflections", Arxiv.org, Cornell University Library, 201 Olin Library Cornell University Ithaca, NY 14853, Jan. 6, 2018 (Jan. 6, 2018), XP080850899, Sections I, II and IV.

Canadian Office Action for Application No. 3,152,996, dated Jan. 16, 2024, 5 pages.

* cited by examiner

METHOD FOR OBTAINING DATA FROM AN IMAGE OF AN OBJECT OF A USER THAT HAS A BIOMETRIC CHARACTERISTIC OF THE USER

RELATED APPLICATIONS

This application claims the benefit of International Application No. PCT/IB2020/058405, filed Sep. 10, 2020, which claims priority to Indian Application No. IN201941036800 filed Sep. 12, 2019. The entire contents of both applications are hereby incorporated by reference.

TECHNICAL FIELD

Aspects of the present relate to a method for obtaining data from an image of an object of a user that has a biometric characteristic of the user and a mobile device adapted to execute a corresponding method.

BACKGROUND

Image recognitions in general are widespread and allow for a plurality of applications. For example, recognizing specific persons and faces or objects within images is used by social networks and other media in an excessive manner. Furthermore, in more recent smartphones, also identification technologies are used for identifying user by, for example, fingerprint-sensors.

Previous techniques require a significant amount of computer resources in order to achieve identification of objects within images irrespective of whether they use "brute force" or neural networks that are specifically trained for identifying objects.

More recently, however, the "You Only Look Once" technology was provided that allows for significantly faster yet reliable identification of objects within images. The basic principles of this technology are explained in the papers "You Only Look Once: Unified, Real-Time Object Detection" by Redmon et al. and "YOLO9000: Better, Faster, Stronger" by Redmon et al.

The basic concept of the "You Only Look Once" technology (referred to herein as YOLO technology") is to separate an obtained image into grids and using a trained neural network in order to identify objects within one or more of the grid cells by using a neural network that comprises a plurality of reduction layers and convolutional layers that each process the obtained image.

While the used neural networks obtain appropriate results also while performing real-time detection even for moving images (videos) for a plurality of objects, it turns out that, for other identifications of very specific objects, like fingertips they are not yet properly adapted. This results in a longer time being required to identify the objects.

Additionally, due to the comparably complex neural network, significant computer resources are required in order to allow for real-time identification of objects which, additionally, makes the application of the YOLO technology not suitable for present state mobile devices like smartphones and tablets.

Furthermore, with those techniques it has not been possible so far to implement them in sensitive areas of technology, like user identification for bank accounts.

In view of the above, it would be advantageous to provide methods and systems that allow for identifying users fast and securely while providing significant detection accuracy and, at the same time, simplifying the interaction of the user with the mobile device used obtaining data. Further, it would be advantageous to reduce required computer resources for the identification at the mobile device such that the identification can be implemented in present generation mobile devices.

DETAILED DESCRIPTION

Figure 1:
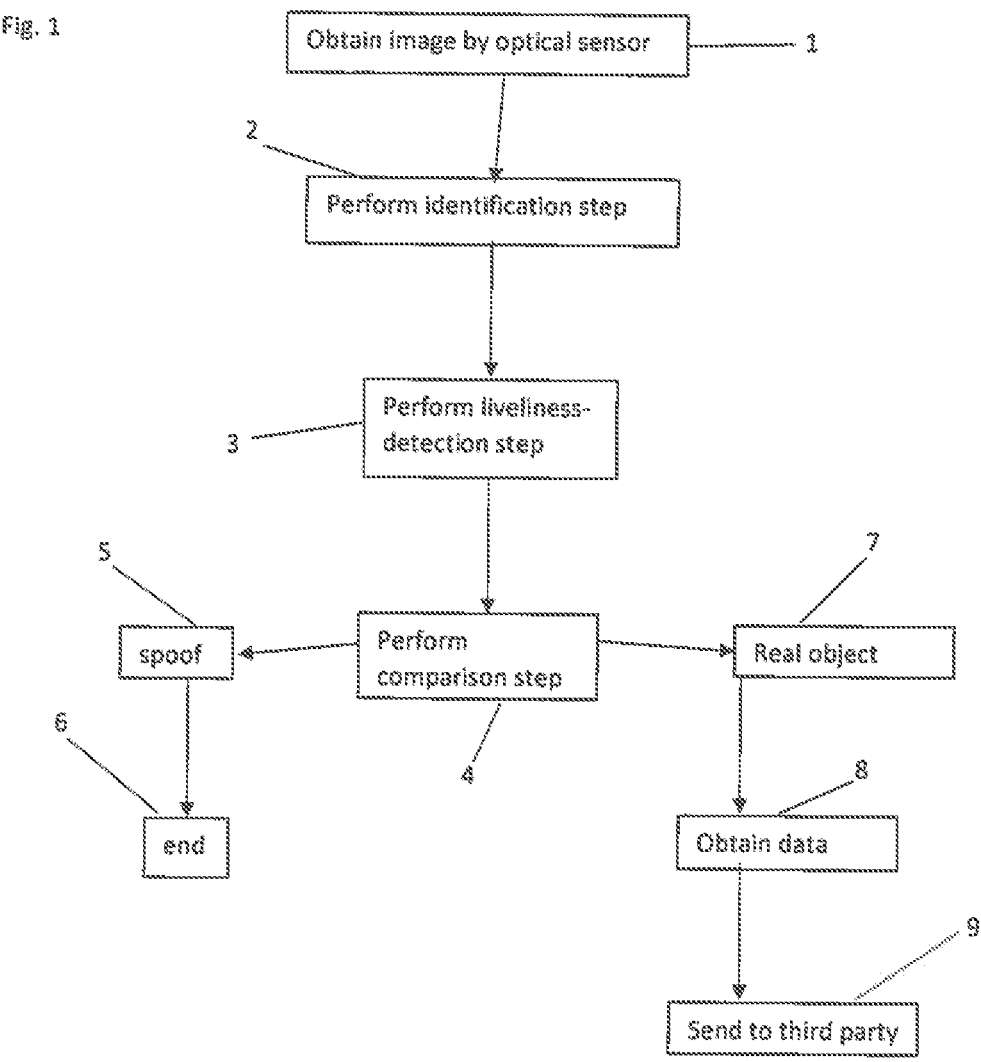
FIG. 1 shows a general overview of the method for obtaining data from an image of an object of a user that has a biometric characteristic of the user, according to some embodiments.

In at least some embodiments, a method is implemented on a mobile computing device.

In some embodiments, a method for obtaining data from an image of an object of a user that has a biometric characteristic of the user, wherein the object of the user includes one or more of a fingerprint or a set of fingerprints (e.g., of fingertips), a palm of the hand of the user, a face of the user, an eye of the user, and a bottom of a foot of the user. The method includes:

on a mobile device, performing the following steps:
obtaining, by an optical sensor of the mobile device, the image of the object wherein the image contains either a spoof or a real object;
processing, in an identification operation of the mobile device, the image to identify one or more of the object in the image or a position of the object in the image;
wherein processing the image further comprises a liveliness-detection operation, comprising calculating at least one of:
a distance map representative of a distance of a plurality of pixels to the optical sensor, the pixels comprising at least a first portion of the object within the image;
a reflection pattern representative of light reflection associated with a plurality of pixels comprising at least a second portion of the object within the image;
and wherein processing the image further comprises a comparison operation comprising comparing at least one of the calculated distance map or the calculated reflection pattern with a known distance map or a known reflection pattern to determine, based on an outcome of the comparison, that the image contains either the spoof or the real object;
obtaining, from the image, after the processing, data comprising at least the biometric characteristic and optionally storing it in a storage device; and
sending, to a third party computing device, data comprising at least the biometric characteristic.

Herein, the storage device on which the data is stored can be any storage on or physically connected with the mobile device, like internal storage or a hard drive connected to the mobile device. The mobile device can be any mobile device commonly used. For example, the mobile device may be a smartphone, a tablet, a laptop or any other corresponding device. In some embodiments, the mobile device has a corresponding storage device.

The third party computing device may, for example, be a server hosted by the government of a country, for example Aadhaar in India or INE in Mexico. The third party computing device may alternatively or in addition be a server hosted by a company or government organization providing identity verification services such as a pension fund entity, immigration office, a bank, a telco, or the like. Also other companies, like a company providing access to streaming services for streaming videos, music, games or the like, can be thought of.

The invention is not limited regarding how the data comprising the biometric characteristic is actually used at the third party computing device. In some embodiments, the third party computing device comparing the biometric characteristic with stored biometric characteristics in order to determine whether or not the biometric characteristic actually identifies the user of the mobile device as the correct user.

In some embodiments, even though it would, in principle, be possible that even the image of the real three-dimensional object constitutes a spoof of an intended object like the real finger of a human being, it is assumed that the three-dimensional object will be the real object. A two-dimensional spoof of the real object can be anything but will usually be an image originally taken from the real object and now being provided (for example, a paper or any other flat surface to the optical sensor which, in turn, takes an image of this image. However, other realizations of a two-dimensional spoof like an (almost two-dimensional flat) model of the real object can also be realized. In any case, in some embodiments, the spoof is not a three-dimensional reproduction of the real object.

The distance map is meant to constitute data structure, like a matrix or a table or other structure, where a given pixel in the original image that was taken by the optical sensor is associated with its estimated or calculated distance to the optical sensor. It is clear that the pixel itself does not have a distance to the optical sensor as the pixel merely is a data structure. What is meant is that the object obtained by taking of the image by the optical sensor originally had a distance to the optical sensor. Therefore, each pixel in the obtained image represents a point in the real world and, therefore, is still associated with a distance of this point in the real world to the optical sensor at the time the image was taken.

The same holds for the reflection pattern representative of light reflection associated with a plurality of pixels constituting at least a portion of the object within the image. Here, it is clear that the pixels themselves do not realize a reflection pattern but the original object (or two-dimensional spoof of the real object) did have a reflection pattern representative of light reflection. This can be calculated based on the image information obtained by the optical sensor. Like for the distance map, the reflection pattern may have the form of a data structure, like a matrix or a two-dimensional table or the like.

In some embodiments, the calculated distance map is compared with a learned distance map or the calculated reflection pattern is compared with a learned reflection pattern. Herein, the learned distance map and the learned reflection pattern correspond to distance maps and reflection patterns that are known to the neutral network to constitute either a distance map of a real object or a distance map of a two-dimensional spoof of the real object or a reflection pattern of a real object or a reflection pattern of a two-dimensional spoof of the real object. The comparison of the calculated distance map or reflection pattern with the learned distance map or reflection pattern may yield a result that can be used to distinguish between a real object and a spoof of the object by, for example, determining that the obtained distance map or reflection pattern is corresponding more likely to a learned distance map or learned reflection pattern that constitute a spoof rather than a real object.

In some embodiments, it is possible to efficiently distinguish between real objects and spoofs of the real objects because neutral networks as used can reliably determine similarities between images taken and learned information (like the learned distance map and the learned reflection pattern) in order to determine specific characteristics associated with the object within the image. Thereby, this method is applicable also in cases where the information in the image with respect to the real object is a security sensitive information like a finger carrying a fingertip that is used for identifying the user, thereby preventing misuse of images taken from such objects.

In one embodiment, a neural network is used in at least one of the identification-operation, the liveliness-detection operation and the comparison operation. Neural networks are specifically advantageous in identifying patterns (like fingerprints) in images even when the pattern is shown under unusual angles, for example when taking an image of a finger without using a mask that presets the orientation of the finger. Thereby, the interaction of the user with the mobile device for obtaining the respective data is simplified.

In a further embodiment, the third party computer processes the data comprising the at least one biometric characteristic and, based on the processing, determines that the biometric characteristic identifies the user. Thereby, access can be easily granted to, for example, services offered by the third party computing device without the user having to, for example, remember a password or the like.

Moreover, the identification operation may include using a neural network and processing the image, in the identification operation, as input by the neural network includes processing, by a first layer of the neural network, the input to create a first intermediate output and processing, by each following layer the output of the preceding layer, wherein the neural network comprises a plurality of layers, each layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit; wherein, by processing the input using the plurality of layers, the neural network obtains, as an output, an identification of the object and the location of the object within the image.

The depthwise convolutional layer uses a multiplication or inner product of the feature map (matrix) corresponding to the original image with a kernel being a matrix in the size of, e.g., 3×3 to calculate a further matrix. Using such layers is more efficient with respect to the identification efficiency. This is specifically because max-pool layers can result in information loss which will in turn require more iterations. In view of this, the depthwise convolutional layers as proposed in the above embodiment are more efficient with respect to their parameter sensitivity than commonly used convolutional layers.

The depthwise convolutional layer and the pointwise convolutional layer may also be referred to as depthwise convolutional sub-layer and pointwise convolutional sub-layer. In fact, they are "layers within a layer" of the neural network, thus constituting sub-layers.

By applying this specific realization of the depthwise convolutional layer, together with the pointwise convolutional layer, the batch normalizer and the rectified linear units as provided in the above embodiment, the computer resources that are required by the neural network for performing real-time identification of objects carrying biometric characteristics like fingertips in images are significantly reduced compared to the presently known neural technology as the known YOLO technology relies on max-pool layers as one of the group of layers within the used neural network.

In a further embodiment, the liveliness-detection operation includes using a neural network and the distance map and the reflection pattern are calculated and compared to the known distance map and the known reflection pattern, thereby determining, based on the outcome of the comparison, that the image contains either the spoof or the real object.

The "known" distance map and the "known" reflection pattern as used herein may be considered, in the context of using neural networks, to be "learned" distance map and "learned" reflection pattern, i.e. they may refer to distance maps and reflection patterns indicating liveliness that have been obtained during training the neural network to actually distinguish, based on such distance maps and reflections patterns, between spoofs and real objects.

The image may be obtained by the optical sensor while using a flash associated with the optical sensor and wherein the optical sensor is a camera. With this, the contrast obtained and, therefore, the liveliness-detection operation can be improved. Using the flash of a camera highlights portions of the area from which the image is obtained, thereby allowing for more reliably calculating a reflection pattern with high accuracy and also allowing for more easily distinguishing between spoofs of the real object and the real object.

In a more specific implementation of this embodiment, neural network comprises a plurality of layers and the last layer comprises two nodes, wherein a first node provides output regarding a real object being determined during the processing and the second node provides an output regarding a spoof being determined during the processing.

In some embodiments, both nodes provide outputs for each image taken regardless of whether it is a real object or a spoof of the real object that is obtained on the image. This output can later on be processed further in order to carry out a probabilistic determination of whether or not the object obtained on the image is either real or a spoof.

More specifically, each node may provide an output upon processing of the image, the output ranging from $-\infty$ to $+\infty$ and the output of each node is passed to an output normalizer, the output normalizer first taking the output $x_i$ of each node and calculates a reduced value $S(x_i)$ by $$S(x) = \frac{e^x}{1+e^x}$$

where i=1 for the first node and i=2 for the second node, and provides the values $S(x_i)$ to a normalization function $$\sigma(S(x_j)) = \frac{e^{S(x_j)}}{\sum_i e^{S(x_i)}}$$

a. thereby to obtain normalized values $\sigma(S(x_1)) \equiv \sigma_1$ and $\sigma(S(x_2)) \equiv \sigma_2$.

With this further processing of the output of the first node and the second node, it is possible to have normalized values calculated based on the first and second node, thereby allowing for a statistical evaluation of this output of the first and second node for judging whether a spoof or a real object is provided within the image.

In this regard, it may be provided that, if $\sigma_1 > 0.5$, it is determined that the image contains the real object and, if $\sigma > 0.5$, it is determined that the image contains the spoof. By using the normalized values of the output of the first and second node, it is possible to reliably distinguish between real object and the spoof.

In one embodiment, obtaining, from the image, after the processing, data comprising at least the biometric characteristic further comprises a cropping operation, the cropping operation including processing the image or the part of the image, including distinguishing a portion of the image or the part of the image comprising the region of interest, ROI, from another portion of the image;

extracting, from the image or the part of the image, the ROI;

storing the portion comprising the ROI in a storage device on the mobile device.

The region of interest is that region of the image of an object that actually carries the biometric characteristic. Even further, in some embodiments, the region of interest is that portion of the image of the object where the biometric characteristic is presented in a manner that allows for reliably identifying the user when using this portion of the image, specifically this portion of the object or this portion of the biometric characteristic. For example, although the whole fingertip carries the fingerprint, taking an image of the fingertip would lead to some part of the fingertip not facing towards the optical sensor and thus being visible on the image with an inclination and, for example, being darker than other portions of the fingerprint. Those "obscured" regions are usually not part of the region of interest because they are actually not suitable to identify the user using these regions.

The neural network, according to some embodiments, is trained and/or otherwise adapted to be able to distinguish, through processing of the image, between those portions of the image that contain the region of interest and other portions of the image that do not contain the region of interest. This can be achieved in variety of ways and is thus not to be understood in a limiting way. That the neural network "distinguishes" that region comprising the ROI from another region is to be understood as the ability of the neural network to provide an output that distinguishes between the ROI and other regions of the image or makes it possible to distinguish between those regions. For example, the output could be an indication of pixels comprising the ROI but not other regions of the ROI. In any case, the outcome of the processing of the image by the neural network at least comprises that a first portion of the image comprising the region of interest is identified as different from another portion of the image. In this regard, it is noted that the specific size, shape of position of the region of interest is found out by the neural network during processing of the image and it is not preset.

In view of this, in some embodiments the method according to embodiments of the invention is intended to be directed to a free-form taking of an image of the object. In some embodiments, the image of the object is not taken using a template or other mask presented to the user defining how the user has to position the object relative to the optical sensor.

The identification means can either be remote to the mobile device with which the image is taken or it can also be included in the mobile device. Additionally, it is noted that the neural network can either be provided on the mobile device or remote to the mobile device which will then comprise that the image, before processing by the neural network, is forwarded from the mobile device to the remote location where the neural network is provided.

It is noted that providing the image or part of the image to the neural network does not only comprise the provision of the image or the part of the image as it was obtained by the optical sensor, meaning that, for example, the original image or half of the image or a specific portion of the image that is most likely to comprise the object having the biometric characteristic is provided to the neural network. Additionally, this step can comprise a pre-processing of the original image by, for example, applying modifications in the brightness or separation of the image into single colour images or the like. The invention is not limited in this regard.

The method, according to some embodiments, allows for obtaining the region of interest for further processing, specifically for determining whether the extracted biometric characteristic identifies the user with high accuracy, thereby significantly reducing the data transfer necessary and also simplifying the processing of the biometric characteristic by the identification means as interfering influence to the identification means from the remainder of the image not carrying the region of interest can be avoided.

In a more specific implementation, sending, to a third party computing device, data comprising at least the biometric characteristic comprises sending the portion comprising the ROI to the third party computing device.

It may be that the cropping operation comprises processing the image or the part of the image by a neural network, wherein processing the image or the part of the image by the neural network comprises processing the image by an encoder to obtain an encoded image and, after that, processing the encoded image by a decoder to obtain a decoded output image.

Furthermore, the image or the part of the image provided to the neural network in the cropping operation for processing may comprise N×M pixels and the encoded image comprises n×m pixels, where n<N,m<M and the decoded output image comprises N×M pixels.

Reducing the number of pixels when encoding the image results in a loss of information. When enlarging the image once again during the decoding, however, the most relevant information to distinguish the ROI from other portions of the image can be more easily discernable as not relevant information or very detailed information that is not necessary for identifying ROI is faded out with this procedure.

In this regard, it can also be provided that distinguishing a portion of the image or the part of the image comprises distinguishing a portion of the decoded output image from another portion of the decoded output image. The distinguishing of the portions in the decoded image can be much easier compared to distinguishing the portion comprising the ROI from another portion of the original image. Thus, the processing power required for distinguishing a portion in the decoded output image from another portion in the decoded output image are reduced significantly compared to processing the original input image.

More specifically, extracting the portion comprising the biometric characteristic can comprise identifying pixel in the decoded output image that are within the distinguished portion and, after that, identifying the pixels in the decoded output image that are in the distinguished portion with corresponding pixels in the original image or the part of the image and extracting, from the original image or the part of the image, the corresponding pixels, the extracted corresponding pixels constituting the portion of the image or the part of the image comprising the biometric characteristic.

Specifically, in the decoded image, each pixel may have a value $x \in \,]-\infty; +\infty[$ and, before the distinguishing of a portion of the decoded image, an activation function $$S(x) = \frac{1}{1+e^{-x}}$$

is applied to each pixel in the decoded image and a normalized value $\bar{x}=S(x)$ is associated with each pixel in the decoded image, wherein the distinguishing is performed on the pixels with the values $\bar{x}$.

Thereby, portions comprising the ROI are even more easily distinguishable from other portions not comprising the ROI, thereby increasing the accuracy with which the ROI is identified in the decoded output image.

In one embodiment, the data comprising at least the biometric characteristic is encrypted on the mobile device to obtain encrypted data and the encrypted data is sent to the third party computing device. Thereby, attacks, like man-in-the-middle attacks can be avoided and the security of the sensitive data (like the fingerprint of a user) can be maintained.

The mobile device according to the invention comprises a processor, storage, data transmission means and an optical sensor, wherein the mobile device is adapted to perform the method according to any of the above embodiments.

In one embodiment, a method for identifying a user using an image of an object of the user that has a biometric characteristic of the user, like a fingerprint or a set of fingerprints of fingertips, is provided, the method comprising:
  obtaining, by an optical sensor of a mobile device, the image of the object;
  providing the image to a neural network;
  processing the image by the neural network, thereby identifying both, the position of the object and the object in the image;
  extracting, from the identified object, the biometric characteristic;
  storing the biometric characteristic in a storage device and/or providing at least the biometric characteristic as input to an identification means, comprising processing the input in order to determine whether the biometric characteristic identifies the user.

In one embodiment the object is at least one fingertip and the biometric characteristic is a fingerprint of the fingertip and wherein processing the input by the identification means comprises extracting, from the fingerprint, a biometric feature, such as for example the location and kind of the minutia, and comparing the extracted biometric feature to a biometric feature stored in a storage device, wherein if a difference between the extracted biometric feature and the stored biometric feature is below a threshold, the identification means determines that the user is identified by the fingerprint and, if the difference between the biometric feature and the stored biometric feature is above a threshold, the identification means determines that the user is not identified by the fingerprint.

The biometric feature can be any feature that allows for a biometric identification of a user or can, at least, aid in identifying the user with the biometric characteristic and potentially other characteristics.

The threshold can be a numeric value that indicates whether and how much the biometric feature taken or obtained using the image corresponds to the biometric feature stored. For example, the threshold can be a real number x, where $0 \leq x \leq 1$. Here, a large x means that the obtained biometric feature and the stored biometric feature are allowed to differ significantly from each other while still allowing for an identification of the user. The smaller x is, the better the obtained biometric feature must correspond to the stored biometric feature in order to obtain an identification.

By setting the threshold to a value as necessary, the security of identification can be increased.

In a more specific realization of this embodiment, the image comprises more than one fingertip and the method further comprises identifying the position of each fingertip in the image and using the fingerprint of each fingertip for identification of the user by the identification means.

By using for example all fingers for identification, the method for identifying the user is less prone to failure as counterfeiting more than one fingerprint requires significant resources and is less likely.

In one implementation of this embodiment, the identification means determines that a user is identified by the fingerprints of the fingertips by determining that a combined identification accuracy of the fingerprints of all fingertips in the image is above a given threshold or the identification means determines that a user is identified by the fingerprints of the fingertips by determining whether, for each fingertip, a difference between a biometric feature of the fingerprint of the fingertip and a stored biometric feature of the fingerprint of the fingertip is below a threshold and determining that the user is identified by the fingerprints of the fingertips only in case all determined differences are below the corresponding threshold.

The combined identification accuracy has to be understood as a combination of the identification accuracies of each biometric feature taken in isolation. This means, for example, that the biometric feature of each fingerprint is evaluated in isolation from the other fingerprints. In the above embodiment, a biometric feature will be considered to correspond to a stored biometric feature, if the difference is below a given threshold. A relative value of correspondence between the obtained biometric feature and the stored biometric feature can represent an identification accuracy. For example, if the obtained biometric characteristic and the stored biometric characteristic of a fingertip match for 99.9%, the identification accuracy can have a value of 0,999. The sum of all identification accuracies can then be taken and, if this is above a threshold that can, for example, depend on the threshold that indicates whether a single biometric feature obtained is considered to correspond to a stored biometric feature, the user is considered to be identified by the biometric features obtained.

In one embodiment, the image is obtained by a camera as optical sensor of the mobile device. This makes the inventive method applicable to current generation mobile devices like smartphones since almost every currently available smartphone has at least one camera.

In one embodiment, processing the image as input by the neural network comprises processing, by a first layer of the neural network, the input to create a first intermediate output and processing, by each following layer the output of the preceding layer, wherein the neural network comprises a plurality of layers, each layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit;
  wherein, by processing the input using the plurality of layers, the neural network obtains, as an output, an identification of the object and the location of the object within the image.

The depthwise convolutional layer uses a multiplication or inner product of the feature map (matrix) corresponding to the original image with a kernel being a matrix in the size of, e.g., 3×3 to calculate a further matrix. Using such layers is more efficient with respect to the identification efficiency. This is specifically because max-pool layers can result in information loss which will in turn require more iterations. In view of this, the depthwise convolutional layers as proposed in the above embodiment are more efficient with respect to their parameter sensitivity than commonly used convolutional layers.

The depthwise convolutional layer and the pointwise convolutional layer may also be referred to as depthwise convolutional sub-layer and pointwise convolutional sub-layer. In fact, they are "layers within a layer" of the neural network, thus constituting sub-layers.

By applying this specific realization of the depthwise convolutional layer, together with the pointwise convolutional layer, the batch normalizer and the rectified linear units as provided in the above embodiment, the computer resources that are required by the neural network for performing real-time identification of objects carrying biometric characteristics like fingertips in images are significantly reduced compared to the presently known neural technology as the known YOLO technology relies on max-pool layers as one of the group of layers within the used neural network.

In one embodiment creating the output comprises separating the image, during the processing, into a grid comprising Q×R grid cells, wherein at least one bounding box is created within each grid cell, the bounding box having a predetermined position within the grid cell and predetermined geometrical characteristics, wherein creating the output further comprises modifying the position and the geometrical characteristics of the bounding box to obtain a resulting bounding box, wherein the resulting bounding box is the bounding box having a resulting position and resulting geometrical characteristics that most closely match the location of the object.

Separating the obtained image into grid cells with predefined bounding boxes allows for properly displaying and providing feedback on objects identified by using the bounding boxes in the final result to mark the location of the object and the object itself.

In a more specific realization of this embodiment, the position of the bounding box is calculated relative to a center of the grid cell in two dimensions and the geometrical characteristics of the bounding box comprise a height and a width of the bounding box, wherein, further, a probability of the object being within the bounding box is associated with each bounding box.

Associating the bounding boxes with corresponding probabilities allows for providing a matrix or vector that represents the bounding box and can be handled by graphical processing units with accurate efficiency when having to combine this with other objects that are represented in the form of a matrix or vector. Thereby, the required computer resources are reduced even further.

More specifically, the output may be a tensor T of dimension Q×R×B×A, where A is the number of different bounding boxes in each grid cell and B is a vector associated with each bounding box having the dimension 5 and being represented as $$B = \begin{pmatrix} x\text{-position of bounding box} \\ y\text{-position of bounding box} \\ \text{width of bounding box} \\ \text{height of bounding box} \\ \text{probability} \end{pmatrix}$$

The resulting tensor can be processed by graphic processing units in a highly efficient manner. Additionally, providing the identification result in the form of such a tensor allows for easily deducing the results having the greatest probability for identifying a specific object.

Moreover, outputting the output may comprise displaying the image and the resulting bounding boxes in each grid cell that have the highest probability among the bounding boxes in the grid cell.

By providing only the grid cells having the highest probability, the user is provided with an identification of the position and the object through the bounding box including the respectively identified object that provides an easily recognizable feedback. Furthermore, the resulting bounding box represents only one vector within the result tensor provided as output in the previous embodiment and can thus be easily extracted by a user or other program and used for further processing by taking only respective coordinates of the resulting bounding box.

Although this way of identifying the position of the fingertip within the image might be less resource consuming than other methods, also other methods may be contemplated. For example, a proposal could initially be made for an area where a fingertip might be present. Those proposals could then be processed further in order to find out whether there indeed is an object like the fingertip present in the proposal for the area or not.

In a further embodiment, processing the image by the neural network comprises creating, from the image, at least one matrix I that represents a color value for each pixel in the image and providing the matrix as input to the neural network, wherein the image comprises N×M pixels and the matrix I is a matrix comprising N×M values, wherein the entries of the matrix I are given by $I_{ij}$, where i and j are integers and i=1 ... N and j=1 ... M.

Such separation of the image into a matrix for each of the color values allows for processing the color values separately, thereby advantageously increasing the identification efficiency while reducing the computer resources required.

More specifically, each depthwise convolutional layer applies a predefined kernel K to the matrix I, the kernel K being a matrix of size S×T where S, T<N; S,T<M comprising entries $S_{ab}$, wherein applying the kernel to the matrix comprises calculating the inner product of the matrix K with each reduced matrix R of size $(N×M)_{S,T}$ of a matrix Z, where the matrix R has the same size as the kernel K, and the matrix Z has size $((N+2P_w)×(M+2P_h))$ and the entries of the matrix $Z_{cd}$ with c,d∈ $\mathbb{N}^+$ are given by $$Z_{cd} = \begin{cases} 0 \,\forall\, c \leq P_w \\ 0 \,\forall\, c > P_w + N \\ 0 \,\forall\, d \leq P_h \\ 0 \,\forall\, d > P_h + M \\ I_{ij} \text{ where } c = i + P_w; d = j + P_h; i = 1 \ldots N; j = 1 \ldots M \end{cases}$$

and provide a matrix P as output, wherein the matrix P has the size $$\left(\frac{N-S+2P_w}{W_w}+1\right) \times \left(\frac{M-T+2P_h}{W_h}+1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer to the first batch normalizer.

The kernel allows for properly weighing information obtained from adjacent pixels in the feature map while not losing any information, thereby increasing the efficiency with which consecutive layers in the neural network can support the identification of the object. For this, the kernel comprises entries that correspond to specific weights or parameters that are obtained prior to receiving the image, i.e. during training of the neural network.

It is a finding of the present invention that, in case this training is performed before the mobile device is actually equipped with an application or other program that can perform the respective method according to the above embodiments, the required computer resources can be advantageously reduced on the mobile device.

While it is a finding of the present invention that it is most advantageous to implement the separable convolution using a depthwise convolutional layer and a pointwise convolutional layer because this combination shows improved performance with respect to the identification and the required computer resources, it can still be contemplated that the depthwise convolutional layer is replaced with a convolutional layer specifically adapted to the identification of fingers or fingertips. Therefore, even though the description of the invention is focused on the use of depthwise convolutional layers, it is also possible to implement the invention using a convolutional layer.

In a further embodiment, the batch normalizer calculates a mean value V from the matrix P by calculating $$V = \frac{\sum_{ij} P_{ij}}{n \cdot m}$$

and creates a batch normalized reduced matrix P' with entries $P'_{ij}=P_{ij}-V$.

By applying this normalization, unintended effects like over-exposition can be filtered out throughout the processing of the image through the respective layers, thereby allowing for an increased efficiency of identifying the object in the image.

Moreover, the size S and T of the kernel may be equal for all convolutional layers or is different for at least one convolutional layer.

By choosing an identical kernel for each of the convolutional layers (i.e. for each of the depthwise convolutional layers), the resulting program that is installed on the corresponding mobile device can be reduced in size. On the other hand, if a kernel is used that differs for at least one of the convolutional layers, known issues with respect to identification failures can be avoided if the kernel is properly adapted. For example, using a bigger kernel (corresponding to a bigger size S and T) at the beginning of the identification procedure can allow for taking and focusing more important portions of an image, thereby increasing the identification efficiency.

In one specific embodiment, the size S,T=3 and is the same for all depthwise convolutional layers and wherein at least one of the entries $S_{a',b} \neq S_{a \neq a', b \neq b'}$.

It is a finding of the present invention that a corresponding kernel represents the best trade of between the size of the kernel, the identification efficiency and the computer resources required for implementing the respective method, thereby increasing the overall efficiency with respect to the identification accuracy and the computer resources required.

In a further embodiment, the batch normalizer provides the normalized reduced matrix P' to the rectified linear unit and the rectified linear unit applies a rectification function to each entry $P'_{ij}$ wherein the rectification function calculates a new matrix $\overline{P}$ with entries $$\overline{P}_{ij} = \begin{cases} 0 \; \forall \; P'_{ij} < 0 \\ P'_{ij} \; \forall \; P'_{ij} \geq 0 \end{cases}$$

and the matrix $\overline{P}$ is provided as output to the pointwise convolutional layer if the rectified linear unit is the first rectified linear unit or to the next layer of the neural network if the rectified linear unit is the second rectified linear unit.

This rectification function allows for filtering out, after each layer in the neural network, portions in the image that are potentially negatively influencing the identification accuracy. Thereby, the number of false identifications and correspondingly the number of iterations that are necessary in order to arrive at a proper identification accuracy can be reduced, thereby saving computer resources.

It may also be provided that the pointwise convolutional layer applies a weight $\alpha$ to the matrix I, P, P' or $\overline{P}$ received from the preceding layer by multiplying each entry in the matrix P, P' or $\overline{P}$ with the weight $\alpha$.

Even though to each of the points in the feature map the same weight a is applied, this embodiment allows for efficiently damping out portions in the image (corresponding to entries in the matrix that will not significantly influence the identification). This damping out is achieved by reducing the absolute contribution of such portions in the matrix and, together with the rectified linear unit, sorting those portions out in the next cycle.

In an embodiment, each operation of the methods explained above is performed on the mobile device.

This may at least comprise the operations of the above described methods that involve processing of the image and identification of the user. The storing of the image or biometric features or biometric characteristics can still be performed by any storage device being it internal or external to the mobile device. Further, it is still contemplated that the identification operation of identifying the user is performed on a device different from the mobile device, like for example a server of a company.

By exclusively performing the respective operations on the mobile device, it is no longer necessary to keep a channel for data transmission, for example, to a server open on which the actually identification process runs. Thereby, the object identification can also be used in areas where access to the mobile network or a local area network is not available.

There can also be provided a computer implemented method for distinguishing a real three-dimensional object, like a finger of a hand, from a two-dimensional spoof of the real object, the method comprising:

obtaining, by an optical sensor of a mobile device, an image, wherein the image contains either the spoof or the real object;

providing the image to neural network;

processing the image by the neural network;

wherein processing comprises calculating at least one of:

a distance map representative of the distance of a plurality of pixels to the optical sensor, the pixels constituting at least a portion of the object within the image;

a reflection pattern representative of light reflection associated with plurality of pixels constituting a least a portion of the object within the image;

and wherein processing further comprises comparing, by using the neural network, at least one of the calculated distance map or the calculated reflection pattern with a learned distance map or a learned reflection pattern, thereby determining, based on an outcome of the comparison, that the image contains either the spoof or the real object.

In the context of the invention, even though it would, in principle, be possible that even the image of the real three-dimensional object constitutes a spoof of an intended object like the real finger of a human being, it is assumed that the three-dimensional object will be the real object. A two-dimensional spoof of the real object can be anything but will usually be an image originally taken from the real object and now being provided (for example, a paper or any other flat surface8 to the optical sensor which, in turn, takes an image of this image. However, other realizations of a two-dimensional spoof like an (almost two-dimensional flat) model of the real object can also be realized. In any case, in some embodiments, the spoof is not a three-dimensional reproduction of the real object.

The distance map is meant to constitute data structure, like a matrix or a table or other structure, where a given pixel in the original image that was taken by the optical sensor is associated with its estimated or calculated distance to the optical sensor. It is clear that the pixel itself does not have a distance to the optical sensor as the pixel merely is a data structure. What is meant is that the object obtained by taking of the image by the optical sensor originally had a distance to the optical sensor. Therefore, each pixel in the obtained image represents a point in the real world and, therefore, is still associated with a distance of this point in the real world to the optical sensor at the time the image was taken.

The same holds for the reflection pattern representative of light reflection associated with a plurality of pixels constituting at least a portion of the object within the image. Here, it is clear that the pixels themselves do not realize a reflection pattern but the original object (or two-dimensional spoof of the real object) did have a reflection pattern representative of light reflection. This can be calculated based on the image information obtained by the optical sensor. Like for the distance map, the reflection pattern may have the form of a data structure, like a matrix or a two-dimensional table or the like.

In some embodiments, the calculated distance map is compared with a learned distance map or the calculated reflection pattern is compared with a learned reflection pattern. Herein, the learned distance map and the learned reflection pattern correspond to distance maps and reflection patterns that are known to the neutral network to constitute either a distance map of a real object or a distance map of a two-dimensional spoof of the real object or a reflection pattern of a real object or a reflection pattern of a two-dimensional spoof of the real object. The comparison of the calculated distance map or reflection pattern with the learned distance map or reflection pattern may yield a result that can be used to distinguish between a real object and a spoof of the object by, for example, determining that the obtained distance map or reflection pattern is corresponding more likely to a learned distance map or learned reflection pattern that constitute a spoof rather than a real object.

With the method according to the invention, it is possible to efficiently distinguish between real objects and spoofs of the real objects because neutral networks as used can reliably determine similarities between images taken and learned information (like the learned distance map and the learned reflection pattern) in order to determine specific characteristics associated with the object within the image. Thereby, this method is applicable also in cases where the information in the image with respect to the real object is a security sensitive information like a finger carrying a fingertip that is used for identifying the user, thereby preventing misuse of images taken from such objects.

In one embodiment, the distance map and the reflection pattern are calculated and compared to the learned distance map and the learned reflection pattern, thereby determining, based on the outcome of the comparison, that the image contains either the spoof or the real object. By using both, the calculated reflection pattern and the calculated distance map, the reliability of the determination that the image of the object shows a spoof or the real object can be increased, thereby even further increasing the reliability of the identification and the security in case the identification is further used for security related issues.

In one embodiment, the image is obtained by the optical sensor while using a flash associated with the optical sensor and wherein the optical sensor is a camera. Using the flash of a camera highlights portions of the area from which the image is obtained, thereby allowing for more reliably calculating a reflection pattern with high accuracy and also allowing for more easily distinguishing between spoofs of the real object and the real object.

Furthermore, the neutral network might comprise a plurality of layers and the last layer comprises two nodes, wherein a first node provides output regarding a real object being determined during the processing and the second node provides an output regarding a spoof being determined during the processing.

In some embodiments, both nodes provide outputs for each image taken regardless of whether it is a real object or a spoof of the real object that is obtained on the image. This output can later on be processed further in order to carry out a probabilistic determination of whether or not the object obtained on the image is either real or a spoof.

According to a more detailed implementation of this embodiment, each node provides an output upon processing of the image, the output ranging from $-\infty$ to $+\infty$ and the output of each node is passed to an output normalizer, the output normalizer first taking the output $x_i$ of each node and calculates a reduced value $S(x_i)$ by $$S(x) = \frac{e^x}{1+e^x}$$

where i=1 for the first node and i=2 for the second node, and provides the values $S(x_i)$ to a normalization function $$\sigma(S(x_j)) = \frac{e^{S(x_j)}}{\sum_i e^{S(x_i)}}$$

thereby to obtain normalized values $\sigma(S(x_1)) \equiv \sigma_1$ and $\sigma(S(x_2)) \equiv \sigma_2$. With this further processing of the output of the first node and the second node, it is possible to have normalized values calculated based on the first and second node, thereby allowing for a statistical evaluation of this output of the first and second node for judging whether a spoof or a real object is provided within the image.

In one embodiment, it is determined, if $\sigma_1 > 0.5$, that the image contains the real object and, if $\sigma_2 > 0.5$, it is determined that the image contains the spoof. By using the normalized values of the output of the first and second node, it is possible to reliably distinguish between real object and the spoof.

In some embodiments, the exponential function is easily implemented in a computing system, thereby reducing the processing effort necessary. Furthermore, the exponential function can be processed easily by a computing system, thereby reducing the processing power and other computing resources required for calculating the results.

In one embodiment, processing the image as input by the neural network comprises processing, by a first layer of the neural network, the input image to create a first intermediate output and processing, by each following layer the output of the preceding layer, wherein the neural network comprises a plurality of layers, each layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit, wherein, by processing the input using the plurality of layers, the neural network obtains, as an output, the determination that the image contains either the real object or the spoof.

The depthwise convolutional layer uses a multiplication or inner product of a matrix, either the matrix corresponding to the original image, or the matrix corresponding to the distance map or the matrix corresponding to the reflection pattern, with a kernel being a matrix in the size of, e.g., 3×3 to calculate a further matrix. Using such layers is more efficient with respect to the processing efficiency. In view of this, the depthwise convolutional layers as proposed in the above embodiment are more efficient with respect to their parameter sensitivity than commonly used convolutional layers.

The depthwise convolutional layer and the pointwise convolutional layer may also be referred to as depthwise convolutional sub-layer and pointwise convolutional sub-layer. In fact, they are "layers within a layer" of the neural network, thus constituting sub-layers.

By applying this specific realization of the depthwise convolutional layer, together with the pointwise convolutional layer, the batch normalizer and the rectified linear units as provided in the above embodiment, the computer resources that are required by the neural network for performing real-time determination of spoofs within images are significantly reduced compared to the presently known technologies.

In a further embodiment, processing the image by the neural network comprises creating, from the image, at least one matrix I and providing the matrix as input to the neural network, wherein the image comprises N×M pixels and the matrix I is a matrix comprising N×M values, wherein the entries of the matrix I are given by $I_{ij}$, where i and j are integers and $i=1 \ldots N$ and $j=1 \ldots M$.

It is noted that the matrix I may be a matrix that corresponds to one of the RGB color values of the original image. However, the matrix I is obtained from the original image by converting the original image to the HSV color space before creating the matrix I. The HSV color space refers to the Hue-Saturation-Value color space. Converting the originally obtained image to the HSV color space can comprise, in case the original image comprises N×M pixels, that the converted image also comprises N×M pixels or data entries, respectively. Thus, the matrix I may be obtained from the N×M items in the converted image.

It is to be understood that the originally obtained image may have more than N×M pixels. The number of pixels can be reduced to N×M before or after having applied the Hue-Saturation-Value conversion. This conversion is specifically advantageous because the HSV conversion separates the luma information of each pixel from its associated color information (i.e. the RGB values). Thereby, the distance map and the reflection pattern can be calculated more efficiently.

More specifically, each depthwise convolutional layer applies a predefined kernel K to the matrix I, the kernel K being a matrix of size S×T where S, T<N; S,T<M comprising entries $S_{ab}$, wherein applying the kernel to the matrix comprises calculating the inner product of the matrix K with each reduced matrix R of size $(N \times M)_{S,T}$ of a matrix Z, where the matrix R has the same size as the kernel K, and the matrix Z has size $((N+2P_w) \times (M+2P_h))$ and the entries of the matrix $Z_{cd}$ with $c,d \in \mathbb{N}^+$ are given by $$Z_{cd} = \begin{cases} 0 \forall c \le P_w \\ 0 \forall c > P_w + N \\ 0 \forall d \le P_h \\ 0 \forall d > P_h + M \\ I_{ij} \text{ where } c = i + P_w; d = j + P_h; i = 1 \ldots N; j = 1 \ldots M \end{cases}$$

and provide a matrix P as output, wherein the matrix P has the size $$\left(\frac{N-S+2P_w}{W_w}+1\right) \times \left(\frac{M-T+2P_h}{W_h}+1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer to the first batch normalizer.

The kernel allows for properly weighing information obtained from adjacent pixels in introduced matrix while not losing any information, thereby increasing the efficiency with which consecutive layers in the neural network can support the processing in order to determine a spoof or real object. For this, the kernel comprises entries that correspond to specific weights or parameters that are obtained prior to receiving the image, i.e. during training of the neural network.

It is a finding of the present invention that, in case this training is performed before the mobile device is actually equipped with an application or other program that can perform the respective method according to the above embodiments, the required computer resources can be advantageously reduced on the mobile device.

While it is a finding of the present invention that it is most advantageous to implement the separable convolution using a depthwise convolutional layer and a pointwise convolutional layer because this combination shows improved performance with respect to the identification and the required computer resources, it can still be contemplated that the depthwise convolutional layer is replaced with a convolutional layer specifically adapted to the identification of fingers or fingertips. Therefore, even though the description of the invention is focused on the use of depthwise convolutional layers, it is also possible to implement the invention using a convolutional layer.

Moreover, the size S and T of the kernel may be equal for all convolutional layers or is different for at least one convolutional layer and/or at least one of the entries in the kernel K $S_{a',b'} \neq S_{a \neq a', b \neq b'}$.

By choosing an identical kernel for each of the convolutional layers (i.e. for each of the depthwise convolutional layers), the resulting program that is installed on the corresponding mobile device can be reduced in size. On the other hand, if a kernel is used that differs for at least one of the convolutional layers, known issues with respect to identification failures can be avoided if the kernel is properly adapted. For example, using a bigger kernel (corresponding to a bigger size S and T) at the beginning of the identification procedure can allow for taking and focusing more important portions of an image, thereby increasing the identification efficiency.

It is a finding of the present invention that a corresponding kernel represents the best trade of between the size of the kernel, the identification efficiency and the computer resources required for implementing the respective method, thereby increasing the overall efficiency with respect to the identification accuracy and the computer resources required.

In a further embodiment, the batch normalizer provides a normalized reduced matrix P' to the rectified linear unit and the rectified linear unit applies a rectification function to each entry $P'_{ij}$ wherein the rectification function calculates a new matrix $\overline{P}$ with entries $$\overline{P}_{ij} = \begin{cases} 0 \forall P'_{ij} < 0 \\ P'_{ij} \forall P'_{ij} \geq 0 \end{cases}$$

and the matrix $\overline{P}$ is provided as output to the pointwise convolutional layer if the rectified linear unit is the first rectified linear unit or to the next layer of the neural network if the rectified linear unit is the second rectified linear unit; and/or the pointwise convolutional layer applies a weight $\alpha$ to the matrix I, P, P' or $\overline{P}$ received from the preceding layer by multiplying each entry in the matrix P, P' or $\overline{P}$ with the weight $\alpha$.

This rectification function allows for filtering out, after each layer in the neural network, portions in the image that are potentially negatively influencing the determination accuracy of spoofs and real objects.

Even though to each of the points in the matrix P, P' or $\overline{P}$ the same weight $\alpha$ is applied, this embodiment allows for efficiently damping out portions in the image (corresponding to entries in the matrix that will not significantly influence the identification). This damping out is achieved by reducing the absolute contribution of such portions in the matrix and, together with the rectified linear unit, sorting those portions out in the next cycle.

In an embodiment, each step of the methods explained above is performed on the mobile device. This may at least comprise the steps of the above described methods that involve processing of the image and determination of real objects and spoofs. The storing of the image or any subsequently performed step like identifying the user using biometric features or biometric characteristics extracted from the image in case it is determined the object is a real object and not a spoof can still be performed by any storage device and processing being it internal or external to the mobile device. Further, it is still contemplated that a subsequently performed identification step of identifying the user using information obtained from the real object is performed on a device different from the mobile device, like for example a server of a company.

By exclusively performing the respective steps on the mobile device, it is no longer necessary to keep a channel for data transmission, for example, to a server open on which the actually identification process runs. Thereby, the object identification can also be used in areas where access to the mobile network or a local area network is not available.

The mobile device according to the invention comprises an optical sensor, a processor and a storage unit storing executable instructions that, when executed by the processor of the mobile device, cause the processor to execute the method of any of the above described embodiments.

In one embodiment, there is also provided a method for identifying a user using an image of an object of the user that has a biometric characteristic of the user, like a fingerprint or a set of fingerprints of fingertips, the method comprising:

obtaining, by an optical sensor of a mobile device, the image of the object;

providing the image or a part of the image to a neural network;

processing the image or the part of the image by the neural network, comprising distinguishing, by the neural network, a portion of the image or the part of the image comprising the region of interest, ROI, from another portion of the image;

extracting, from the image or the part of the image, the ROI;

storing the portion comprising the ROI in a storage device and/or providing the portion comprising the ROI as input to an identification means, comprising extracting the biometric characteristic of the ROI and processing the extracted biometric characteristic in order to determine whether the extracted biometric characteristic identifies the user.

The object of the user that has a biometric characteristic of the user can be any object that is suitable, due to the biometric characteristic it carries, to identify the user, i.e. to distinguish the user from any other potential user. This holds, for example, for fingerprints or the iris of the eye or the palm creases of the hand and also for geometric features in the face. Likewise, for example, a footprint can be used to identify and distinguish a user form another person. The objects may thus be, for example, a fingertip or a finger, the face, an eye, the palm of a hand or a foot. Other objects may be deemed suitable as well. While, in the following, reference will usually be made to the object in general or a fingertip as example for further explanations, it is clear that every embodiment can also be realized using one or more of the objects mentioned above, either alone or in combination with each other.

The region of interest is that region of the image of an object that actually carries the biometric characteristic. Even further, the region of interest may be that portion of the image of the object where the biometric characteristic is presented in a manner that allows for reliably identifying the user when using this portion of the image, specifically this portion of the object or this portion of the biometric characteristic. For example, although the whole fingertip carries the fingerprint, taking an image of the fingertip would lead to some part of the fingertip not facing towards the optical sensor and thus being visible on the image with an inclination and, for example, being darker than other portions of the fingerprint. Those "obscured" regions are usually not part of the region of interest because they are actually not suitable to identify the user using these regions.

The neural network, according to the invention, is trained and/or otherwise adapted to be able to distinguish, through processing of the image, between those portions of the image that contain the region of interest and other portions of the image that do not contain the region of interest. This can be achieved in variety of ways and is thus not to be understood in a limiting way. That the neural network "distinguishes" that region comprising the ROI from another region is to be understood as the ability of the neural network to provide an output that distinguishes between the ROI and other regions of the image or makes it possible to distinguish between those regions. For example, the output could be an indication of pixels comprising the ROI but not other regions of the ROI. In any case, the outcome of the processing of the image by the neural network at least comprises that a first portion of the image comprising the region of interest is identified as different from another portion of the image. In this regard, it is noted that the specific size, shape of position of the region of interest is found out by the neural network during processing of the image and it is not preset.

In view of this, in some embodiments the method according to the invention is intended to be directed to a free-form taking of an image of the object. In some embodiments, the image of the object is not taken using a template or other mask presented to the user defining how the user has to position the object relative to the optical sensor.

The identification means can either be remote to the mobile device with which the image is taken or it can also be included in the mobile device. Additionally, it is noted that the neural network can either be provided on the mobile device or remote to the mobile device which will then comprise that the image, before processing by the neural network, is forwarded from the mobile device to the remote location where the neural network is provided.

It is noted that providing the image or part of the image to the neural network does not only comprise the provision of the image or the part of the image as it was obtained by the optical sensor, meaning that, for example, the original image or half of the image or a specific portion of the image that is most likely to comprise the object having the biometric characteristic is provided to the neural network. Additionally, this step can comprise a pre-processing of the original image by, for example, applying modifications in the brightness or separation of the image into single colour images or the like. The invention is not limited in this regard.

The method according to the invention allows for obtaining the region of interest for further processing, specifically for determining whether the extracted biometric characteristic identifies the user with high accuracy, thereby significantly reducing the data transfer necessary and also simplifying the processing of the biometric characteristic by the identification means as interfering influence to the identification means from the remainder of the image not carrying the region of interest can be avoided.

In one embodiment the object is at least one fingertip and the biometric characteristic is a fingerprint of the fingertip and wherein processing the input by the identification means comprises extracting, from the fingerprint, a biometric feature, such as for example the location and kind of the minutia, and comparing the extracted biometric feature to a biometric feature stored in a storage device, wherein if a difference between the extracted biometric feature and the stored biometric feature is below a threshold, the identification means determines that the user is identified by the fingerprint and, if the difference between the biometric feature and the stored biometric feature is above a threshold, the identification means determines that the user is not identified by the fingerprint.

The threshold, can, for example, be a numeric value. For example, the threshold can be a number between 0 and 1 where 0 would constitute perfect match between the biometric feature in the stored biometric feature and 1 would mean no match between the biometric feature in the stored biometric feature. In order to take into account that, with obtaining an image, there is always the risk that the match is not 100% but also taking into account that, in order to identify a user, the accuracy of identification should be very high, for example when the user wants to access his bank account, the threshold can be set close to 0, for example or 0.02 or 0.04. Any other value is, however, also possible.

The difference between the extracted biometric feature and the stored biometric feature can, for example, be calculated on a pixel per pixel bases of the region of interest used of the obtained image. This means that, for each pixel, the difference between the value of the stored biometric feature (for example brightness value or colour value) to the extracted biometric feature can be determined. Each of these values can then, for example, be normalized to a range between 0 and 1. If the mean value of these normalized values for all pixels in the ROI or a subset of pixels in the ROI is below the threshold, the identification means can determine that the user is identified by the fingerprint and, if not, the user is not identified by the fingerprint.

Other means for calculating the difference between the extracted biometric feature and the stored biometric feature can also be thought of.

Using this calculation and comparison to a threshold allows for reliably determining whether or not the user should be identified by the biometric feature obtained.

In a more specific realization, the image comprises more than one fingertip and the method further comprises extracting portions of the image corresponding to each fingertip in the image and using the fingerprint of each fingertip for identification of the user by the identification means.

This embodiment can be advantageous in order to increase the accuracy with which the identification of the user is performed as more than one fingertip is used for the identification.

It can further be provided that the identification means determines that a user is identified by the fingerprints of the fingertips by determining that a combined identification accuracy of the fingerprints of all fingertips in the image is above a given threshold or the identification means determines that a user is identified by the fingerprints of the fingertips by determining whether, for each fingertip, a difference between a biometric feature of the fingerprint of the fingertip and a stored biometric feature of the fingerprint of the fingertip is below a threshold and determining that the user is identified by the fingerprints of the fingertips only in case all determined differences are below the corresponding threshold.

The threshold can be determined as indicated above. Likewise, the difference between the biometric feature extracted and the stored biometric feature can be determined as already described above or in any other suitable manner.

By using the isolated differences between that biometric feature extracted and the stored biometric feature or by using the combined identification accuracy, the identification of the user can be performed with high reliability. In this regard, the combined identification accuracy can be considered to be, for example, the mean value of all identification accuracies obtained for the different fingerprints.

In one embodiment the image is obtained by a camera as optical sensor of the mobile device.

As all smart phones of the present generation have such cameras, the method can be used by a plurality of users, thereby simplifying the identification necessary for, for example, logging into a banking account.

In a further embodiment processing the image or the part of the image by the neural network comprises processing the image by an encoder to obtain an encoded image and, after that, processing the encoded image by a decoder to obtain a decoded output image.

In this regard, the decoder and encoder are not to be understood in the manner of "encrypting and decrypting". Instead, they have to be understood in the following way. The encoder processes the image in a "first direction", meaning that specific transformations are applied to the image in order to obtain a modified image (encoded image). This can comprise transformations that reduce the size of the original image and/or modify the values associated with each pixel or entry of a matrix representing the image. The decoder then applies a processing to the encoded image to obtain the decoded output image that at least has the same number of pixels as the original input. In view of this, the decoder will, according to the invention, at least partially reverse the transformations applied by the encoder. However, the decoding of the encoded image does not necessarily result in the original input image such that the decoding and encoding are not inverse transformations that are applied to the image.

With this embodiment, it is possible to obtain the relevant information to identify the ROI in the image and mapping this identification to the original image in order to extract the relevant pixels.

In this regard, it can also be provided that the image or the part of the image provided to the neural network for processing comprises N×M pixels and the encoded image comprises n×m pixels, where n<N, m<M and the decoded output image comprises N×M pixels.

Reducing the number of pixels when encoding the image results in a loss of information. When enlarging the image once again during the decoding, however, the most relevant information to distinguish the ROI from other portions of the image can be more easily discernable as not relevant information or very detailed information that is not necessary for identifying ROI is faded out with this procedure.

More specifically distinguishing a portion of the image or the part of the image comprises distinguishing a portion of the decoded output image from another portion of the decoded output image.

The distinguishing of the portions in the decoded image can be much easier compared to distinguishing the portion comprising the ROI from another portion of the original image. Thus, the processing power required for distinguishing a portion in the decoded output image from another portion in the decoded output image are reduced significantly compared to processing the original input image.

In a further specific realization extracting the portion comprising the biometric characteristic comprises identifying pixels in the decoded output image that are within the distinguished portion (i.e. the ROI) and, after that, identifying the pixels in the decoded output image that are in the distinguished portion with corresponding pixels in the original image or the part of the image and extracting, from the original image or the part of the image, the corresponding pixels, the extracted corresponding pixels constituting the portion of the image or the part of the image comprising the biometric characteristic.

As the decoded output image has the same number of pixels as the input image, it is easily possible to match the portion identified in the decoded output image as comprising the ROI to the portion in the original image, thereby making it easier to extract the ROI from the input image.

The method may further comprise that, in the decoded output image, each pixel has a value $x \in\ ]-\infty; +\infty[$ and, before the distinguishing of a portion of the decoded output image, an activation function $$S(x) = \frac{1}{1+e^{-x}}$$

is applied to each pixel in the decoded output image and a normalized value $\bar{x}=S(x)$ is associated with each pixel in the decoded output image, wherein the distinguishing is performed on the pixels with the values $\bar{x}$.

Thereby, portions comprising the ROI are even more easily distinguishable from other portions not comprising the ROI, thereby increasing the accuracy with which the ROI is identified in the decoded output image.

In one embodiment, the neural network comprises a set of encoder layers and a set of decoder layers, wherein processing the image or the part of the image by the encoder to obtain an encoded image comprises processing, by a first layer of the encoder, the input to create a first intermediate encoded output and processing, by each following layer of the encoder, the encoded output of the preceding layer, each encoder layer being a depthwise separable convolution comprising, in the processing order of the input within the layer, a depthwise convolutional layer, a first batch normalizer, a first rectified linear unit, a pointwise convolutional layer, a second batch normalizer and a second rectified linear unit;

wherein, by processing the input using the plurality of layers, the encoder obtains the encoded image;

wherein the encoded image is provided to the decoder and wherein processing the encoded image by the decoder to obtain a decoded output image comprises processing, by a first layer of the decoder, the input to create a first intermediate decoded output and processing, by each following layer of the decoder, the decoded output of the preceding layer, each decoder layer comprising a deconvolutional layer and/or a bilinear upsampling layer;

wherein, by processing the input encoded image using the plurality of layers, the decoder obtains the decoded output image. While, throughout this description, reference will be made to a "decoded" image and "encoded" image as well as "decoded output image" and "encoded input image", it is noted that those "images" may not be images as they would be normally understood. In fact, the image information will change due to the processing by the respective layers of the neural network in a way that the respective encoded and decoded "images" may no longer contain information commonly recognizable by humans. Therefore, the respective terms should rather be understood to only be used for explanatory purposes. The respective encoded and decoded "images" are, in general, tensors or matrices of a given size.

This arrangement of the encoder and the decoder yields advantageous results with respect to the decoded output image, allowing to accurately distinguish between the ROI and the other portion of the original input image or part of the image.

Moreover processing the image by the neural network comprises creating, from the image or the part of the image, at least one matrix I that represents a colour value for each pixel in the image or the part of the image and providing the matrix as input to the neural network, wherein the image or the part of the image comprises N×M pixels and the matrix I is a matrix comprising N×M values, wherein the entries of the matrix I are given by $I_{ij}$, where i and j are integers and i=1 ... N and j=1 ... M.

This allows for restricting the processing of the image before the processing by the neural network to the processing of a single colour value which can make the processing easier and the outcome more accurate.

Additionally, each depthwise convolutional layer of the encoder applies a predefined kernel K to a matrix A with entries $A_{ij}$ with i=1 ... $\bar{N}$ and j=1 ... $\bar{M}$, where $\bar{N} \leq N, \bar{M} \leq N$ received as input, the kernel K being a matrix of size S×T where S,T<N; S,T<M comprising entries $S_{ab}$, wherein applying the kernel to the matrix comprises calculating the inner product of the matrix K with each reduced matrix R of size $(N \times M)_{S,T}$ of a matrix Z, where the matrix R has the same size as the kernel K, and the matrix Z has size $((N+2P_w) \times (M+2P_h))$ and the entries of the matrix $Z_{cd}$ with c,d∈ ℕ$^+$ are given by $$Z_{cd} = \begin{cases} 0 \forall c \leq P_w \\ 0 \forall c > P_w + \bar{N} \\ 0 \forall d \leq P_h \\ 0 \forall d > P_h + \bar{M} \\ A_{ij} \text{ where } c = i + P_w; d = j + P_h; i = 1 \ldots \bar{N}; j = 1 \ldots \bar{M} \end{cases}$$

and provide a matrix P as output, wherein the matrix P has the size $$\left(\frac{\bar{N} - S + 2P_w}{W_w} + 1\right) \times \left(\frac{\bar{M} - T + 2P_h}{W_h} + 1\right),$$

where $W_w$ and $W_h$ define the stride width and each entry $P_{ij}$ of the matrix P is the value of the inner product of the ij-th reduced matrix R with the kernel K, wherein the matrix P is provided as output by the depthwise convolutional layer.

The entries of the kernel can be trained through the training of the neural network in order to lead to most appropriate results when processing the image with the help of this depthwise convolutional layers.

In a further realization, each depthwise convolutional layer of the decoder is adapted to apply an inverse transformation to the input received, the inverse transformation creating, from an input matrix B of size N'×M' with entries $B_{ij}$, an expanded matrix $\bar{B}$ by expanding each entry $B_{ij}$ of the matrix B by multiplying the entry with a kernel $\bar{K}$, the kernel $\bar{K}$ being a matrix of size $\bar{S} \times \bar{T}$ with entries $\overline{K_{qp}}$, to a submatrix $\overline{B^{sub,ij}}$ with entries $\overline{B_{qp}^{sub,ij}} = B_{ij} \overline{K_{qp}}$, and combining the submatrices $\overline{B_{qp}^{sub,ij}}$ to obtain the expanded matrix $\bar{B}$.

With this, the encoded image can be decoded to the original size of the input image. The entries in the kernel $\bar{K}$ are not necessarily inverse or identical or otherwise related to the entries in the original kernel applied by the depthwise convolutional layer of the encoder. The entries in the kernel $\bar{K}$ can be learned during the training of the neural network to lead to the most accurate results.

The combining of the submatrices $\overline{B_{qp}^{sub,ij}}$ can be facilitated in any appropriate way. For example, the submatrices can be arranged side by side to obtain the expanded matrix $\bar{B}$. They can also be arranged in an overlapping manner such that the part of a first submatrix overlaps a part of another submatrix when constructing the expanded matrix $\bar{B}$.

By this transformation, an expanded matrix can be obtained that, at the end, has the original size of the input image, thereby making the identification of the ROI easier.

In an embodiment the size of the kernel K and $\bar{K}$ is equal for all depthwise convolutional layers and/or at least one of the entries in the kernel K or $\bar{K}$ is different from another entry in the kernel.

When using kernels K and $\bar{K}$ having the same size, it is possible to obtain an expanded matrix $\bar{B}$ using the same number of expansion/decoding steps in the deconvolution as that used during the encoding of the image used in the convolution to obtain the reduced matrix. This can reduce artifacts and conflicts due to different numbers of transformations being performed by the encoder and the decoder. The values of specific entries in the kernel may be learned during the training of the neural network.

In a further embodiment the batch normalizer creates a normalized reduced matrix P' and the rectified linear unit applies a rectification function to entries P''$_{ij}$ wherein the rectification function calculates a new matrix $\bar{P}$ with entries $$\bar{P}_{ij} = \begin{cases} 0 \forall P''_{ij} < 0 \\ P''_{ij} \forall P''_{ij} \geq 0 \end{cases}$$

and the matrix $\bar{P}$ is provided as output; and/or wherein the pointwise convolutional layer applies a weight α to a matrix received from a preceding layer by multiplying each entry in the matrix with the weight α.

Thereby, further information is lost during the encoding procedure but the most relevant information is forced through the processing of the input image by the neural network because the parameters of the neural network are correspondingly trained.

The method can also comprise providing a part of the image to the neural network, comprising separating the image into a grid comprising Q×R grid cells, wherein at least one bounding box is created within each grid cell, the bounding box having a predetermined position within the grid cell and predetermined geometrical characteristics, modifying the position and the geometrical characteristics of the bounding box to obtain a resulting bounding box, wherein the resulting bounding box is the bounding box having a resulting position and resulting geometrical characteristics that most closely match a location of the object and providing pixels of the image included in the bounding box to the neural network as part of the image.

Thereby, the original image can be reduced to a portion of the image constituted by the bounding box in fact comprising the object with the biometric characteristic. Thereby, the further processing of the input image by the neural network can be simplified as not the whole image but only the part of the image comprising the biometric characteristic is processed for identifying the ROI. Thereby, computer resources are saved and the accuracy can be increased.

Further the position of the bounding box can be calculated relative to a center of the grid cell in two dimensions and the geometrical characteristics of the bounding box can comprise a height and a width of the bounding box, wherein, further, a probability of the object being within the bounding box is associated with each bounding box.

Thereby, the bounding boxes can be reasonably adapted to the size and position and orientation of the object.

In one embodiment, each step of the method is performed on the mobile device.

This allows for a decentralized processing of images used for identification which can result in reduced vulnerability of data as only a single mobile device can be attacked or corrupted at a time which will then only comprise the data of a single user or at least a very limited number of users.

FIG. 1 shows a brief overview over the method for obtaining data from an image of an object of a user that has a biometric characteristic of the user. The biometric characteristic may be anything suitable for biometrically identifying a user, like, for example, a fingerprint, a set of fingerprints, one eye or two eyes, a palm of the hand of the user, a face of the user, a bottom of a foot of the user. The invention is in fact not limited in this regard.

The steps that are described in association with FIG. 1 are basically performed on a mobile device, like a smartphone, a tablet or a laptop or the like. This mobile device only needs to have a corresponding storage device and a processor (which all mobile computing devices usually have) and an optical sensor for obtaining an image as will be explained below.

The method in FIG. 1 starts with step 1 in which, by the optical sensor of the mobile computing device, an image is obtained. Though this image could be any image, this is assumed to be an image of an object of a user that has a biometric characteristic of the user. It does not need to be restricted to this biometric characteristic of the user but it can also comprise other image information. For example, considering that the biometric characteristic is a fingerprint. The image obtained will usually not only comprise a fingerprint or the fingertip carrying the respective fingerprint (the fingertip would then be the object) but there will also be other objects in the background, like additional fingers, a tree, cars or the like. In any case, the obtained image should, for the method to work, comprise the object of the user where the object has the biometric characteristic of the user.

As indicated above, the biometric characteristic can be anything like, for example, a fingerprint or a face of the user or the eye of the user and. Correspondingly, depending on the actual biometric characteristic that is to be considered, the object that is visible on the image may be different.

However, for explanatory purposes only, the description provided below will mainly focus on the object of the user being a fingertip and, correspondingly, the biometric characteristic of the user being the fingerprint or a set of fingerprints.

Once this image, which could, in general, be either a spoof or the real object (in the case of the spoof, it is meant that the image obtained by the optical sensor may be an image of an image of the actual object, i.e. a spoof; the real object may thus result in an image of this object itself) is obtained in step 1, the method proceeds to step 2.

In step 2, an identification step is performed during which the image is processed in order to identify both, the position of the object and the object in the image. Considering, for example, a fingertip being in the upper left border of the image obtained by the optical sensor, this identification step will result in an identification of this respective position and it will also result in the identification of the respective object. This identification may, for example, comprise identifying that this is a fingertip or that this is a face. This identification step will thus in any case result in a discrimination between other objects and the object of a user that has the biometric characteristic. There may, of course, also be a plurality of objects having a biometric characteristic visible on a single image, like a plurality of fingertips or a fingertip together with the face of the user. The invention is not limited in this regard and each of those objects may be processed further in line with the embodiments described below.

In the next step, after having performed this identification step, a liveliness-detection step is provided. This liveliness-detection step comprises detecting whether the object from which the image is obtained is actually the real object or only a spoof of the object (this determination will be the result of this step).

In order to achieve this, step 3 comprises at least one of either calculating a distance map representative of a distance of a plurality of pixels to the optical sensor, the pixels constituting at least a portion of the object within the image, or calculating a reflection pattern representative of light reflection associated with a plurality of pixels constituting at least a portion of the object within the image.

After having calculated the distance map and the reflection pattern based on the image obtained by the optical sensor, there is provided a further step 4 that is a comparison step (which may be considered to form actual part of the liveliness-detection step). This step comprises comparing at least one of the calculated distance map or the calculated reflection pattern with a known distance map or a known reflection pattern, thereby determining, based on an outcome of the comparison, that the image contains either the spoof or the real object.

The known distance map and the known reflection pattern are so to say "pre-set". This can either be a static distance map or a static reflection pattern or, in the context of performing this step using a neural network, a "learned" distance map and "learned" reflection pattern. This will be described in further detail below.

In case it is determined during this comparison step 4 that the object is a spoof (step 5), the method may end in step 6 and, for example, the user may be requested to obtain a further image using the optical sensor in order to, for example, obtain a more reliable image. It may also be provided that in case it is determined that the image contains a spoof of the real object the mobile device or the method that is actually performed in order to obtain data from an image of an object of a user that has a biometric characteristic is blocked for further use, for example, before a password is entered. This makes sure that the device is not used by a malicious attacker.

If it is determined in step 7, that the object is a real object, the next step 8 is performed, wherein step 8 comprises obtaining, from the image, after the processing, data comprising at least the biometric characteristic and optionally storing it in a storage device. Storing the biometric characteristic is not necessary but may have advantages in view of step 9.

If provided, this storage device may be a storage device provided on or together with the mobile computing device, like an external hard drive that is physically connected to the mobile computing device or the internal memory of the mobile computing device. In a next step 9, the data comprising at least the biometric characteristic is sent to a third-party computing device. This third-party computing device may be any device remote to the mobile computing device. For example, it may be or comprise one or a plurality of servers hosted either by the government or by a company. The data comprising at least the biometric characteristic may be used at this third-party computing device in order to, for example, further identify the user as will be explained in further detail below. Upon identification of the user based on the image obtained in line with the method just described, the user may, for example, be granted access to governmental services or to the services provided by the company like, for example, downloading or streaming videos, music or images or the like.

As the method can be discriminated into the identification step 2, the liveliness detection step 3 and the comparison step 4 as well as, in some embodiments, a further cropping step, the invention will now be described with respect to these steps in isolation. This also holds for one or more neural networks used within these steps separately.

It is noted that the description of these steps in the following does not mean that the features of these steps would be isolated. Rather, the embodiments described with respect to each of these steps can be combined as appropriate.

Aspects of the Invention Regarding the Identification Operation According to Some Embodiments The description that follows in this section refers to step 2 performed according to FIG. 1. It is noted that the "identification-step" does on its own not result in the identification of a specific user, for example John Doe. The step only results in a determination where and what object having a biometric characteristic of the user is provided in the image. If no such object would be present in the image (a case which is not further considered according to the invention and for the further description), the method according to FIG. 1 would end and, for example, resume to step 1 where the user is for example requested to take an image of an object that actually has a biometric characteristic.

Figure 2:
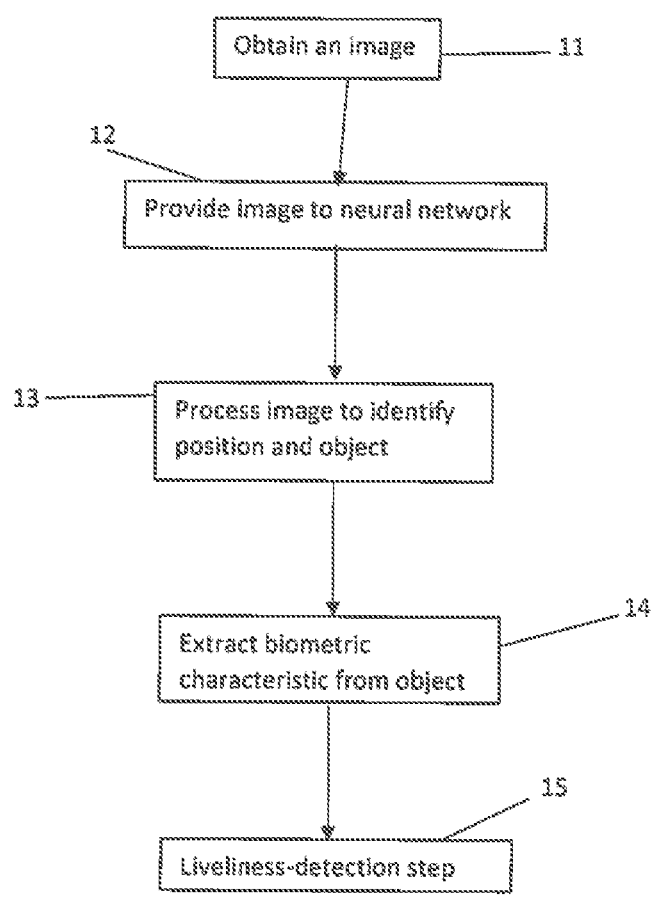
FIG. 2 shows a general overview of the method for identifying a user, according to some embodiments.

FIG. 2 shows a general overview of the identification step. This step is performed after the image of the object has been obtained in step 11. This object of the user will have a biometric characteristic that allows for identifying the user with this biometric characteristic. Specifically, the object may be a fingertip or the hand of the user or a plurality of fingertips and the biometric characteristic that is obtained from this image may be the fingerprint of at least one fingertip or even a set of fingerprints for example of two, three or four fingertips.

The image may be obtained by using an optical sensor like a camera. In some embodiments, this optical sensor is an optical sensor of a mobile device like a smartphone commonly available. The camera may be a camera that is able to obtain high definition images with one megapixel or more.

The obtained image is then provided for processing in step 12 to a neural network that will be explained in the following in more detail. In some embodiments, the invention does not make use of a neural network in this operation and also other means of processing the image without a neural network can be thought of, and will thus be described in further detail here.

Providing the image to the neural network (for processing it in the identification-step) can comprise forwarding or transferring the image either internally within the mobile device to a corresponding application that realizes the neural network or providing the image to a remote location. This can be a server or other computing entity. However, in some embodiments the image is provided to the neural network that resides in the mobile device.

In step 13, the image is then processed by the neural network as will be explained in more detail below with respect to FIGS. 4 to 7. In any case, the processing of the image by the neural network will result in identifying both, the position of the object having the biometric characteristic and the object itself in the image. This means that, for example in case the object is a fingertip, the neural network will identify the fingertip within the image (i.e. will determine that the fingertip is present within the image) and will identify its position within the image. Identifying the position of the fingertip within the image may, for example, comprise identifying all pixels that belong to the fingertip or at least identify a subsection within the image that contains the object and that is not identical to the whole image, thus for example, a section corresponding to a tenth of the overall area of the image.

In the next step 14, the biometric characteristic can optionally be extracted from the identified object. Such extraction may comprise, for example, only extracting those portions of the identified fingertip that in fact constitute the finger print. This extraction, however, can also occur after the liveliness-detection and the comparison step have been performed.

This biometric characteristic can then be processed further. Specifically, as will be explained in further detail below, the image is processed further during the liveliness-detection and comparison step.

Figure 3:
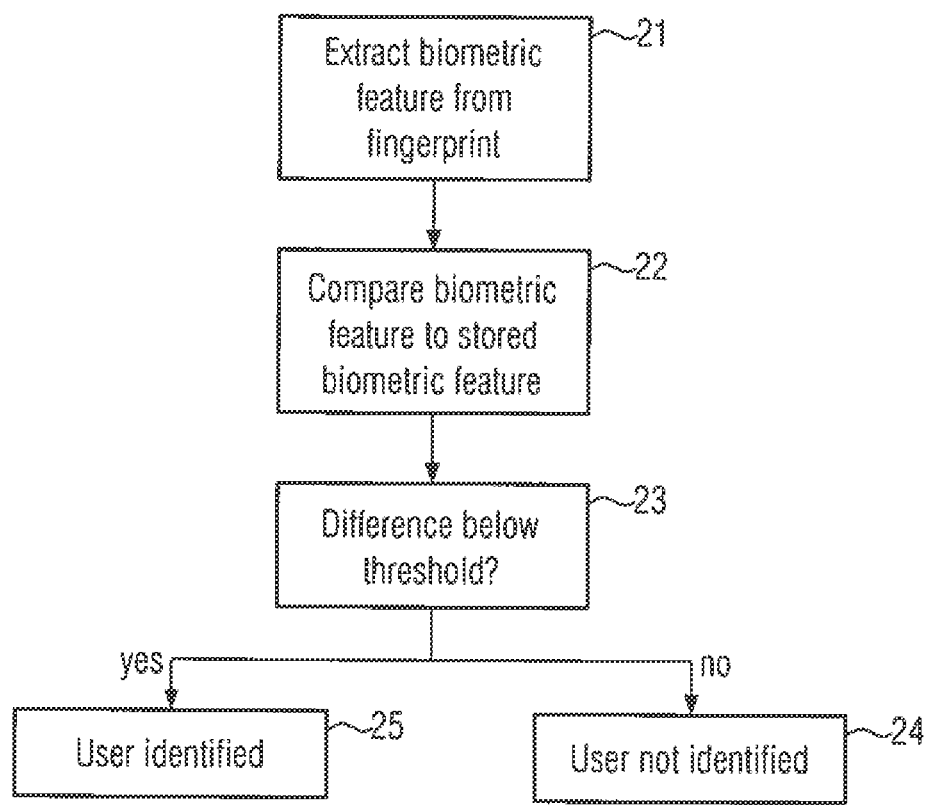
FIG. 3 shows a more specific flow diagram of performing, on the third party computing device, the identification using a biometric feature extracted from the image, according to some embodiments.

FIG. 3 shows a more detailed explanation of how a user may be identified using the biometric characteristic in the case the biometric characteristic being a fingerprint where the object would then be at least one fingertip. The steps now described are performed, according to the invention, on a third party computing device, i.e. after the data has been sent to the third party computing device in step 9 of FIG. 1.

The method in FIG. 3 begins with the step 21 where the biometric feature is extracted from the fingertip.

Extracting the biometric features from the fingertip may, for example, comprise extracting location and the kind of minutia of the fingerprint. It can also comprise extracting only very specific kinds of minutia (for example the crossing of two or more lines in the fingerprint).

In order to identify the user using this data comprising the biometric characteristic, it is of course necessary that a reference is available in the form of a corresponding biometric feature at the third party computing device. For this reason, it may be the case that the identification means identification means of the third party computing device that perform the identification are associated with a storage device or comprises a storage device in which biometric features are stored for specific users. For example, for each user, a file may exist in which one or more biometric features are stored in the form of, for example, images, numerical values or other data structure.

In the next step 22, the biometric feature obtained from the fingerprint is compared to a correspondingly stored biometric feature. This can comprise in the case of the stored biometric feature being represented by a number of locations of the minutia comparing corresponding locations in the extracted biometric feature. Of course, other means for comparing an obtained biometric feature to a stored biometric feature are known and can be used, for example, image recognition technologies, frequency transformations or the like. Comparing the obtained biometric feature and the stored biometric feature is, according to the invention, done in such a manner that a degree of correspondence between the obtained biometric feature and the stored biometric feature can be calculated. In other words, this comparison will result in a difference between the stored biometric feature and the obtained biometric feature being calculated.

This difference can be a single real number or a tensor or a vector or any other mathematical structure. It can also be a difference image that is obtained by subtracting, from a stored biometric feature image, an obtained biometric feature image on a pixel per pixel basis.

A threshold can be provided that can be used for determining whether the obtained biometric feature corresponds to the stored biometric feature and thus, allows for identifying the user.

Correspondingly, in step 23, it is determined whether the difference between the obtained biometric feature and the stored biometric feature is below or above this threshold. If it is below this threshold, it is determined in step 25 that the user is identified by the biometric feature. If the difference is above the threshold, it is instead determined in step 24 that the user is not identified by the biometric feature.

This will then result in the identification means at the third party computing device or the third party computing device itself determining either that the user is identified by the obtained fingerprint or the user is not identified by the obtained fingerprint.

FIGS. 2 and 3 have described the way of identifying the user using the biometric characteristic obtained from the originally taken image in the case only one fingertip is used for identifying the user and this fingertip was present in the image.

It is, however, also contemplated that the identification means may not only evaluate a single fingertip but may evaluate more than one fingertip like two fingertips or even all fingertips available on the image in order to identify the user. The manner in which a biometric feature obtained from a single fingertip or fingerprint of the plurality of fingertips is matched to a stored biometric feature by the identification means corresponds to the one described with respect to FIG. 3.

However, in case more than one fingerprint is evaluated, it may be that the user is either only identified in case a combined identification accuracy of the biometric features is above a given threshold or the user is only identified in case, for each fingertip obtained, the comparison of the obtained biometric feature with the stored biometric feature as explained in step 22 and 23 of FIG. 3 leads to the result in step 25.

The last case is straightforward as the method explained with respect to FIG. 3 is performed on every fingerprint in the image and only if the difference between the obtained biometric feature and the stored biometric feature for each obtained fingerprint is below the given threshold, the user is identified. In any other case, the user may not be identified.

However, in the case of the user is identified in case a combined identification accuracy of the fingerprints of all fingertips in the image is above a given threshold, it is not necessary that, for each fingertip, the comparison of the biometric feature obtained and the stored biometric feature results in the difference being below the threshold in line with step 23 of FIG. 3.

For example, considering the identification accuracy of a biometric feature to be number ranging from 0 (no identification) to 1 (complete match between the obtained biometric feature and the stored biometric feature), the combined identification accuracy may have a value of less than four (corresponding to perfect identification accuracy for four fingerprints) in case the combined identification accuracy is determined by the sum of the isolated identification accuracies obtain for each biometric feature alone.

For example, the corresponding threshold for the combined identification accuracy may be 3.5. In this case, it will be sufficient to identify the user in case, for example, the identification accuracies for each fingerprint is approximately 0.9 since the sum of those identification accuracies (i.e. the combined identification accuracy) is 3.6 and, hence, above the respective threshold. As another example, considering that three fingerprints are identified with an identification accuracy of 0.95, it will be sufficient if the fourth finger is only identified with an accuracy of 0.75.

It is noted that the identification accuracy can be seen as the relative degree of similarity or correspondence between the obtained biometric feature and the stored biometric feature. Thus, in case the obtained biometric feature corresponds to 90% to the stored biometric feature, the identification accuracy (i.e. how accurate the user might be identified with this biometric feature) will be 0.9.

It is clear that also other values for the identification accuracy or even also other values for the threshold can be used. Furthermore, there are also other means how the combined identification accuracy can be determined. For example, the combined identification accuracy may be calculated by determining the mean value of the identification accuracies or by determining the product of the identification accuracies.

In the figures that follow, the processing of the originally obtained image for finally extracting the biometric characteristic in line with steps 12 to 14 will be described in more detail and, further, an explanation regarding how the neural network can be trained to be able to identify fingertips with high accuracy will be given.

Figure 4:
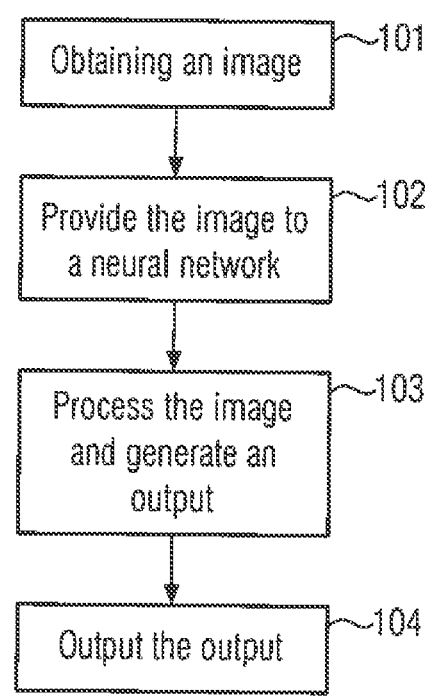
FIG. 4 shows a schema representing the general processing flow of the identification operation, according to some embodiments.

FIG. 4 depicts a flow schema of an implementation of the steps 12 to 14 of FIG. 2 according to one embodiment. The now explained method may allow for identifying an object carrying a biometric characteristic of a user within the obtained image during the identification-step. In the sense of the invention, this image is obtained in first step 101 (corresponding to step 11 in FIG. 2 or step 1 in FIG. 1) by an optical sensor of a mobile computing device. This mobile computing device may be a smartphone or a tablet computer or other corresponding device. The optical sensor will thus usually be a camera but could also be an infrared camera or other optical sensor. This camera can be a camera having a resolution of 1 megapixel (MP) or may be an HD-camera or may even have a lower resolution. In some embodiments, the resolution of the obtained image is at least 224×224 with three color values per pixel.

The obtained image may include an object that, according to the invention, is to be identified not only with respect to the object as such (for example a fingertip) but also with respect to its position within the image. The object may carry or have a biometric characteristic of the user that allows for properly identifying the user. This means the object has to be an object like a fingertip or a set of fingertips that have fingerprints. It is known that fingerprints can be used for identifying a user individually, i.e. besides some very special cases, the fingertip is unique for each person and thus allows for differentiating between two persons based on the obtained fingerprints.

While reference will be made with respect to FIG. 2 and the following figures to "an image", the invention allows for real-time object identification and, hence, the processing time required is in the area of a few milliseconds, thereby allowing for also properly identifying objects in consecutive images like in a video or live-stream obtained by the optical sensor. Therefore, the term "image" is to be understood to not only refer to a single image but also to images obtained in succession in very short time like a video stream.

In fact, as is common for smartphones, when activating the camera, the user of the smartphone is provided with the actual view of the camera without even taking a photograph. This "preliminary view" is thus also constituted of a plurality of images that are taken by the camera, usually with lower resolution. Even for those images, the described inventive method can be used.

In a second step 102 of the method, the obtained image (or the images obtained in succession one after the other) is provided to the neural network in accordance with step 12 of FIG. 2, where the neural network may reside on the mobile device.

The neural network may be implemented in an application (app) or in any other program that is running on the mobile device. In an embodiment of the invention, the further processing that is performed by the neural network during the identification-step and any other steps that are performed in the inventive method during the liveliness-detection and comparison as well as cropping step is carried out without having to refer to any computing entity outside of the mobile device, thus also allowing for carrying out the method in an "offline" mode of the mobile device.

The step 102 may be realized by forwarding the image without any further processing of the image or without any further pre-processing of the image directly to the neural network. However, this step may also comprise a pre-processing of the image wherein, for example, the resolution of the originally obtained image is changed, specifically reduced. It is a finding of the present invention that specifically in the case of identifying fingertips within an image, it is sufficient to have a comparably low resolution of 224× 224×3 (the "3" corresponds to three color values of the image, i.e. blue, red and green). In case, the obtained image has a resolution that is much larger than the 224×224 image resolution as necessary for identifying fingertips, step 102 or a step that is provided between the steps 102 and 103 can comprise reducing the resolution of the image. This pre-processing may also comprise other steps like changing the brightness conditions, changing the gamma value within the image or providing any other pre-processing that is considered adequate.

After the image has been provided as input to the neural network in step 102, this input is processed in step 103 by the neural network in such a way that an output is created that allows for identifying the object and/or the location of the object within the image. In the case of the object being a fingertip, this means that at least one fingertip that is present in the image is identified (for example in the form of a label) and its location (for example the coordinates of the pixels constituting the fingertip) are also somehow provided in the output. As will be explained later, this can be achieved by providing a bounding box that surrounds and includes the identified fingertip at a location that corresponds to the fingertip and where the bounding box is superimposed over the fingertip. The coordinates of this bounding box relative to the image can then be used as the position of the fingertip.

Processing the input (i.e. essentially the image received) in step 103 can be facilitated in a plurality of ways by using the neural network. In any case, in some embodiments, the neural network is a trained neural network that is specifically trained for identifying the intended objects carrying a biometric characteristic. In some embodiments, the neural network is trained for identifying, within an input image, fingertips irrespective of their location and arrangement with respect to the optical sensor as long as the optical sensor can take an image of at least one fingertip. The processing may involve, as will be explained later, the processing of the input through a plurality of layers of the neural network.

According to the invention, this comprises at least that the input is processed by a first layer of the neural network to create a first intermediate output that is then processed by the layer following the first layer in the processing direction of the neural network to create a second intermediate output. This second intermediate output is then forwarded to the next layer in the neural network where it is processed to create a third intermediate output and so forth until all layers in the neural network have processed their correspondingly received intermediate output. The last layer in the neural network will provide a "final" output that can later on be output (for example in order to actually extract the object from the image) in step 104 as will be explained below.

Further, according to the invention, each layer of the neural network is constituted of two convolutional layers such that each layer of the neural network represents a depthwise separable convolutional filter, also called a depthwise separable convolution. This depthwise separable convolution (i.e. the layer of the neural network) comprises, in the processing order of the input through the depthwise separable convolution, a depthwise convolutional layer, a first batch normalizer and a first rectified linear unit. In processing order after the first rectified linear unit, a pointwise convolutional layer, a second batch normalizer and a second rectified linear unit are provided, where the second rectified linear unit or a processing module that receives the output from the rectified linear unit will forward the intermediate output to the next layer in the neural network.

After processing the image through all the layers of the neural network, an output is created that will finally identify the position and the object itself.

This is done according to step 104, where the output of the neural network is output. According to some embodiments of the invention, this output may be a "modified image" where this image may be augmented with a bounding box that surrounds the identified fingertip in order to give the user feedback on the identified object and its position. This generation of the output does not need to be performed immediately, it can also be performed after the liveliness-detection and comparison step.

In any case, the output does not need to be displayed on a display of the mobile device or any other display associated with the mobile device. In fact, the output can also be provided in the form of a matrix or a tensor as will be explained below that correctly identifies the position of the fingertip in the image (specifically the coordinates of the pixels within the image that constitute the fingertip) and this matrix or tensor can be forwarded to a further processing module that uses this information, specifically the coordinates identifying the fingertip, to apply further processing to the identified fingertip. The output can later on be used for extracting the biometric characteristic from the identified object, in line with step 14 according to FIG. 2.

This further processing can include that the identified fingertip is evaluated in order to identify the fingerprint of the user. For example, considering a high resolution image taken from the fingertip, the inventive method can comprise that, in a first step, the position of the fingertip in the image is identified using the method comprising the steps 101-104 as explained above and the final output is then forwarded to a further image processing component that uses the output that identifies the fingertip and its location to evaluate the high resolution image in order to identify the fingerprint. This can be used to identify the user, thereby for example increasing the security of further processes as was explained with reference to FIG. 3. For example, if the user uses the inventive method in order to identify himself for a bank transfer with his mobile device, the inventive method can increase the security of the bank transfer by allowing for a correct and unique identification of the respective user as the fingerprint of a user uniquely identifies this person.

Embodiments of the invention are not limited to performing bank transfers using a corresponding method for identifying a fingertip. In some embodiments, the methods described herein can be used to identify the user in order to, for example, access functions of the mobile device or any other activity that requires identification and authentication of the user.

Figure 5:
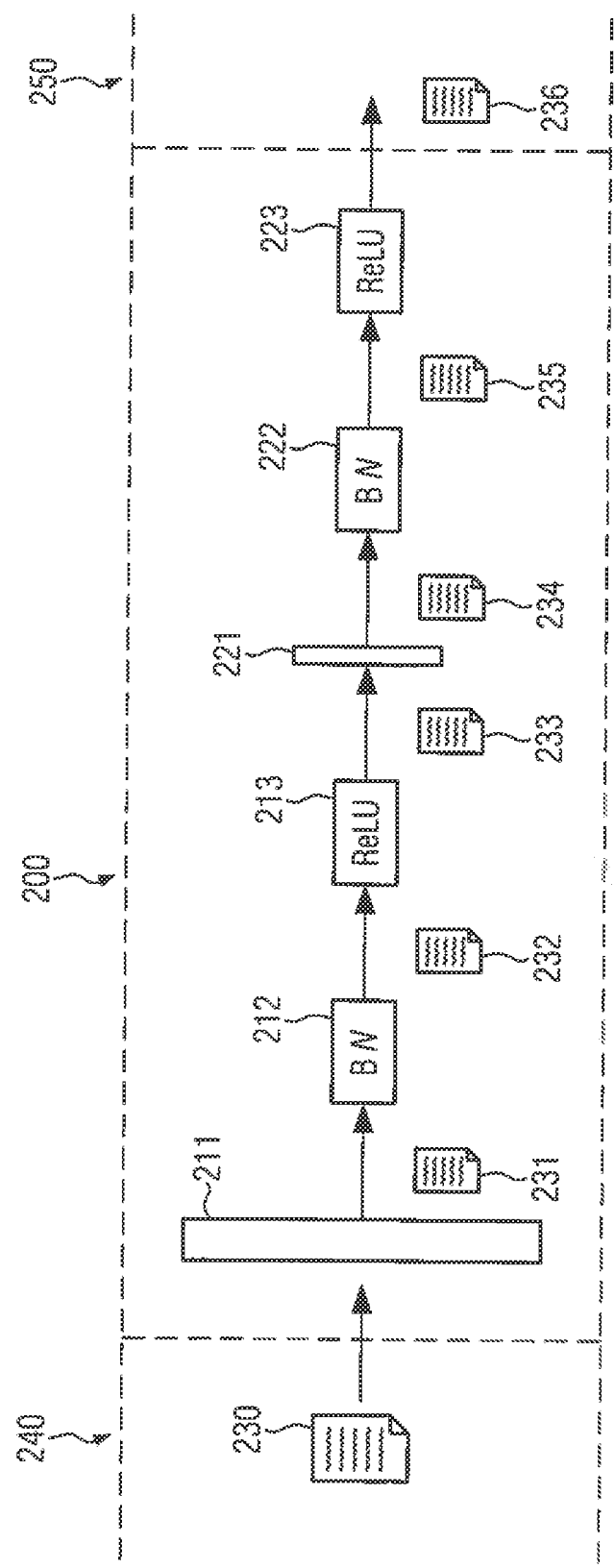
FIG. 5 schematically shows the structure of one layer within the neural network used in the identification operation and the processing of data within this layer, according to some embodiments.

FIG. 5 shows the internal processing of a received input in one layer 200 of the neural network during the identification step according to one embodiment of the invention. This layer 200 may be a layer that is, in processing order of the original input through the neural network, the first layer that receives the original input after step 102 explained above or any intermediate layer that is arranged between two further layers 240 and 250 of the neural network or the layer 200 may even be the last layer of the neural network that will, in the end, provide an output according to step 104 as explained with reference to FIG. 2.

In any case, the layer 200 will receive an input 230 that at least somehow corresponds to the originally obtained image. This input may be provided in the form of at least one matrix that has the dimension N×M where N and M are integers greater than 0. The matrix may, for example, represent the pixels in the image for at least one color value (for example red). The entries in this matrix thus may have values that correspond to the value of the respective color (in the example case red) of this specific pixel. As will be clear from the following, the input may not be identical to the obtained image but can be a matrix P that was obtained from the matrix representing the original image by some processing through layers in the neural network or even by some preprocessing (for example reduction in resolution as explained above).

For ease of discussion, however, the input 230 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 5, the input 230 is received by the depthwise convolutional layer 211 for processing. In the following, a comparably simple example will be given with respect to how the input matrix 230 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix I (i.e. the input matrix 230) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w)\times(M+2P_h)$. In view of this, the matrix Z will have the following entries:

$$Z_{cd} = \begin{cases} 0 \; \forall \; c \leq P_w \\ 0 \; \forall \; c > P_w + N \\ 0 \; \forall \; d \leq P_h \\ 0 \; \forall \; d > P_h + M \\ I_{ij} \text{ where } c = i + P_w; d = j + P_h; i = 1 \ldots N; j = 1 \ldots M \end{cases}$$

In this context, it follows that the new matrix obtained by calculating all inner products and arranging them properly according to lines and rows will generally be of size $$\left(\frac{N - S + 2P_w}{W_w} + 1\right) \times \left(\frac{M - T + 2P_h}{W_h} + 1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ may be smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straightforward with the teaching provided below.

In the depthwise convolutional layer 211, the received input matrix 230 is used to form an inner product with the kernel K that has the size S×S where S<N, M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix $(N\times M)_S$ is comprised of nine entries and the inner product with the kernel K is calculated which results in a single number. The next reduced matrix in the directions of the lines of the original N×M matrix is the matrix where i is increased by 1, such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size $(N\times M)_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1,M−S+2,M−S+3. By calculating those inner products, a new matrix, the matrix P is calculated that has the size (N−S+1)×(M−S+1). Its entries $P_{ij}$ correspond to the respective inner product calculated with the corresponding reduced matrix of the original N×M matrix and the kernel K. It is noted that a matrix of this size will, in fact, be forwarded to the pointwise convolutional layer of the layer 200.

The kernel K constitutes entries that are obtained through a learning process where the neural network is trained in order to properly identify the intended objects. The kernel K used in the layer 200 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 230 by the depthwise convolutional layer is the matrix 231 having, as explained above, size (N−S+1)×(M−S+1) in case the kernel is moved in strides over the original N×M matrix that have a distance of Δi=1 in the direction of the lines Δj=1 in the direction of the rows. In case, however, those strides have a larger distance like Δi=2 or Δi=3 (and potentially, correspondingly for the rows), the dimension of the result 231 will change correspondingly as explained above.

In the further processing, this result 231 is forwarded to the first batch normalize 212 that follows in the processing order depicted with the arrows in FIG. 4 after the depthwise convolutional layer 211. The batch normalizer attempts to normalize the received result matrix 231. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1)(denoted as P in the following, with corresponding items $P_{ij}$ matrix is given as $$V = \frac{\Sigma_{ij} P_{ij}}{n \cdot m}$$

where n and m represent the number of lines and columns/rows in the N×M matrix or the number of lines and columns in the matrix P. The items $P_{ij}$ are the entries of the matrix P where a given item $P_{ij}$ is the element in the matrix in line i and column j.

The batch normalizer then calculates a reduced matrix P' by subtracting, from each entry $P_{ij}$ in the original matrix, the mean value V such that $P'_{ij} = P_{ij} - V$. Thereby, the values in the reduced matrix P' are normalized such that anomalies in the one or the other direction (extremely large values or extremely low values) are filtered out.

The result 232 created by the first batch normalizer 212 is a matrix still having (in the example given in FIG. 4) the size (N−S+1)×(M−S+1) since, until now, no further dimensional reduction of the matrix was performed.

The result 232 is then provided to the first rectified linear unit 213 that follows the first batch normalizer 212.

The rectified linear unit modifies each entry in the matrix 232 further by calculating new matrix entries $P_{ij}$ where $$\overline{P}_{ij} = \begin{cases} 0 \forall P'_{ij} < 0 \\ P'_{ij} \forall P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 233 thus output by the first rectified linear unit 213 still is a matrix of shape/size (N−S+1)×(M−S+1) and this matrix is forwarded to the pointwise convolutional layer 221.

This pointwise convolutional layer 221 creates a result 234. This result 234 is created by the pointwise convolutional layer 221 by taking each entry in the (N−S+1)×(M−S+1) matrix 233 and multiplying this entry with a weight α. α may be a number that is greater than 0 in any case and this number is identical for each entry in the (N−S+1)×(M−S+1) matrix. The result 234 that is obtained from the pointwise convolutional layer 221 thus is a matrix having the same size (N−S+1)×(M−S+1) but where each entry is multiplied with the weight a.

The result 234 is then provided to the second batch normalizer 222 where it is normalized in the manner as explained for the first batch normalizer 212 and a normalized matrix P' of the same dimension as the result 235 is calculated and this matrix/result 235 is forwarded to the second rectified linear unit 223 where a rectification function is applied to obtain a result/matrix P 236 that is then forwarded to the next layer in the neural network or, if no other layer follows in the neural network, the result 236 is provided as an output.

It is a finding of the present invention that, for identifying fingertips, thirteen layers that are identical to the layer 200 explained in FIG. 5 are most appropriate as they result in a comparably high identification accuracy of the fingertips and their location while only requiring reduced computer resources for implementation of the respective method which makes it more applicable to mobile devices.

Figure 6:
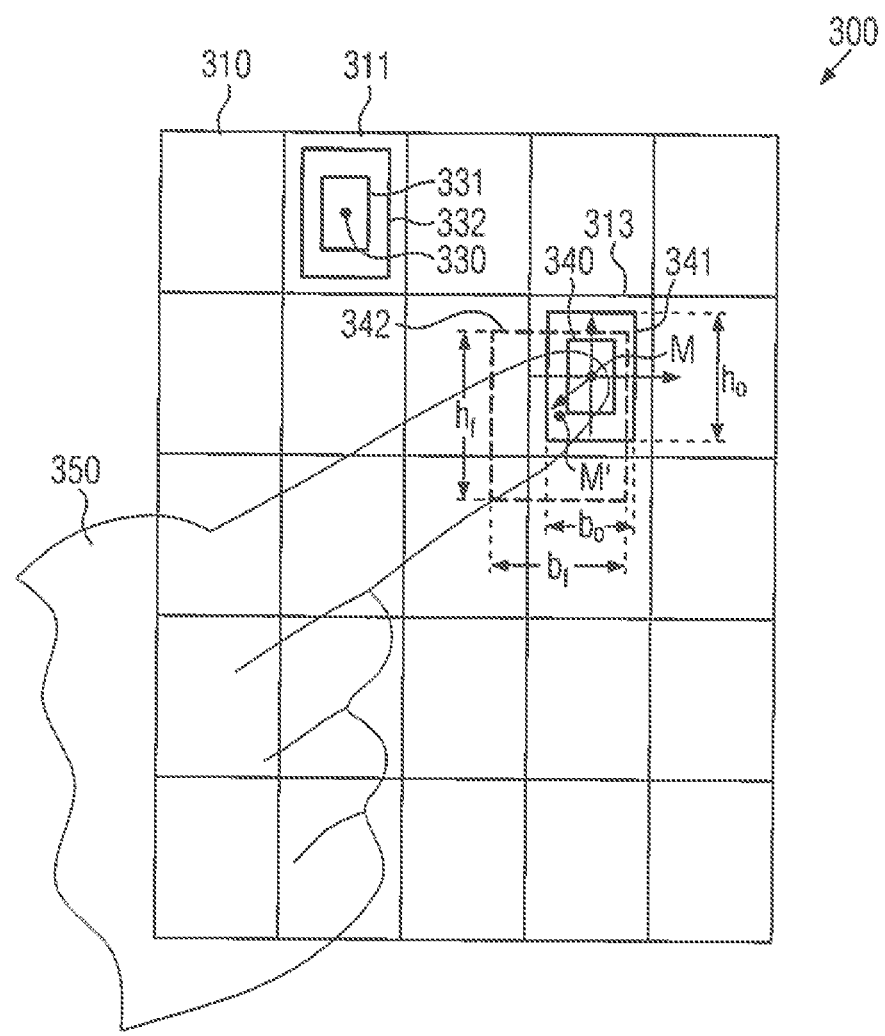
FIG. 6 is a schematic depiction of the processing of an image of a hand using bounding boxes, according to some embodiments.

FIG. 6 shows a further embodiment that extends the concept described in FIG. 5 in order to allow for an identification of a fingertip (specifically the pixels in the original image constituting the fingertip) using a number of bounding boxes and a separation of the original image into grids. It is noted that the steps described in the following can be performed after having processed the original image in each layer of the neural network or only after the image has been processed in the final layer of the neural network, thus immediately before outputting the output according to step 104 of FIG. 4. It is also contemplated that these steps now described are performed after the liveliness-detection and comparison step described below.

The embodiment described in FIG. 6 assumes an already learned neural network that is perfectly able to identify fingertips or other objects with high accuracy in line with the invention based on the output received from a layer of the neural network.

In accordance with the embodiment of FIG. 6, it will be assumed that the output received from the layer of the neural network can still be somehow represented in the form of an image 300 of a hand 350 that comprises a fingertip. Reference will thus only be made to "the image" although it is clear that instead of the image also one of the output matrices as explained in FIG. 3 can be used.

In a first step, the image 300 received is separated into a plurality of grid cells 310, 311 and 313. The number of grid cells in each direction is not limited, but in an embodiment, the image 300 is separated into 13 grid cells in horizontal direction and 13 grid cells in vertical direction such that instead of a general Q×R grid a 13×13 grid is created.

In a next step, the center point 330 of each grid cell is identified and used for establishing the origin of a coordinate system for each of the grid cells separate from any of the other grid cells. Around this center 330, at least one bounding box 331 and 332 which will usually have the shape of a rectangle is arranged where those have, as can be seen in the grid cell 313, an initial height $h_0$ and a width or breadth $b_0$. For a plurality of bounding boxes in each grid cell, those values can be different from each other. For example, initial values $h_0$ and $b_0$ can be taken for the smallest bounding box per grid cell and those values can be increased by a factor 1.5 or 2 or any other value in order to calculate the dimensions of the other bounding boxes in the respective grid cell.

It is noted that the position of a bounding box, for example the bounding box 331 in the coordinate system of the respective grid cell will be represented by the position of the center point of the bounding box 331 with respect to the center point 330, i.e. the origin of the respective coordinate system, in the respective grid cell. Thus, the position of the respective bounding box in the grid cell 311 can be represented by two coordinates x and y. The width and height of the bounding box are considered to represent geometrical characteristics of the bounding box which can be represented by two values larger than 0.

As those bonding boxes will later be used to identify the position of a fingertip, it is also appropriate to associate, with each of those bounding boxes, a fifth value which is the probability of the bounding box to include the respective fingertip that is to be identified.

Thus, each bounding box can be represented by a vector of dimension 5 in the form $$b = \begin{pmatrix} x\text{-position of bounding box} \\ y\text{-position of bounding box} \\ \text{width b of bounding box} \\ \text{heigth h of bounding box} \\ \text{probability} \end{pmatrix}.$$

This means that the grid cells together with their respective bounding boxes can be represented in the form of a tensor T having the dimensions Q×R×B×A, where A is the number of bounding boxes per grid cell. In a case for identifying fingertips, Q=R=13, B=5 (the dimension of vector b) and A can be set to an integer between 3 and 10, and in some embodiments can be 5.

As explained above, it is assumed that the neural network is already perfectly learned for identifying a specific object, such as a fingertip. This involves that the neural network is able to identify a specific pattern of pixels that are most likely representing a fingertip. This might refer to specific patterns of color values or other characteristics like the brightness of those spots. It is, however, clear that the image 300 may arbitrarily show a fingertip which might not correspond in size and arrangement to a fingertip that was used for learning the neural network.

With the help of the bounding boxes and the grid, however, it is possible for the neural network to identify the specific bounding box that will most likely comprise the fingertip. In order to identify this specific bounding box, the neural network (or an associated component that processes the image 300) compares the values of the pixels within each bounding box of each grid cell to a pattern of pixels that corresponds to a fingertip as was previously learned by the neural network. In this first stage, it is most unlikely that a perfect match will be found but there will be bounding boxes that are already more likely to contain at least a portion of a fingertip than other bounding boxes.

In the case depicted in FIG. 6, for example, the bounding box 341 centered around the point M in grid cell 313 includes a portion of the fingertip of the hand 350. In contrast to this, none of the grid cells 310 and 311 comprise bounding boxes that include a portion of a fingertip. When the method continues to evaluate the pixel values within the bounding box 341 and potentially the bounding box 340, the process can determine that the bounding box 341 includes even more of a pattern that corresponds to a fingertip than the bounding box 340.

In view of this, the method can conclude that none of the bounding boxes 331 and 332 (and potentially other bounding boxes in other grid cells) includes a fingertip and can set their probability value in their corresponding B-vector to 0.

As both bounding boxes 340 and 341 as centered around the point M comprise at least a portion of a fingertip, they may be considered to be likely to in fact comprise a fingertip and the probability value will be greater than 0 in a first step.

While the smaller grid cell 340 is almost completely filled with a pattern that could correspond to a fingertip, only the left border of the greater bounding box 341 may be regarded by the process to include a pattern that corresponds to a fingertip.

With this, the method may continue to calculate a loss function that determines the difference between the pattern identified within each of the bounding boxes 341 and 340 to a pattern obtained from learning which indeed corresponds to a fingertip.

In the next step, the method will attempt to minimize this difference by modifying the size and the position of the respective bounding boxes. In this regard, it can be envisaged that the larger bounding box 341 is used as the starting point and its position and shapes modified or the smaller bounding box 340 is used as the starting point and its position and size are modified in order to minimize the differences to the learned pattern.

This minimizing process can firstly comprise modifying the position of the bounding box (in the following, it will be assumed that the bounding box 341 is used for the further calculations) by moving it a small amount into orthogonal directions first along the x-axis and then along the y-axis (or vice versa) as depicted in FIG. 4 around the center point M of the respective grid cell. The movement will be along the positive and the negative x-axis and y-axis and at each position, a comparison will be made to determine a difference function between the pattern obtained from the learning and the actual pattern identified in the image. This allows for calculating a two-dimensional function that represents the difference d(x,y) depending on the coordinates.

Based on this, a gradient $\nabla_{xy}d$ can be calculated which allows for determining in which direction in the coordinate system, the bounding box has to be moved in order to increase and maximize the match with the learned pattern (corresponding to minimizing the value of the function d(x,y)). This will be the case for $\nabla_{xy}d=0$.

This can result in the bounding box being moved along the direction r to a new center point M' where the function d(x,y) has a minimum. In a next step, the size of the respective bounding box at position M' can be increased and reduced in order to determine whether with increasing or reducing the size in one or two directions (i.e. the height and/or the width) changes the value of a further difference function compared to the original pattern which can be denoted with e(h,b) depending on the height h and width b. This function is minimized such that for a specific bounding box having a position M' and having a height $h_f$ and a width $b_f$, the difference to the learned pattern is minimized.

This bounding box will then be used as the final bounding box which has the greatest probability p of identifying those portions of the image 300 that contain the respective fingertip. The output vector for this bounding box will then have the form $$b = \begin{pmatrix} x \\ y \\ b_f \\ h_f \\ p \end{pmatrix}$$

As a result of this process, a tensor T with dimension Q×R×B×A is output where, for each bounding box in each grid cell, the x and y position with respect to the center of the grid cell as well as the width and the height of the respective bounding box and its probability to identify or comprise a fingertip is given.

In order to prevent the movement of bounding boxes of adjacent grid cell to be moved into the same direction such that they overlap each other and in order to prevent bounding boxes of different grid cells to move into other grid cells, the method can be provided such that the movement of the center of a bounding box is only possible within its original grid cell.

The result will thus be a tensor comprising a plurality of vectors B where one or more of those vectors have a high probability of identifying the fingertip whereas others have a low probability. Those with a low probability can be neglected completely by setting all their corresponding values to 0, thereby reducing the processing effort necessary in processing the tensor.

The vectors B with the highest probability will then be used in order to allow the further processing of the image and specifically those portions of the image that identify a fingertip for example in order to identify the user of the mobile device by processing the fingertip in order to identify the fingerprint.

While the above approach allows for properly identifying the bounding box that will be used to further process the identified biometric characteristic, like a fingerprint, a further explanation will be given regarding the bounding boxes that have to be discarded.

As explained above, the vector b of a bounding box comprises a probability p that indicates the likelihood that the respective bounding box includes or represents a fingertip. This can be used to sort all bounding boxes (or their vectors, respectively) in descending order beginning with those vectors b that have the highest probability value p.

Having done so, the list can be traversed in descending order beginning with the bounding box having the highest value p. This traversing can include selecting a specific bounding box with value p from the list and calculating, for this specific bounding box, the amount of intersection with all remaining bounding boxes. This means the area of the specific bounding box that is selected is compared to the area of the remaining bounding boxes and any areas they have in common (i.e. where the bounding boxes intersect) contributes to the calculated intersection.

The amount of intersection can be calculated as a ratio with respect to the area of the selected bounding box. Thereby, a dimensionless value is obtained for each calculated intersection that ranges from 0 (no intersection) to 1 (the considered remaining bounding box completely intersects or covers the area of the selected bounding box).

In a next step, a preset threshold can be used to neglect or discard bounding boxes or sort them out. In the above example, the threshold might be a calculated intersection of 0.75. For every calculated pair of a selected bounding box and a remaining bounding box for which the intersection exceeds this threshold, the bounding box having the lower value p can be neglected or sorted out from the list mentioned above.

This will finally result in only one bounding box remaining which will represent the fingertip of the finger. This can, of course, result in up to four remaining bounding boxes, depending on how much fingers are visible in the image.

Figure 7:
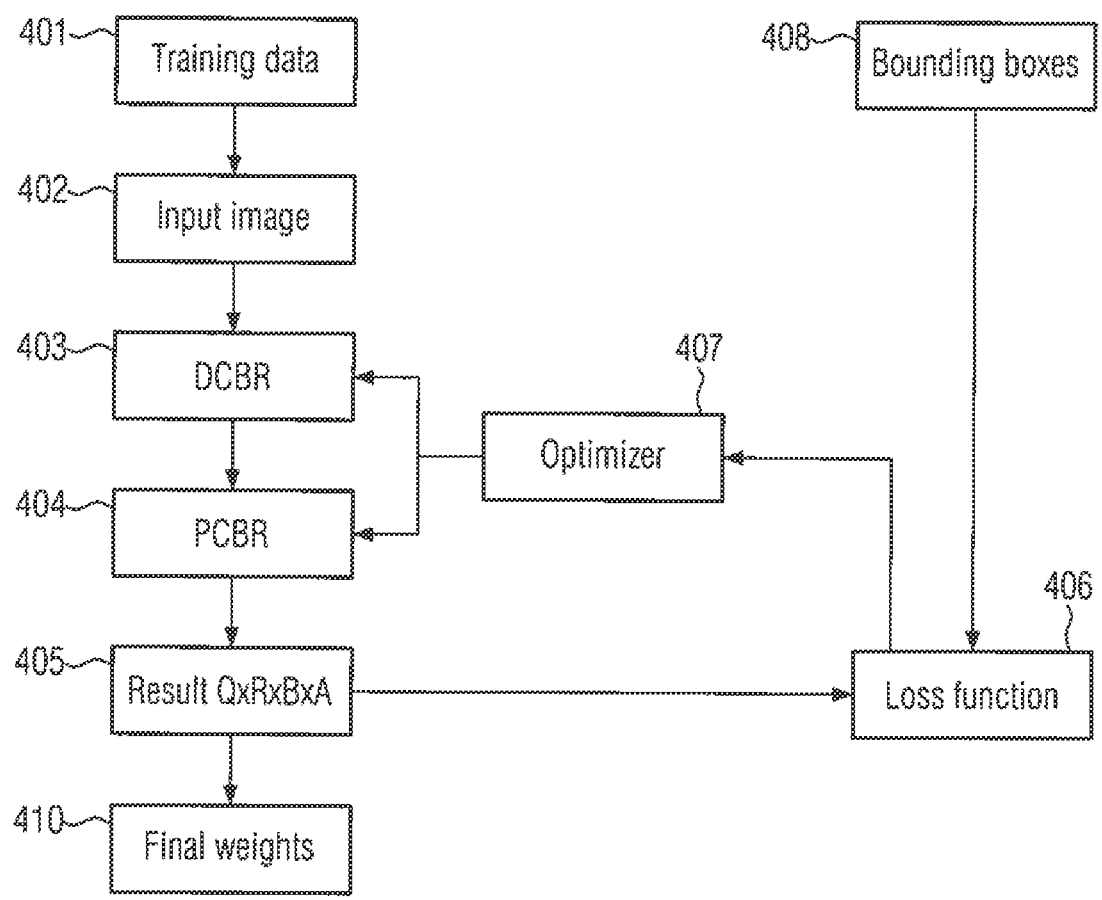
FIG. 7 shows the process of training the neural network used in the identification operation, according to some embodiments.

In FIG. 7, and explanation will now be given how the neural network can be properly trained such that the weights of the kernel K and the weight α explained with respect to FIG. 5 as well as the patterns that indeed identify a fingertip are learned by the neural network.

The method of FIG. 7 begins with the provision of training data 401 and preset bounding boxes 408. The training data may be constituted by a plurality of images of, for example, fingertips or a plurality of fingers depicted in one image together with other objects. The images may be multiplied by using, from the same image, rotated, highlighted, darkened, enlarged or otherwise modified copies that are introduced as training data. The bounding boxes provided according to item 408 are bounding boxes corresponding to their respective image in the training data where those bounding boxes are the bounding boxes that are correctly associated with the object to be identified, i.e. have the correct size and the correct position and a corresponding probability value as explained with respect to FIG. 6. Such bounding boxes are provided for each and every image in the training data.

In the next step, one specific input image 402 is provided to the neural network in a training environment where, in addition to the neural network, an optimizer 407 and a loss function calculator 406 are provided.

The input image is, in a first round, processed using the depthwise convolutional layer and the first batch normalizer as well as the first rectified linear unit 403, summarized as DCBR, and is then transferred to the pointwise convolutional layer, the second batch normalizer and the second rectified linear unit, summarized as PCBR, where they are processed in line with the description given in FIG. 5. This means the steps or the sections 403 and 404 depicted in FIG. 6 are run through thirteen times as described with reference to FIG. 5 using, in each section 403 and 404 the corresponding weights for the pointwise convolutional layer (PC) and the kernel K of the depthwise convolutional layer (DC). The first and second batch normalizers as well as the rectified linear units of items 403 and 404 work in the manner as explained above with respect to FIG. 6.

As a result, in line with FIG. 6, the output will be a first tensor T of size Q×R×B×A with first entries $T_{qrba}$ in line FIG. 6. This result will then be provided to the loss function where it will be compared with the preset bounding boxes in order to identify the differences between the result 405 and the correct bounding boxes obtained from 408. This difference obtained by the loss function 406 is then provided to the optimizer 407 which, in turn, will modify the weights of each pointwise convolutional layer and each depthwise convolutional layer, i.e. a and the entries in the kernel K. This means that, either for all layers in the network at once or for each layer in isolation, the weight a of the pointwise convolutional layer and the entries in the kernel K of the depthwise convolutional layer are manipulated.

With those new values, the cycle is repeated for the very same image and the resulting tensor T' with entries $T'_{qrba}$ is provided to the loss function and compared to the correct bounding boxes, the result of which being then provided to the optimizer 407 which, once again, modifies the weights.

This procedure is performed as long as the difference between the resulting tensor $T^{(n)}$ and specifically the identified bounding boxes compared to the predefined bounding boxes of item 408 exceed a given threshold which, in essence, corresponds to the identification accuracy that is intended.

After that, the next input image 402 is taken from the training data 401 and the corresponding bounding boxes are provided to the loss function. Then, the process explained is repeated again for the new image and the optimal weights for the pointwise convolutional layer and the depthwise convolutional layer are obtained. This is repeated until a specific combination of weights results in appropriate identification accuracy for all input images. The combination of weights that is then obtained is output as final weights 410.

These final weights are then introduced into the application that executes the inventive method at least with respect to the identification step on the mobile device.

Therefore, in the concept of the present invention, the neural network that is provided to the mobile device is already fully adapted to the identification of specific objects carrying a biometric characteristic, such as fingertips and can thus be employed without any further learning being required which further reduces the computer resources required at the mobile devices.

In total, by using the pointwise convolutional layers, the depthwise convolutional layers and the batch normalizers as well as the rectified linear units as explained above with reference to FIGS. 4 and 5 and by using the separation of the original image into grid cells and identifying the corresponding bounding boxes in line with the description of FIG. 4, an application can be provided that is smaller than one megabyte, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate identification results of the fingertips which can be used for later on performed identification of the user by the fingerprints associated with the fingertips, as explained previously.

The above explanations focused on images of a hand or fingers that show the side of the fingers that carries the fingerprints. However, a user might also accidently or willingly present one or more fingers from the other side, i.e. the backhand, to the optical sensor. From such an image of a finger, a fingerprint cannot be extracted as it is not visible.

In order to distinguish an image of a fingertip that carries the fingerprint from an image of a fingertip that shows not the fingerprint but the nail or knuckles, the following procedure can be used that can extend the above explained methods to increase the identification accuracy.

In the above examples, the bounding box was characterized by the vector $$b = \begin{pmatrix} x \\ y \\ b_f \\ h_f \\ p \end{pmatrix}$$

and the training was done using only images of fingers showing the side of the fingertips that carry the fingerprints.

When allowing images to be taken from both sides of the fingertips (i.e. the side bearing the fingerprint and the side bearing the nail or knuckles), it is advantageous to consider two classes of objects identified in images, namely those objects that constitute fingertips showing fingerprints and those objects that constitute fingertips showing nails or knuckles.

In this case, the vector mentioned above may be extended by one dimension c such that $$b = \begin{pmatrix} x \\ y \\ b_f \\ h_f \\ p \\ c \end{pmatrix}$$

where c represents a so called class. A first class may represent positive identification (a fingertip with a fingerprint can be identified) and the second class may represent a negative identification (the fingertip carries a nail or knuckle). The class may be represented by values, for example 1 for positive identification and 0 for negative identification. It is clear that, in contrast to the remaining values in the vector b, the class is a discrete value and can only take a limited number of different values corresponding to the number of classes.

The training mentioned above may then be performed in a manner that the neural network is provided with positive and negative identifications (instead of only the training data showing images with fingertips carrying fingerprints and bounding boxes 408) in order to be able to distinguish between images belonging either to the first or to the second class. In this context, one can imagine a plurality of images of fingers that show anything but not the fingerprint. All such "objects" may be categorized in the second class (i.e. negative identification) such that the neural network is trained to distinguish images of fingertips carrying fingerprints from "any other" images of fingertips. The bounding boxes provided for training will, of course, also comprise the correct class c in order to allow for properly training the network.

In order to identify all fingertips in an image that carry fingerprints, the process described above will neglect all bounding boxes that represent the position of a fingertip and which are considered to belong to the second class (i.e. negative identification), thereby preventing further processing of images or portions of images of fingertips that do not show the biometric characteristic.

Aspects of the Invention Regarding the Liveliness-Detection Operation and the Comparison Operation According to Some Embodiments After having described the identification step with respect to FIGS. 2 to 7, the liveliness-detection step and the comparison step mentioned in FIG. 1 in steps 3 and 4 will be described in further detail. Reference will also be made to a neural network. It is understood that the neural network used here may be the same as the one used in the identification-step. However, it can also be a different neural network, residing separately on the mobile device. It is noted that also the liveliness-detection step and the comparison step or at least one of them can also be performed without using a neural network. However, using a neural network may be advantageous as neural networks show to have superior ability in distinguishing real objects from spoofs of these objects. While reference is thus made to neural networks below, also other realizations are possible within the merits of the invention.

In any case, the methods described in this section are performed after step 2 in FIG. 1. They combine with each and every embodiment described with respect to FIGS. 2 to 7.

Figure 8:
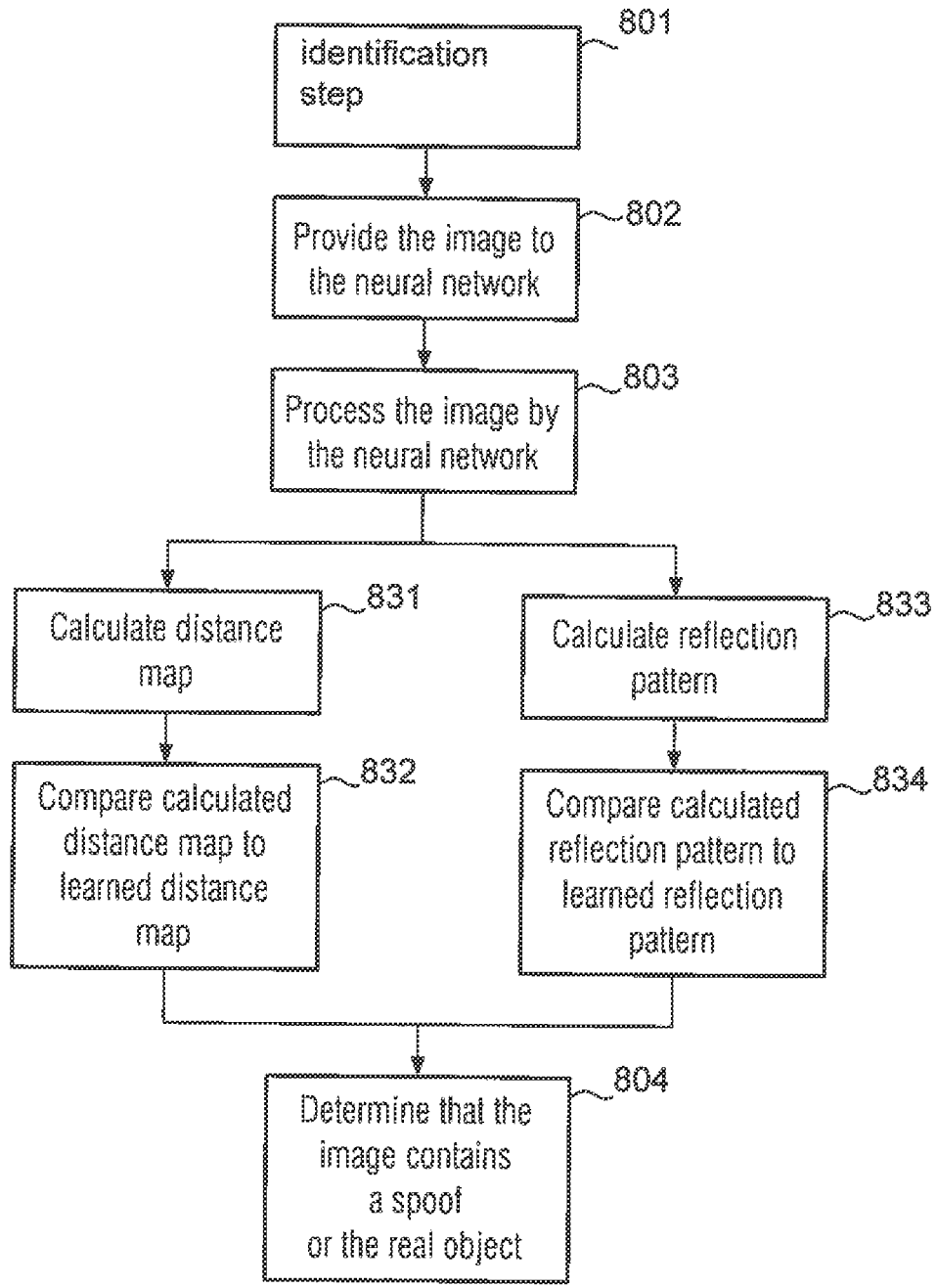
FIG. 8 shows a schematic representation of the processing of an obtained image, according to some embodiments.

FIG. 8 shows a flow diagram of the processing of an obtained image including the taking of the image.

In the first step 801, the identification step is performed or has been performed according to one of the above-described embodiments. It will not be described in further detail here but is only provided for explanatory and contextual purposes.

The image taken is then provided to a neutral network in step 802. This means that a data structure corresponding to the image, like a plurality of pixels having, for example, color values associated therewith, is provided to a neural network. The neural network resides on the mobile device by which the image was taken In the next step 803, the image is processed by the neural network. This can mean that either the complete image is processed or a reduced or otherwise manipulated or modified version of the image is processed. For example, if the image is taken in high definition (HD) quality, it may first be reduced to a lesser number of pixels (for example 512×512 or 256×256 or 224×224 pixels) depending on how many pixels are necessary in order to determine an accurate identification of whether the image shows a spoof or the real three-dimensional object. In this regard, step 803 can comprise the "preprocessing" of the image comprising for example the reduction of the number of pixels or any other preprocessing (for example changing the lighting conditions of the image or the like) that is deemed necessary.

However, this step can also be performed between the step 801 and step 803 of processing the image by the neural network at any suitable point. For example, the manipulation of the image or the preprocessing of the image can be performed immediately after having taken the image (and thus even before the identification step which could also make use of the preprocessed image) and before providing the image to the neural network in step 802 or it can be provided between providing the image to the neural network in step 802 and the actual beginning of the processing of the image by the neural network in step 803 comprising the steps 831 to 834 and the final step 804.

In any case, a data structure corresponding to the original image is now processed in step 803 and the following step 831 to 834.

The processing of the image by the neural network in step 803 can be split in two distinct processings of the image. The first refers to the calculation and processing of a distance map (steps 831 and 832) where the other refers to the calculation and further use of a reflection pattern.

Starting with the distance map. In step 831, a distance map is calculated where the distance map associates each pixel with a calculated distance of the portions of the real world this pixel constitutes or represents within the image of the optical sensor of the mobile device. Assuming, for example, a user holds his hand in front to the optical sensor in order to take an image of the hand, the distance map will comprise calculated distances for at least some pixels that correspond to the distance of the hand to the optical sensor and potentially other distances that are calculated but correspond to different objects within the image, for example a TV that is positioned within the background of the image taken or a house in the landscape constituting the background within the image taken. Therefore, there will be varying distances for pixels constituting or representing different objects within the real world from which the image was taken.

The calculated distance map is, in a next step 832, then compared to a learned (also called "known") distance map of the neural network. The learned distance map can be split, in some embodiments, into at least two distance maps wherein a first learned distance map corresponds to a distance map that refers to images of real objects taken whereas a second learned distance map corresponds to a distance map for an image taken from a two-dimensional spoof of the object. The first will differ from the later in that the first shows varying distances over the whole range of the image whereas the second will have a smooth change of the distance associated with each pixel when moving from a first pixel to the second pixel. This is because in case a two-dimensional spoof (i.e. for example, an image of the real object on paper) is hold in front of the optical sensor when taking the image, the distance of the pixels to the optical sensor can be calculated in accordance with the distance of a given point (the optical sensor) to a plane with arbitrary relative arrangement to the optical sensor (angulation), thus not showing any discontinuities.

The comparison may be done completely within the neural network, e.g. as part of the processing of the image within the neural network, although it might also be possible to think of other realizations, where the comparison is done completely outside the neural network or by using additional software or hardware together with the neural network when comparing the obtained and calculated distance maps and reflection patterns, respectively.

From this comparison, a result is obtained that is later used in step 804.

In the other flow, step 833 firstly comprises calculating a reflection pattern representative of light reflection associated with a plurality of pixels constituting at least a portion of the object within the image. The light reflection pattern may, for example, associate a value of brightness with each pixel within the image obtained. This value of brightness likewise corresponds (like for the distance map) to the actual brightness of the real situation from which the image was taken rather than to the brightness of the pixels, as the pixels are only data structures representing the real situation. In order to appropriately calculate the reflection pattern, in some embodiments the image is taken in step 801 by a camera of the mobile device using the flash of the camera. Thereby, portions of the real situation from which the image is taken that are near to the optical sensor will be comparably bright and reflect a significant amount of incident flash whereas more distant portions within the real situation or portions of objects that are tilted with respect to the optical sensor will reflect less of the flash and will, therefore, look comparably darker. Because of the flash is a light source approximately in the form of a point, the calculation of the reflection pattern when using the flash is much more accurate compared to the reflection pattern that can be obtained when only using the actual ambient light conditions because the ambient light is not a light source in the form of a point.

In the next step 834, like in the step 832, the calculated reflection pattern is compared to a learned (also called "known") reflection pattern of the neural network. Like in step 832, the neural network may have two learned reflection patterns where the first learnt reflection pattern corresponds to images of real objects taken whereas the second refers to a reflection pattern of a two-dimensional spoof. This comparison provides a result that is later used in step 804.

Irrespective of whether the processing of the image was done by following steps 831 and 832 or steps 833 and 834 or performing even all of these steps, it is finally determined in step 804 whether the image taken by the optical sensor contains or comprises a two-dimensional spoof of a real object or whether it comprises the real object. This determination is, according to the invention, done based on the outcome of the comparison in either step 832 and/or step 834. Accordingly, the result of those steps may include a number or any other information that can be used to later on determine whether there is shown a spoof or a real object within the image.

Based on this comparison and its outcome, i.e. whether the image is a spoof of the real object or the real object, the method described in FIG. 1 can then continue with either step 5 or step 7 as was already explained in FIG. 1.

As will be explained later, the neural network will comprise a plurality of layers including one last layer. In one embodiment, the last layer according to the invention can comprise a first and a second node where the first node provides an output that ranges from $-\infty$ to $+\infty$ regarding a real objection being determined during the comparison step in step 832 or 834 whereas the second node provides an output ranging from $-\infty$ to $+\infty$ for a spoof being identified during the steps 832 and/or 834.

For example, the output values may represent the sum of the differences constituting the obtained distance map and the learned distance matrix. Assuming the obtained distance map could be represented as a number of distances corresponding to specific pixels ij (i-th row, j-th column of the image) O and the learned distance map is L with each having entries $O_{ij}$ and $L_{ij}$. Then, the result D=L−O would have entries $d_{ij}$. By calculating the sum $\Sigma_{ij} d_{ij}$, an output can be provided as one example of the nodes in the last layer. A first output will correspond, e.g. to the structure L of a learned distance map for a real object and second output by the second node to the structure L of a learned distance map corresponding to a spoof. The same, of course, holds for the reflection pattern.

While the above explanation might give the impression that O, L and D would be structures like commonly known matrices with respective entries, it will usually not be possible to represent the distance maps and reflection patterns (either learned or obtained) in the form of a regular matrix. This is because the distance maps are obtained while the image is processed within the neural network itself, thus not allowing for a simple representation in the form of a matrix. However, for ease of explanation, it might be assumed that O, L and D could be represented in the form of a matrix in order to give this procedure a context that can more easily be visualized.

With such values (like the sum $\Sigma_{ij} d_{ij}$), it is not easily possible to determine whether the output of the first node or the second node constitutes a real object or a spoof of the real object. Therefore, in some embodiments, some normalizations are performed in order to allow for a determination of whether or not there is shown the real object on the image or a spoof of the object.

In order to achieve this, the output values of the first node and the second node denoted with $x_i$, where i=1 for the first node and i=2 for the second node are first reduced to a value $S(x_i)$ where $$S(x) = \frac{e^x}{1+e^x}$$

While these values are smaller than 1 already, they do not necessarily sum up to 1, thereby not necessarily allowing for making statistical or probabilistical decisions.

In order to allow for such a decision, it is assumed that the probability of finding a spoof of an object or a real object within the image obtained sums up to 1 because either the spoof or the real object must be on the image. In view of this assumption, the calculated values $S(x_i)$ are now further processed in order to obtain values $\sigma(S(x_i))$ with the following normalization function:

$$\sigma(S(x_j)) = \frac{e^{S(x_j)}}{\Sigma_i e^{S(x_i)}}$$

The values $\sigma(S(x_j))$ will sum up to 1 in any case because the function above constitutes the calculation of a norm of a vector and is known as the soft max function.

With the values $\sigma(S(x_1)) \equiv \sigma_1$ and $\sigma(S(x_2)) \equiv \sigma_2$, statistical and probabilistical statements are possible.

Therefore, the results of this calculation $\sigma_1$ and $\sigma_2$ can be used for the determining step 804 of FIG. 8. If $\sigma_1$ which constitutes the probability that the image shows a real object is greater than 0.5 (corresponding to $\sigma_2 < 0.5$) the determination will result in the statements that the image shows a real object whereas, if $\sigma_2 > 0.5$ (corresponding to corresponding to $\sigma_1 < 0.5$) the determination will be that the image shows a spoof of the real object.

Though not explicitly shown in FIG. 8, further steps can follow the determination step 804. For example, the determination of whether a real object or a spoof of a real object is shown on the image can be used to, for example, trigger further steps like an indication to the user or another entity that the image taken shows a spoof of a real object and can, for example, thus not be used for identifying the user in a log in procedure or other security relevant process like performing a bank transfer. On the other hand, if the determination is in the affirmative, i.e. the image shows the real object, a further process can be triggered that identifies the user based on user specific information that can be obtained from the real object. This can, for example, comprise processing the image of the real object further. If, for example, the real object is a hand or a fingertip, biometric characteristics like the finger print can be obtained from the image and can be used in identifying the user and, for example, performing a log in procedure or other process where this biometric characteristic is used.

Figure 9:
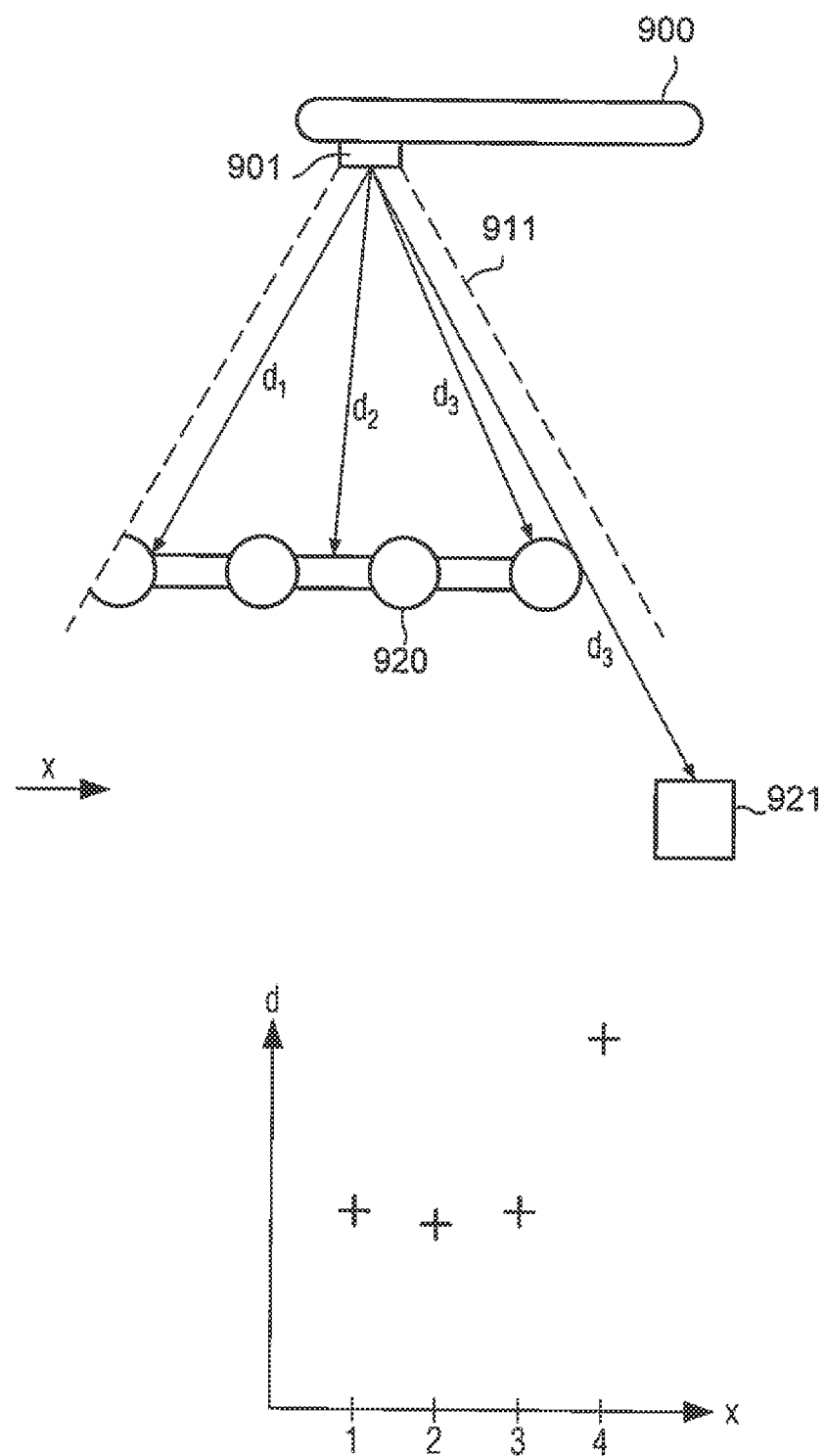
FIG. 9 shows a schematic depiction of the relation between pixels within an image and the distance of the real object to the optical sensor, according to some embodiments.
Figure 10:
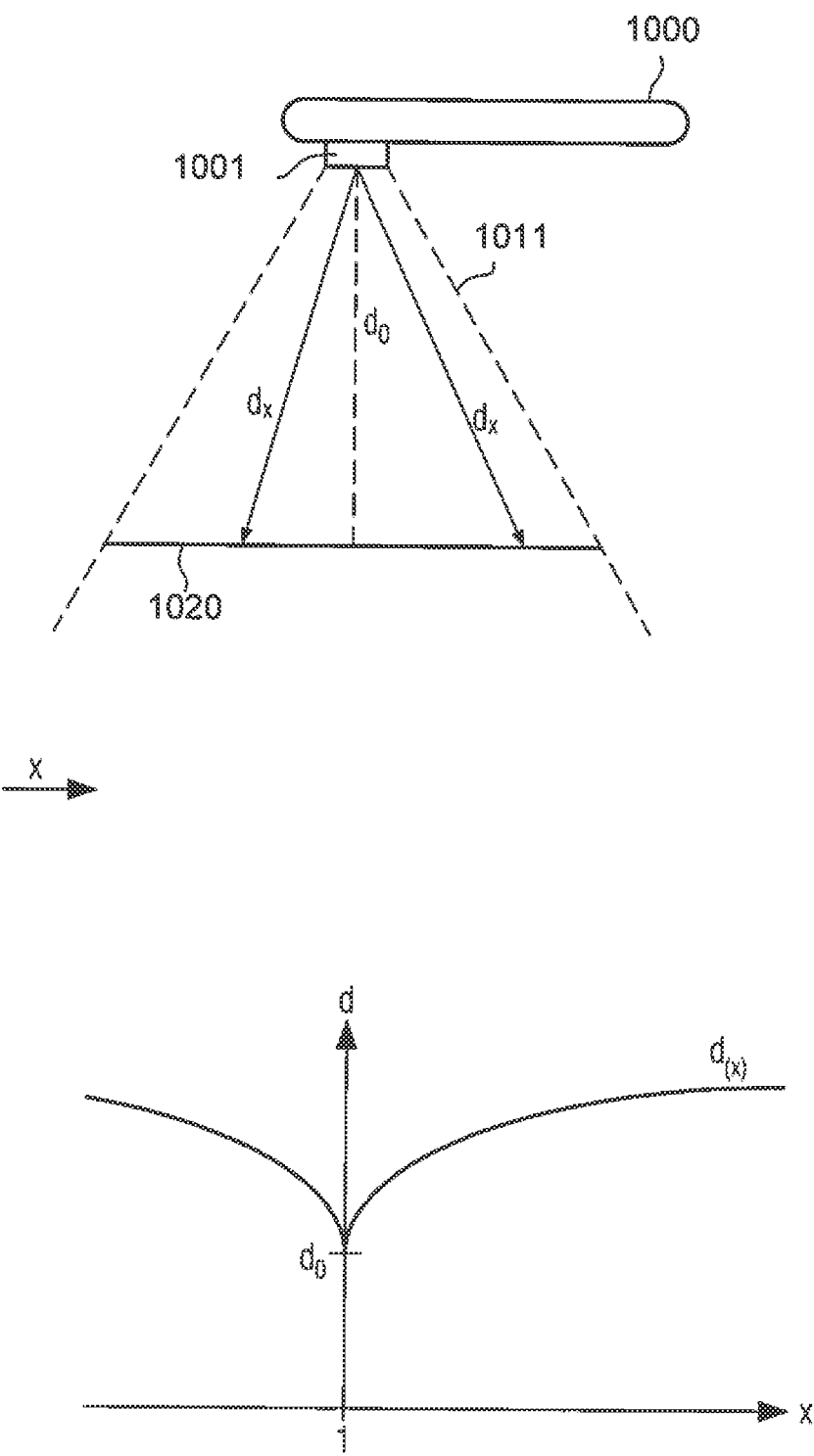
FIG. 10 shows a schematic depiction of how the light reflection pattern is determined, according to some embodiments.

FIGS. 9 and 10 show a schematic depiction of how the distance map will exemplarily look like for an image being taken from a real object and an image being taken from a spoof of the real object. As explained above, the distance maps and the reflection patterns can usually not be represented in the form of a matrix. However, for explaining the concept of obtaining the distance maps and reflection patterns, it will be assumed that it would be possible to have a 1 to 1 mapping between pixels and their associated distances/reflection properties. For explanatory purposes, this might be considered to, somehow, refer to a representation of the distance map and reflection patterns in the form of a matrix.

In this regard, FIG. 9 shows the situation where the image is taken from a real object using a mobile device 900 with an optical sensor 901 having a field of view 911 under which the image is taken. The depiction in FIG. 9 is a two-dimensional cross section of the real three-dimensional situation that would be viewed by the optical sensor in the real world. The real object from which the image is intended to be taken is the object 920 whereas, occasionally, additional objects may be present in the field of view 911 of the optical sensor, like the object 921. The image obtained from the shown two-dimensional arrangement will be a one-dimensional arrangement of pixels (corresponding to the image taken from the real three-dimensional situation being a two-dimensional image), where those pixels are arranged in the indicated direction x. For each pixel in the image, for example, the pixels with the indication 1, 2, 3 and 4, a distance will be calculated. For a real situation, this will result in the distance map also given in FIG. 9. As can be seen, the distance of real objects varies in an arbitrary manner and cannot be easily calculated using a function only depending on a limited amount of parameters because the arrangement of the real objects with respect to the optical sensor and the three-dimensional structure (in the depiction of FIG. 9, the two-dimensional structure) of the object is usually unknown.

In contrast to this, FIG. 10 shows the case where an image of the real object (i.e. a two-dimensional spoof) is hold in front of the optical sensor. In the shown example, it is once again assumed that the situation obtained by the optical sensor is represented by a two-dimensional situation and the "image" obtained is, thus, one-dimensional as already explained with respect to the case in FIG. 9.

For simplicity of explanation, it is further assumed that the image is hold with respect to the optical sensor 1001 such that it is in parallel to the mobile device 1000 to which the optical sensor is attached. Furthermore, again for ease of explanation, it is assumed that the (two-dimensional) image of the spoof 1030 is provided as perfect plane in front of the optical sensor.

In this case, there exists a point within the field of view 1011 of the optical sensor 1001 that has the shortest distance $d_0$ from the optical sensor. Any other point within this image will have a distance $d_x$ where this distance is given by $d_x = \sqrt{x^2 + d_0^2}$ such that the shown graphical representation of the distance map according to FIG. 10 can be obtained when assuming that the origin of the coordinate system with respect to the x direction is the point with the smallest distance $d_0$ to the optical sensor.

As can be seen in FIG. 10, this distance map corresponding to pixels of the (one-dimensional) image obtained only depends on the distance of a given point in the image from the origin and the minimum distance $d_0$ and can thus be calculated using the above formula.

Therefore, it is clear that a distance map of a real object or a real situation obtained by the optical sensor will significantly differ from a distance map of a two-dimensional spoof because the distance map of the two-dimensional spoof can be obtained by calculating the value of a function that has a limited number of parameters.

The same is true for the calculated reflection pattern, though this cannot be easily imaged in the manner as was done with respect to the distance map.

However, from the above explanations with respect to the distance map calculated, it also becomes clear that, for each pixel in the image taken, it is possible to calculate a reflection value or a brightness value or any other value that is associated with lighting conditions corresponding to the real situation. In case the real situation is again a two-dimensional spoof of the real object as explained in FIG. 10, the reflection pattern (more easily explained with respect to the light intensity) will also vary in line with the above formula or at least depending on the above formula because the intensity of light obtained from a given point in first order approximation is reciprocally dependent on the square of the distance.

For a situation showing a real object among a plurality of other objects (like in FIG. 9), the reflection pattern will thus be a very complicated structure whereas, for the case that a two-dimensional spoof is shown to the optical sensor, the reflection pattern can be easily calculated using a function with a limited number of parameters.

The same will be the case for the learned distance maps (or reflection pattern) corresponding to real objects and the learned distance maps corresponding to two-dimensional spoofs of objects as are known to the neural network. Therefore, the neural network can make a reasoned determination on whether the image obtained shows a real object or a spoof of this object by comparing the learned distance maps (and, of course, reflection patterns) with the obtained distance maps and reflection patterns.

In order to simplify the calculation of the distance map and the reflection pattern, respectively, and in order to reduce the computer resources required for the determining step 804, the learned distance map and learned reflection pattern will usually be provided in the neural network in the form of a data structure where each entry constitutes the learned behavior of the distance or the corresponding reflection pattern.

Likewise, the obtained or calculated distance map and the obtained reflection pattern can be provided in the form of a data structure where each entry constitutes the distance (or the reflection pattern, respectively) in the obtained image.

For both, the learned and the calculated distance maps and reflection patterns, this might even be the case on a pixel per pixel basis, i.e. each entry in the respective data structures corresponds to a learned/calculated distance or reflection pattern of a specific pixel.

This, of course, requires that there is an association between the position of pixels within the obtained image and entries within the data structure. This is achieved by using the arrangement of pixels themselves within the image as the basis for calculating the data structure. This means that the data structure used for the distance map (named for example L) and the reflection pattern (named for example Y), respectively, is built up in line with the obtained image. If, for example, the image comprises 512×512 pixels per color value (i.e. 512×512×3), the distance map and the reflection pattern will be data structure of size 512×512 entries (not necessarily representable as a matrix with 512×512 entries) where each entry corresponds to one pixel in the obtained image (for one color value). The same holds for any other resolution of images.

Figure 11:
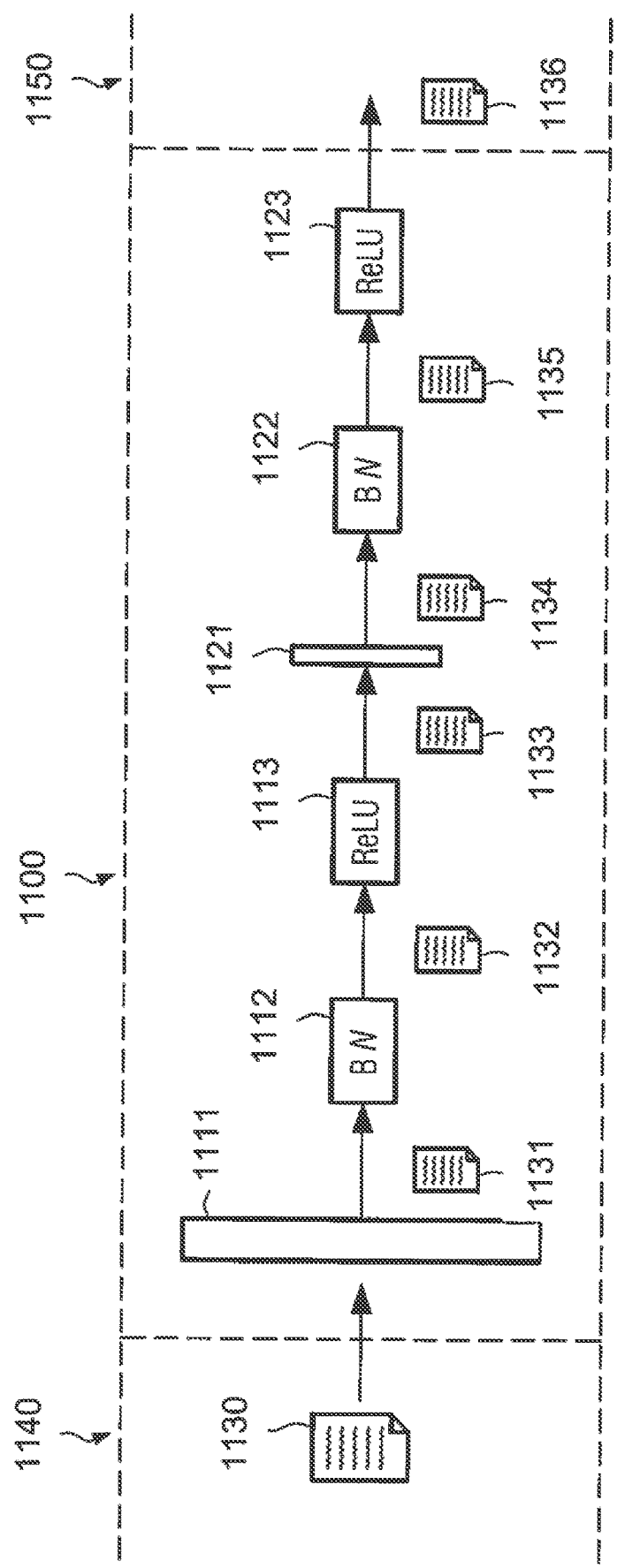
FIG. 11 schematically shows the structure of one layer within the neural network and the processing of data within this layer during the liveliness-detection operation, according to some embodiments.

FIG. 11 shows the internal processing of a received input image in one layer 1100 of the neural network according to one embodiment of the invention. The input image may either be the original image or an HSV converted data structure obtained from the original image. In fact, the data structure provided to the neural network more likely is a matrix corresponding to the input image after conversion into the HSV color space, as this more appropriately shows the luma values of the pixels, rather than the color values. This can result in more efficient calculation of the distance map and reflection pattern.

This layer 1100 may be a layer that is, in processing order of the original input image through the neural network, the first layer that receives the original input image after step 802 explained above or any intermediate layer that is arranged between two further layers 1140 and 1150 of the neural network or the layer 1100 may even be the last layer of the neural network that will, in the end, provide an output according to step 804 as explained with reference to FIG. 8. In the last case, the layer will have two output nodes as explained above to provide a corresponding output for spoof identification and identification of a real object within the image.

In any case, the layer 1100 will receive an input 1130 that at least somehow corresponds to the originally obtained image. This input may be provided in the form of at least one matrix that has the dimension N×M where N and M are integers greater than 0. The matrix may, for example, represent the pixels in the image for at least one color value (for example red) or the HSV converted image. The entries in this matrix thus may have values that correspond to the value of the respective color (in the example case red) of this specific pixel or its luma value. As will be clear from the following, the input may not be identical to the obtained image but can be a matrix P that was obtained from the matrix representing the original image by some processing through layers in the neural network or even by some pre-processing (for example reduction in resolution as explained above).

For ease of discussion, however, the input 1130 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 11, the input 1130 is received by the depthwise convolutional layer 1111 for processing. In the following, a comparably simple example will be given with respect to how the input matrix 1130 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix I (i.e. the input matrix 1130) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w) \times (M+2P_h)$. In view of this, the matrix Z will have the following entries:

$$Z_{cd} = \begin{cases} 0 \ \forall \ c \leq P_w \\ 0 \ \forall \ c > P_w + N \\ 0 \ \forall \ d \leq P_h \\ 0 \ \forall \ d > P_h + M \\ I_{ij} \text{ where } c = i + P_w; d = j + P_h; i = 1 \ldots N; j = 1 \ldots M \end{cases}$$

In this context, it follows that the new matrix obtained by calculating all inner products and arranging them properly according to lines and rows will generally be of size $$\left(\frac{N-S+2P_w}{W_w}+1\right) \times \left(\frac{M-T+2P_h}{W_h}+1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ may be smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straightforward with the teaching provided below.

In the depthwise convolutional layer 1111, the received input matrix 1130 is used to form an inner product with the kernel K that has the size S×S where S<N, M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix $(N \times M)_S$ is comprised of nine entries and the inner product with the kernel K is calculated which results in a single number. The next reduced matrix in the directions of the lines of the original N×M matrix is the matrix where i is increased by 1, such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size $(N \times M)_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries $P_{ij}$ correspond to the respective inner product calculated with the corresponding reduced matrix of the original N×M matrix and the kernel K. It is noted that a matrix of this size will, in fact, be forwarded to the pointwise convolutional layer of the layer 1100.

The kernel K constitutes entries that are obtained through a learning process where the neural network is trained in order to properly identify the intended objects, i.e. distinguish between spoofs of objects and the real objects. The kernel K used in the layer 1100 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 1130 by the depthwise convolutional layer is the matrix 1131 having, as explained above, size (N−S+1)×(M−S+1) in case the kernel is moved in strides over the original N×M matrix that have a distance of Δi=1 in the direction of the lines Δj=1 in the direction of the rows. In case, however, those strides have a larger distance like Δi=2 or Δi=3 (and potentially, correspondingly for the rows), the dimension of the result 1131 will change correspondingly as explained above.

In the further processing, this result 1131 is forwarded to the first batch normalize 1112 that follows in the processing order depicted with the arrows in FIG. 11 after the depthwise convolutional layer 1111. The batch normalizer attempts to normalize the received result matrix 1131. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1)(denoted as P in the following, with corresponding items $P_{ij}$ matrix is given as $$V = \frac{\sum_{ij} P_{ij}}{n \cdot m}$$

where n and m represent the number of lines and columns/rows in the N×M matrix or the number of lines and columns in the matrix P. The items $P_{ij}$ are the entries of the matrix P where a given item $P_{ij}$ is the element in the matrix in line i and column j.

The batch normalizer then calculates a reduced matrix P' by subtracting, from each entry $P_{ij}$ in the original matrix, the mean value V such that $P'_{ij}=P_{ij}-V$. Thereby, the values in the reduced matrix P' are normalized such that anomalies in the one or the other direction (extremely large values or extremely low values) are filtered out. It is also contemplated that the item $P'_{ij}$ is calculated by dividing the term $P_{ij}-V$ by the standard deviation corresponding to the mean value V.

The result 1132 created by the first batch normalizer 1112 is a matrix still having (in the example given in FIG. 11) the size (N−S+1)×(M−S+1) since, until now, no further dimensional reduction of the matrix was performed.

The result 1132 is then provided to the first rectified linear unit 1113 that follows the first batch normalizer 1112.

The rectified linear unit modifies each entry in the matrix 1132 further by calculating new matrix entries $\overline{P}_{ij}$ where $$\overline{P}_{ij} = \begin{cases} 0 \forall P'_{ij} < 0 \\ P'_{ij} \forall P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 1133 thus output by the first rectified linear unit 1113 still is a matrix of shape/size (N−S+1)×(M−S+1) and this matrix is forwarded to the pointwise convolutional layer 1121.

This pointwise convolutional layer 1121 creates a result 1134. This result 1134 is created by the pointwise convolutional layer 1121 by taking each entry in the (N−S+1)×(M−S+1) matrix 1133 and multiplying this entry with a weight α. α may be a number that is greater than 0 in any case and this number is identical for each entry in the (N−S+1)×(M−S+1) matrix. The result 1134 that is obtained from the pointwise convolutional layer 1121 thus is a matrix having the same size (N−S+1)×(M−S+1) but where each entry is multiplied with the weight α.

The result 1134 is then provided to the second batch normalizer 1122 where it is normalized in the manner as explained for the first batch normalizer 1112 and a normalized matrix P' of the same dimension as the result 1135 is calculated and this matrix/result 1135 is forwarded to the second rectified linear unit 1123 where a rectification function is applied to obtain a result/matrix $\overline{P}$ 1136 that is then forwarded to the next layer in the neural network or, if no other layer follows in the neural network, the result 1136 is provided as an output.

Figure 12:
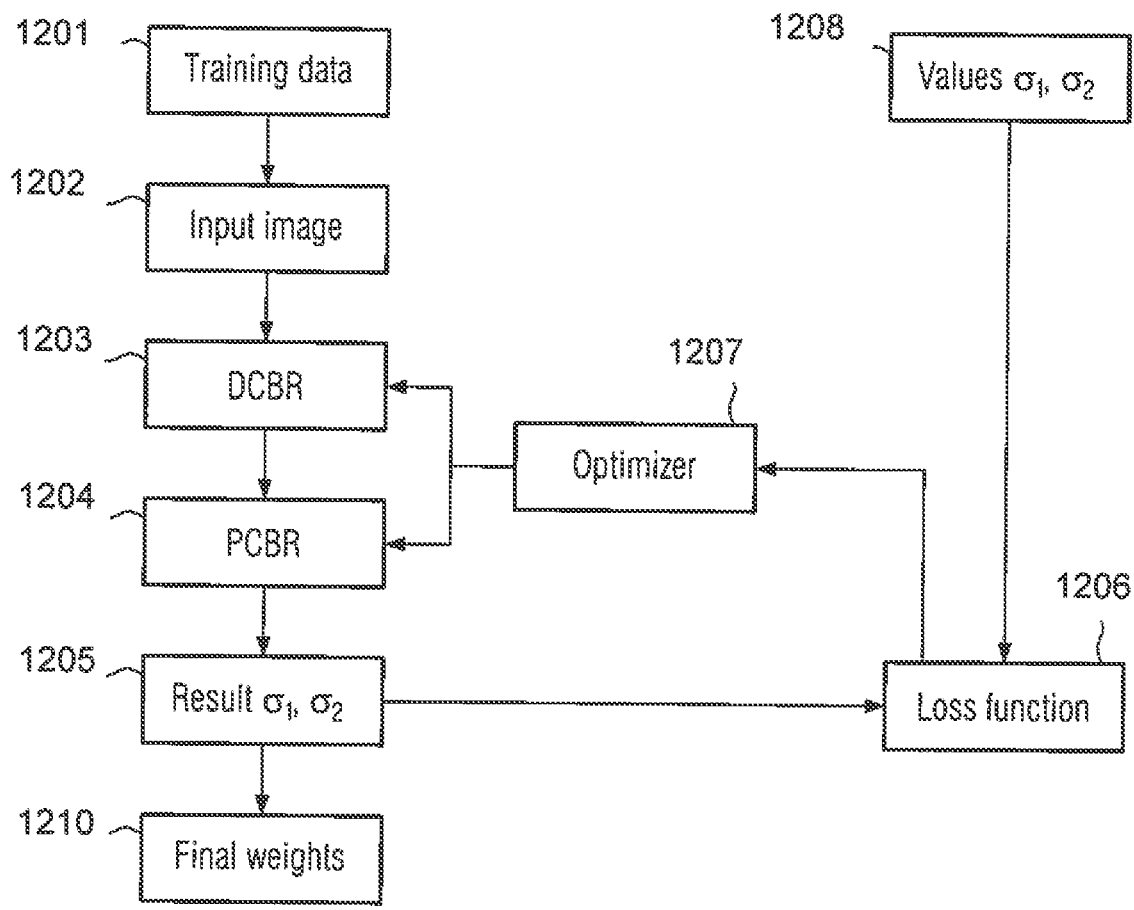
FIG. 12 shows the process of training the neural network used in the liveliness-detection operation, according to some embodiments.

In FIG. 12, an explanation will now be given how the neural network can be properly trained such that the weights of the kernel K and the weight α explained with respect to FIG. 11 as well as the patterns that indeed identify a real object or a spoof of the real object are learned by the neural network.

The method of FIG. 12 begins with the provision of training data 1201. The training data may be constituted by a plurality of images of real objects as well as images of spoofs of real objects. For example, the images may comprise a number of images of real hands or fingers or the like and images of images (i.e. spoofs) of those objects. The images may be multiplied by using, from the same image, rotated, highlighted, darkened, enlarged or otherwise modified copies that are introduced as training data. In some embodiments, modifications involving image flips, image rotation and translation, shears, crops, multiplication to increase brightness and Gaussian blurs may be used to obtain a larger number of training images. Arbitrary combinations of the mentioned techniques may also be used. The values $\sigma_1$ and $\sigma_2$ provided according to item 1208 are the values indicating the "correct" output of the first node and second node of the last layer in the neural network that provide the probability of the image showing a spoof of an object or a real object. These values are provided for each image in the training data.

In the next step, one specific input image 1202 is provided to the neural network in a training environment where, in addition to the neural network, an optimizer 1207 and a loss function calculator 1206 are provided.

The input image is, in a first round, processed using the depthwise convolutional layer and the first batch normalizer as well as the first rectified linear unit 1203, summarized as DCBR, and is then transferred to the pointwise convolutional layer, the second batch normalizer and the second rectified linear unit, summarized as PCBR, where they are processed in line with the description given in FIG. 11. This means the steps or the sections 1203 and 1204 depicted in FIG. 12 are run through a number of times, like thirteen times, as described with reference to FIG. 11 using, in each section 1203 and 1204 the corresponding weights for the pointwise convolutional layer (PC) and the kernel K of the depthwise convolutional layer (DC). The first and second batch normalizers as well as the rectified linear units of items 1203 and 1204 work in the manner as explained above with respect to FIG. 11.

As a result, in line with the above description, values $\sigma_1$ and $\sigma_2$ are obtained. This result will then be provided to the loss function where it will be compared with the preset values $\sigma_1$ and $\sigma_2$ provided in 1208 in order to identify the differences between the result 1205 and the correct values $\sigma_1$ and $\sigma_2$. This difference obtained by the loss function 1206 is then provided to the optimizer 1207 which, in turn, will modify the weights of each pointwise convolutional layer and each depthwise convolutional layer, i.e. a and the entries in the kernel K. This means that, either for all layers in the network at once or for each layer in isolation, the weight a of the pointwise convolutional layer and the entries in the kernel K of the depthwise convolutional layer are manipulated.

With those new values, the cycle is repeated for the very same image and the resulting values $\sigma_1$ and $\sigma_2$ are provided to the loss function and compared to the correct values $\sigma_1$ and $\sigma_2$, the result of which being then provided to the optimizer 1207 which, once again, modifies the weights.

This procedure is performed as long as the difference between the resulting values $\sigma_1^{(n)}$ and $\sigma_2^{(n)}$ (where n constitutes the n-th iteration of these values) to the values $\sigma_1$ and $\sigma_2$ of item 408 exceed a given threshold which, in essence, corresponds to the determination accuracy of spoofs and real objects that is intended.

After that, the next input image 1202 is taken from the training data 1201 and the corresponding values $\sigma_1$ and $\sigma_2$ are provided to the loss function. Then, the process explained is repeated again for the new image and the optimal weights for the pointwise convolutional layer and the depthwise convolutional layer are obtained. This is repeated until a specific combination of weights results in appropriate identification accuracy for all input images. The combination of weights that is then obtained is output as final weights 1210.

These final weights are then introduced into the application that executes the inventive method on the mobile device. In fact, by this method, it is possible for the neural network to learn specific distance maps and reflection patterns that show a real object or a spoof of the real object. The method described in FIG. 12 can thus be performed with input that is used for learning distance maps or reflections patterns alike.

It is also possible to provide, in addition to the values $\sigma_1$ and $\sigma_2$ or in combination, the correct distance maps and reflection patterns corresponding to the images. In this case, the output of the neural network in step 405 will not only be the respective values $\sigma_1^{(n)}$ and $\sigma_2^{(n)}$ but also a distance map and/or a reflection pattern to compare with the preset distance map and/or reflection pattern obtained via the input 1208.

Therefore, in the concept of the present invention, the neural network that is provided to the mobile device is already fully adapted to the determination whether an image shows a real object or only a two-dimensional spoof of the real object.

In total, by using the pointwise convolutional layers, the depthwise convolutional layers and the batch normalizers as well as the rectified linear units as explained above with reference to FIG. 11, an application can be provided that is smaller than one megabyte, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate determinations of real objects that can be used for later on performed identification of the user by, for example, extracting biometric characteristics from an identified real object in order to use this biometric characteristics for further security-related processes.

Aspects of the Invention Regarding the Cropping Operation According to Some Embodiments This part of the description focusses on an additional step for specifically extracting a region of interest from the original image obtained and processed during the steps described above and before data comprising the biometric characteristic is sent to the third party computing device. In fact, with the embodiment now described, one embodiment of obtaining image data that only comprises the region of interest, like the fingertip carrying the fingerprint of interest, is described.

This embodiment focuses on the extraction of a region of interest (ROI) from an image taken from an object of the user, where the image comprises a biometric characteristic that could be used to identify the user, but could also be used for any other purpose on the third party computing device. Such an object can be anything like a fingertip of one or more fingers of a hand of the user, the palm creases of a hand of the user or the face of the user or even the eye or the foot of the user. Each of these entities is known to carry biometric characteristics that can be used for identifying a user. For example, the fingerprint of a user is commonly known to be usable for identifying the user when using fingerprint scanners or taking ink images of one or more fingerprints of a potentially criminal person. While, in the following, a fingertip and a fingerprint will be used as explanatory examples, this is not to be construed as limiting the invention in any way. Instead of the finger and the fingerprint (more specifically, the minutia within the fingerprint), any other object mentioned so far and any other biometric characteristic can be used.

The embodiment described now will be referred to as a "cropping step" which separates a part of an image from another part of the image. This method is performed on the image that was already obtained during step 1 of the method according to FIG. 1. The step may occur after the identification step 2 and after the liveliness-detection and comparison steps 3 and 4. However, it can also occur in parallel to steps 3 and 4 or immediately after step 2. In some embodiments, it does not occur before step 2 since, in step 2 of FIG. 1, it is just determined whether there is an object carrying a biometric characteristic in the image at all. Processing the image in line with the embodiment to be described now would thus not be reasonable and potentially a waste of resources if it were performed before step 2 in FIG. 1.

Figure 13:
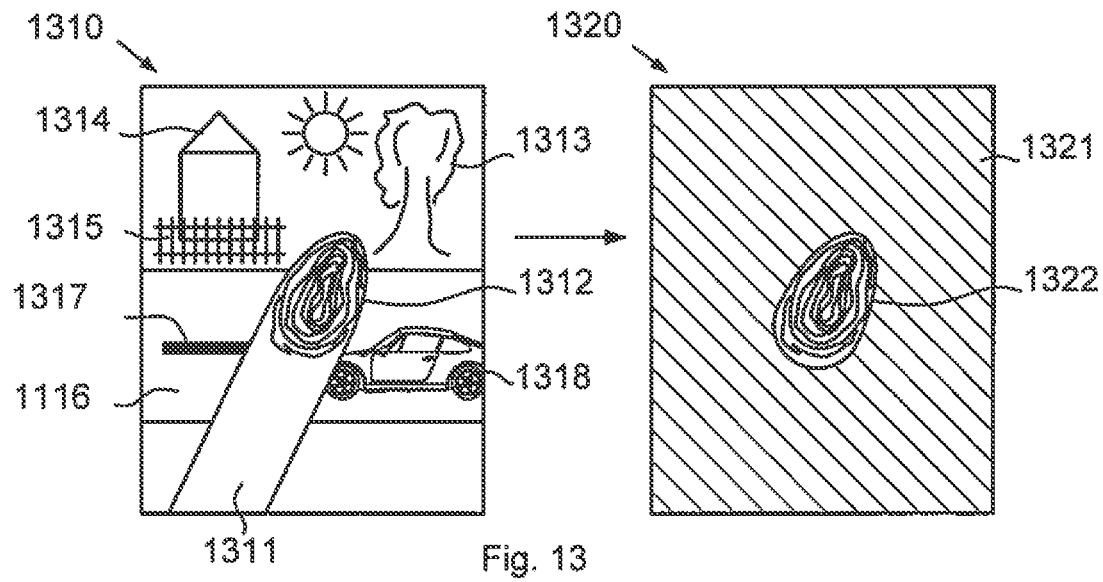
FIG. 13 shows a schematic depiction of a real image compared to an actual region of interest in an image, according to some embodiments.

Referring now to FIG. 13, an exemplary image 110 is provided at the left side of FIG. 13. This would be the image obtained by the optical sensor in step 1 of FIG. 1 and that was potentially further processed in the above referred to steps 2, 3 and 4.

Here, the finger 1311 is shown in the foreground of the image 1310. The finger carries the biometric characteristic in the form of the fingerprint 1312 which comprises the minutia at the tip of the finger. As the image is taken with an optical sensor of the mobile device, like a camera, the image will usually comprise additional objects 1313 to 1318. These objects can be anything, like other persons, cars, houses, vegetation and streets or any other infrastructure.

If this image would be provided to an identification means like another software or hardware for processing biometric characteristic at the third party computing device, this could and most likely would lead to failures in identifying the user as the respective software/hardware at the third party computing devices does not know how to discriminate between portions of the image that comprise the biometric feature in a way that it can be used for identification of the user (here and after referred as the region of interest) and other portions of the image. Further, even if such identification means (like log-in servers) would be adapted to process such images in a proper way to still identify the user, this would require significant computing resources at these identification means only for identifying the ROI that actually comprises the biometric characteristic and distinguish it from the rest of the image.

It is, therefore, more appropriate to only provide the information to the third party computing system that is actually necessary to identify the user, i.e. the ROI or the biometric characteristic within the ROI as data comprising the biometric characteristic that is forwarded to the third party computing device according to step 9 of the method according to FIG. 1. This also means that the cropping step described herein-below may be performed on the mobile device. However, it can also be thought of realizations where the data comprising at least the biometric characteristic is the whole image and this is sent to the third party computing device where the third party computing device performs the cropping step.

In any case, it is the idea of this embodiment to process the original image in a way that a modified image or part of the image 1320 is obtained in which the ROI 1322 is extracted or separated or otherwise distinguished from anything else in the image (herein referred to as 1321).

The resulting image 1320 may thus either only comprise the ROI 1322 or may comprise a square or rectangular region in which the ROI is embedded. The later realization can be easier to handle because it can be represented in the normal way the images are represented by using a number of pixels, for example, 1024×1024 pixels or 198×198 pixels or any other suitably number of pixels.

As the images 1310 taken by the optical sensor of the mobile device will usually differ from each other in view of what is actually shown on the image and they will also differ with respect to the visibility and position of the object that has the biometric characteristic (like the finger), the ROI cannot be easily determined by, for example, providing a preset mask over the image that distinguishes a first portion of the image from another portion of the image.

In view of this, it is a finding of the present invention that, by training a neural network with proper input as will be described later, it is possible to process an originally input image 1310 or a part of the image 1310 in a way that the ROI can be reliably separated from the remaining portions of the image. Though this embodiment is not limited to the use of a neural network (which could be the same as used for the identification step and/or the liveliness-detection step and/or the comparison step referred to above or which could also be a completely different one), a neural network can be used to implement this embodiment. Therefore, the description below will focus on applying a neural network to perform the cropping step.

Figure 14:
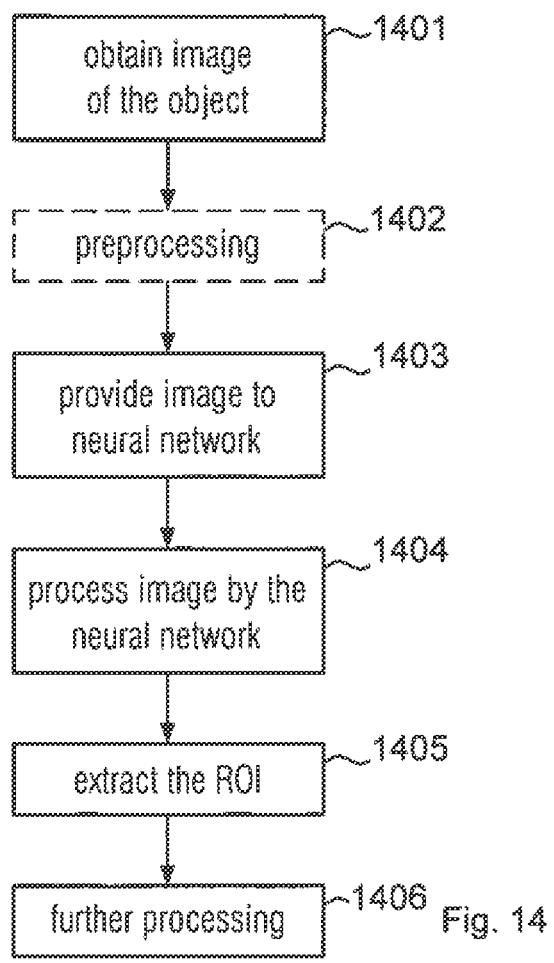
FIG. 14 shows a flowchart of a method for extracting the ROI during the cropping operation, according to some embodiments.

The process according to one embodiment that facilitates this extraction of the ROI from other portions of an image is briefly shown and explained in FIG. 14.

More specific explanations regarding the separation steps will be provided in the following figures.

In the first step, the method comprises obtaining 1401 an image of the object that has a biometric characteristic by using an optical sensor of a mobile device and potential further preprocessing of 1402 implemented for the image. This pre-processing may comprise the steps 2 to 4 or only step 2 of FIG. 1. The steps 1401 and 1402 are just shown for explanatory purpose and do not mean that taking the image would need to be repeated in some way for the embodiments now described though an image was already taken for performing the method according to FIG. 1.

However, further processing of the image independent from steps 2 to 4 of FIG. 1 may occur.

As an example, an original image is usually comprised of a number of pixels (for example 1024×1024) where, for each pixel, three colour values with associated brightness values are provided. This allows, during the pre-processing, to derive three images from the original image with identical number of pixels but where each image only comprises the pixel values associated with one colour value. After the pre-processing, there can thus be one image comprising the green colour values, one image comprising the blue colour values and one image comprising the red colour values. Also other pre-processing methods are possible as will be described later.

Specifically, the pre-processing 1402 can comprise examining (either by using the neural network or using any other software or even another neural network) the image and identifying a part of the image having a size that is smaller than the size of the original image in which the object that has the biometric characteristic is arranged. This can also be done by using the results of the identification step 2 of FIG. 1.

Referring to the example of FIG. 13, the finger 1311 with the fingertip is arranged almost in the middle of the image taken. Therefore, the pre-processing step 1302 could comprise cutting of the border regions of the image 1310 and only processing further a smaller part of the original image that still comprises the fingertip 1312 with the biometric feature. This is identical to extracting, from the original image, only the center portion (for example in the form of a rectangle) comprising the fingertip.

In the following, reference will usually be made to "the image" or "the input image" or the "original image". In view of the foregoing, it is clear that this does not only comprise the full image or the original image obtained by the optical sensor but also any realization of the pre-processing, including using, instead of the full image, only a part of the image or using only one or more images comprising one colour value or being restricted to brightness values for the respective pixels. Any of these pre-processings and any other pre-processing that can be thought of will thus be considered included when the further processing of the original image is described.

In any case, after having obtained the image in step 1401 and after step 1402 and potentially after further pre-processing of the image (like having already performed liveliness-detection step 3 of FIG. 1), the image (or a part of the image or the pre-processed image in general) is provided to a neural network for further processing in step 1403. Providing the image to the neural network can be achieved by, for example, internally transferring the image from the optical sensor or the component that has carried out the pre-processing to the software component that implements the neural network for the cropping step.

Providing the image for the neural network can also comprise extracting the image from a persistent or non-persistent storage on the mobile device and provide the image to the neural network and, at the same time, storing the image in a persistent or non-persistent storage associated with the neural network in that the neural network can access this storage location.

In the next step, after the image has been provided 1403 to the neural network, the image is processed 1404 by the neural network. This processing can comprise processing the data associated with one or more pixels of the image by one or more nodes or one or more layers within the neural network, thereby, for example, transforming the input image in one or more specific manners as will be explained in more detail below. After this processing 1404 of the image by the neural network, the neural network provides an output that distinguishes a portion of the image comprising the above-mentioned ROI, from another portion of the image, for example, the background of the image that does not have anything to do with the biometric feature. Likewise, this processing can result in a part of the object being considered to not belong to the region of interest. This can be the case, for example, if parts of the object that has the biometric characteristic do not have at least a portion of the biometric characteristic. This would be the case, for example, for the finger for every portion that is not the fingertip.

Likewise, the quality of a portion of the object that has the biometric characteristic can be too poor to use it for identification and, thus, this would not belong to the ROI. This can be true, for example, for portions in the object that have a part of the biometric characteristic but that are inclined with respect to the optical sensor and, when taking the image of the object, are thus not properly visible or are darker than the remainder of the image taken of the object, thus not allowing for using these parts of the biometric characteristic for identifying the user.

In any case, the processing will result in the neural network providing an output that distinguishes a portion of the image comprising the ROI from another portion of the image that does not comprise the ROI. The portion that comprises the ROI can the be transferred, according to step 9 of FIG. 1, to the third party computing device.

Upon this, the method according to one embodiment comprises extracting the ROI from the image (or the part of the image, respectively). This extracting can comprise that only the pixels that carry the biometric characteristic within the region of interest are extracted from the image. This, however, can lead to a number of pixels that, together, form an unpredictable shape like an elliptical or circular shape as shown in the image 1320 in FIG. 13. Such images can usually not be easily processed further as they do not have a size and shape that is usually used for representing images in data structures. Therefore, instead of extracting only the pixels corresponding to the region of interest and carrying the biometric characteristic of the user from the original image, it be provided according to one embodiment of the invention that every pixel in the original image that is not within the region of interest is set to a standard value (for example black or white). This will lead to the extracted region of interest being embedded within a plurality of surrounding pixels such that the resulting image has the usually used shape (for example rectangular and comprising 1024×1024 pixels). This can make processing of the extracted region of interest easier in consecutive steps.

Such consecutive steps are summarized in the further processing step 1406 in the flowchart of FIG. 14. This further processing of the extracted ROI (being it only the pixels of the region of interest itself or being it the pixels embedded within or surrounded by pixels provided with a standard value), can comprise storing of the ROI (or respective image) in a storage device that can be provided on the mobile device. Additionally or alternatively this further processing 1406 can also comprise providing the region of interest to an identification means at the third party computing device that uses the region of interest in order to extract the biometric characteristic in the region of interest and processes the extracted biometric characteristic in order to determine whether the extracted biometric characteristic identifies the user.

For example, the identification means can be a log-in server at the third party computing device for logging in into the bank account of the user, for accessing services of a company or the government or the like. In order to identify himself, the user can then take an image of, for example, his fingertip and have it processing in a manner as described in relation to FIG. 14 in steps 1401-1405 and send (either manually or automatically) the respective image to the third party computing device for logging in to the banking account. The server can then further process the region of interest of the respective data structure carrying the region of interest in order to determine whether or not the identification is successful.

Figure 15:
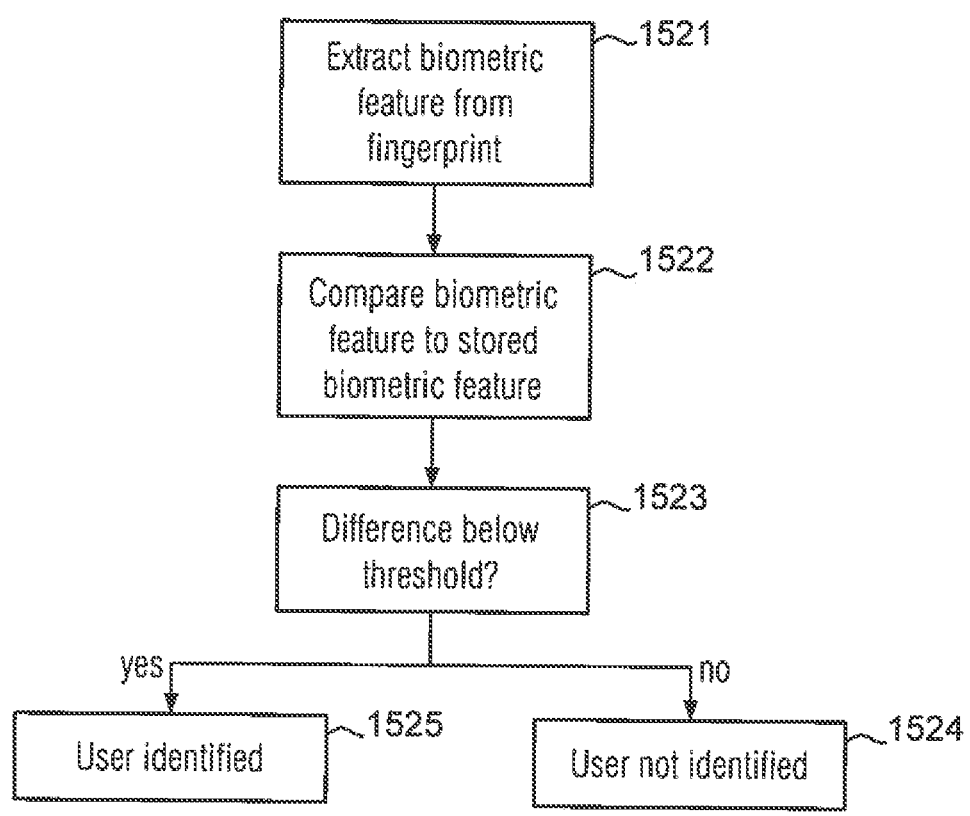
FIG. 15 shows a flowchart of a method for identifying a user using an extracted biometric feature as performed by the third party computing device, according to some embodiments.

The process of how this can be facilitated is described in further detail in FIG. 15 for one embodiment.

FIG. 15 shows a more detailed explanation of how a user may be identified using the biometric characteristic in the case the biometric characteristic being a fingerprint where the object would then be at least one fingertip. As explained above, other objects and biometric characteristics may likewise be chosen.

The method according to FIG. 15 may be performed at the third party computing device. The mobile computing device only provides the respective data (in this case the ROI) that carries the biometric characteristic.

The method in FIG. 15 begins with the step 1521 where the biometric feature is extracted from the fingertip and, consequently, these steps are at least performed after the step of extracting, from the identified object, the biometric characteristic or the ROI, respectively, as explained in FIG. 14.

Extracting the biometric features from the fingertip may, for example, comprise extracting the location and the kind of minutia of the fingerprint. It can also comprise extracting only very specific kinds of minutia (for example the crossing of two or more lines in the fingerprint).

In order to identify the user using this information, it is of course necessary that a reference is available in the form of a corresponding biometric feature. For this reason, it may be the case that the identification means of a third party computing system as explained previously with respect to FIG. 14 is associated with a storage device or comprises a storage device in which biometric features are stored for specific users. For example, for each user, a file may exist in which one or more biometric features are stored in the form of, for example, images, numerical values or other data structure.

In the next step 1522, the biometric feature obtained from the fingerprint is compared to a correspondingly stored biometric feature. This can comprise in the case of the stored biometric feature being represented by a number of locations of the minutia comparing corresponding locations in the extracted biometric feature. Of course, other means for comparing an obtained biometric feature to a stored biometric feature are known and can be used, for example, image recognition technologies, frequency transformations or the like. Comparing the obtained biometric feature and the stored biometric feature is, according to the described embodiment, done in such a manner that a degree of correspondence between the obtained biometric feature and the stored biometric feature can be calculated. In other words, this comparison will result in a difference between the stored biometric feature and the obtained biometric feature being calculated. This difference can be a single real number or a tensor or a vector or any other mathematical structure that is considered suitable to represent the degree of match or difference of the obtained biometric feature and the stored biometric feature. It can also be a difference image that is obtained by subtracting, from a stored biometric feature image, an obtained biometric feature image on a pixel per pixel basis.

A threshold can be provided that can be used for determining whether the obtained biometric feature corresponds to the stored biometric feature and thus, allows for identifying the user.

Correspondingly, in step 1523, it is determined whether the difference between the obtained biometric feature and the stored biometric feature is below or above this threshold. If it is below this threshold, it is determined in step 1525 that the user is identified by the biometric feature. If the difference is above the threshold, it is instead determined in step 1524 that the user is not identified by the biometric feature. The threshold can be set, for example, to a number between 0 and 1 where 0 would be a perfect match (i.e. no difference) and 1 would represent no match at all. In order to take into account that the accuracy of the identification should be comparably high but to also take into account that taking a free-form image of the object as explained in FIGS. 13 and 14 will usually suffer from distortions, the threshold can be set to be close to 0 but to not be 0. For example, the threshold may be chosen to be smaller than 0.1, may be smaller than 0.05, or even smaller or equal to 0.98. Other values are, of course, possible.

This determination will then result in the identification means determining either that the user is identified by the obtained fingerprint or the user is not identified by the obtained fingerprint.

FIGS. 14 and 15 have described the way of identifying the user using the biometric characteristic obtained from the originally taken image in the case only one fingertip is used for identifying the user and this fingertip was present in the image.

It is, however, also contemplated that the identification means may not only evaluate a single fingertip but may evaluate more than one fingertip like two fingertips or even all fingertips available on the image in order to identify the user. The manner in which a biometric feature obtained from a single fingertip or fingerprint of the plurality of fingertips is matched to a stored biometric feature by the identification means corresponds to the one described with respect to FIG. 15.

However, in case more than one fingerprint is evaluated, it may be that the user is either only identified in case a combined identification accuracy of the biometric features is above a given threshold or the user is only identified in case, for each fingertip obtained, the comparison of the obtained biometric feature with the stored biometric feature as explained in step 1522 and 1523 of FIG. 15 leads to the result in step 1525.

The last case is straightforward as the method explained with respect to FIG. 15 is performed on every fingerprint in the image and only if the difference between the obtained biometric feature and the stored biometric feature for each obtained fingerprint is below the given threshold, the user is identified. In any other case, the user may not be identified.

However, in the case of the user is identified in case a combined identification accuracy of the fingerprints of all fingertips in the image is above a given threshold, it is not necessary that, for each fingertip, the comparison of the biometric feature obtained and the stored biometric feature results in the difference being below the threshold in line with step 1523 of FIG. 3.

For example, considering the identification accuracy of a biometric feature to be number ranging from 0 (no identification) to 1 (complete match between the obtained biometric feature and the stored biometric feature), the combined identification accuracy may have a value of less than four (corresponding to perfect identification accuracy for four fingerprints) in case the combined identification accuracy is determined by the sum of the isolated identification accuracies obtain for each biometric feature alone.

For example, the corresponding threshold for the combined identification accuracy may be 3.5. In this case, it will be sufficient to identify the user in case, for example, the identification accuracies for each fingerprint is approximately 0.9 since the sum of those identification accuracies (i.e. the combined identification accuracy) is 3.6 and, hence, above the respective threshold. As another example, considering that three fingerprints are identified with an identification accuracy of 0.95, it will be sufficient if the fourth finger is only identified with an accuracy of 0.75.

It is noted that the identification accuracy can be seen as the relative degree of similarity or correspondence between the obtained biometric feature and the stored biometric feature. Thus, in case the obtained biometric feature corresponds to 90% to the stored biometric feature, the identification accuracy (i.e. how accurate the user might be identified with this biometric feature) will be 0.9.

It is clear that also other values for the identification accuracy or even also other values for the threshold can be used. Furthermore, there are also other means how the combined identification accuracy can be determined. For example, the combined identification accuracy may be calculated by determining the mean value of the identification accuracies or by determining the product of the identification accuracies.

In the figures that follow, the processing of the originally obtained image for finally extracting the ROI comprising the biometric characteristic in line with steps 1404 to 1405 will be described in more detail and, further, an explanation regarding how the neural network can be trained to be able to identify fingertips with high accuracy will be given.

As already explained above, an obtained image is processed by the neural network by first processing the image using an encoder (as will be explained in FIG. 16) and then processing it by a decoder (as will be explained in FIG. 17).

Figure 16:
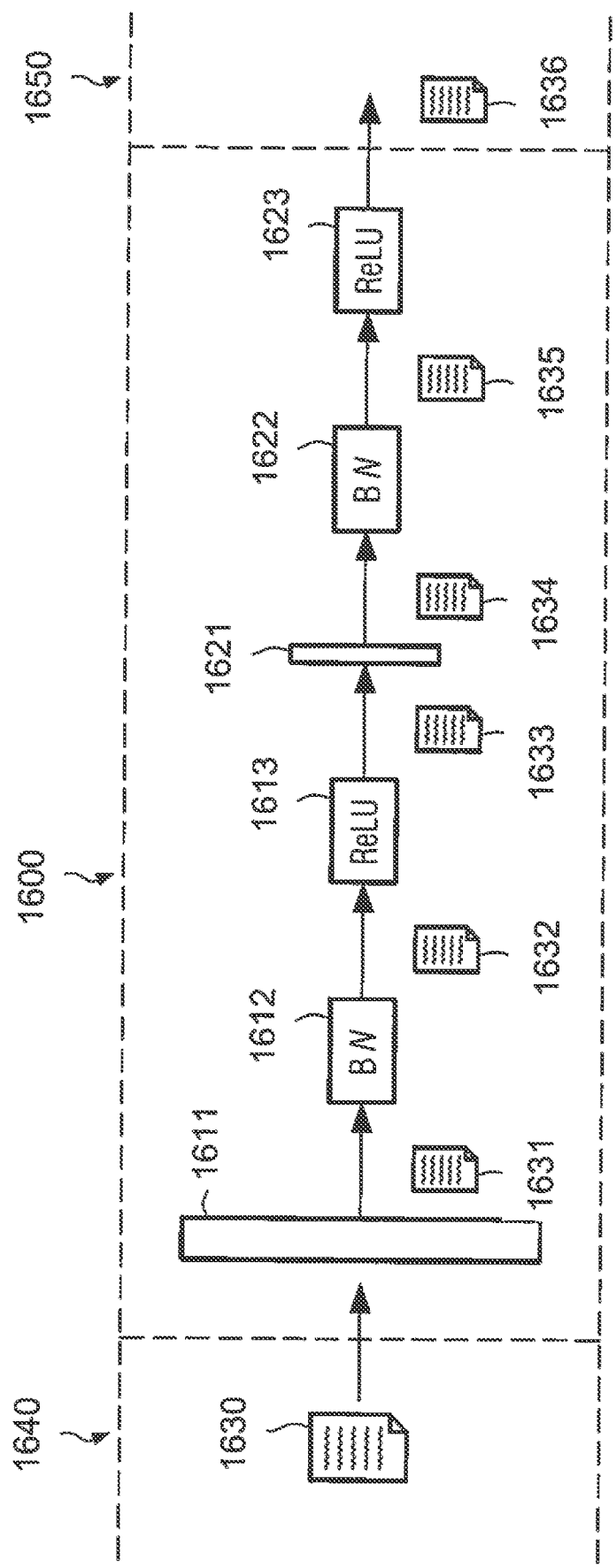
FIG. 16 is a schematic depiction of the processing of an input image by the encoder during the cropping operation, according to some embodiments.

FIG. 16 shows the internal processing of a received input in one layer 1600 of the encoder of the neural network according to one embodiment of the invention. This layer 1600 may be a layer that is, in processing order of the original input through the encoder, the first layer that receives the original input after step 1402 explained above or any intermediate layer that is arranged between two further layers 1640 and 1650 of the neural network or the layer 1600 may even be the last layer of the neural network that will, in the end, provide an encoded output that is then provided to the decoder.

In any case, the layer 1600 will receive an input 1630 that at least somehow corresponds to the originally obtained image. This also encompasses that, during step 2 of FIG. 1, the image is already separated using, for example, the explained bounding boxes, into a portion of the image that is known to carry the biometric characteristic and processing this portion of the original image by the layers of the neural network according to FIGS. 16 and 17.

This input may be provided in the form of at least one matrix that has the dimension N×M where N and M are integers greater than 0. The matrix may, for example, represent the pixels in the image for at least one color value (for example red). The entries in this matrix thus may have values that correspond to the value of the respective color (in the example case red) of this specific pixel. As will be clear from the following, the input may not be identical to the obtained image but can be a matrix P that was obtained from the matrix representing the original image by some processing through layers in the neural network or even by some pre-processing (for example reduction in resolution, a single color or brightness value or the like).

For ease of discussion, however, the input 1630 will be assumed to correspond to the N×M matrix that represents the originally obtained image and each entry in this N×M matrix corresponds to a value of a color (for example red) of a pixel in the respective image. Applying this teaching to any other transformed matrix that originates from the original N×M matrix and is obtained through processing this matrix in layers of the neural network is straightforward.

Following now the process exemplified in FIG. 16, the input 1630 is received by the depthwise convolutional layer 1611 for processing. In the following, a comparably simple example will be given with respect to how the input matrix 1630 can be processed by the depthwise convolutional layer. This will involve that a kernel K is used to calculate inner products with the matrix. The kernel is run over the matrix in so called "strides". While the following example will use values for horizontal and vertical stride widths of 1, any other value greater than 1 can be used as long as the stride widths are integers greater than 0. The kernel K is of size S×T, where S and T are integers and smaller than N and M.

Furthermore, it will be assumed that only the original input matrix I (i.e. the input matrix 1630) of size N×M is used for calculating the inner product with the kernel. It is, however, also contemplated that an extended matrix Z can be used for calculating the inner products with the kernel. This extended matrix Z is obtained by "attaching", to the original matrix I, lines and rows above the first line and below the last line as well as left to the first row and right to the last row.

This is called "padding". The padding will usually comprise that a number $P_w$ of lines is added in the line direction and a number $P_h$ of rows is added to the row direction. The number $P_w$ can equal S−1 and the number $P_h$ can equal T−1, such that any inner product calculated between Z and the kernel contains at least one entry of the original matrix I. The resulting matrix Z will thus be of size $(N+2P_w) \times (M+2P_h)$. In view of this, the matrix Z will have the following entries:

$$Z_{cd} \begin{cases} 0 \forall c \leq P_w \\ 0 \forall c > P_w + N \\ 0 \forall d \leq P_h \\ 0 \forall d > P_h + M \\ I_{ij} \text{ where } c = i + P_w; d = j + P_h; i = 1 \ldots N; j = 1 \ldots M \end{cases}$$

In this context, it follows that the new matrix obtained by calculating all inner products and arranging them properly according to lines and rows will generally be of size $$\left(\frac{N - S + 2P_w}{W_w} + 1\right) \times \left(\frac{M - T + 2P_h}{W_h} + 1\right),$$

where $W_w$ and $W_h$ define the stride width in the direction of lines and the direction of the rows, respectively. It is clear that only those paddings and those stride widths are allowed for a given kernel K with size S×T that result in integers for the size of the new matrix. Furthermore, the stride widths $W_w$ and $W_h$ may be equal or smaller than S and T, respectively, as otherwise the kernel would be moved over the matrix I in a manner that some lines or rows of the original matrix are left out in calculating the new matrix.

For ease of discussion, it will be assumed in the following that no padding is provided to the original matrix I and the stride width is 1 for horizontal and vertical strides. Furthermore, it will be assumed that the kernel is a matrix with size S×S, i.e. the special case where S=T will be assumed. Applying the explanations given below to arbitrary padding and stride width as well as to any kernel size is straightforward with the teaching provided below.

In the depthwise convolutional layer 1611, the received input matrix 1630 is used to form an inner product with the kernel K that has the size S×S where S<N,M. The inner product is calculated for each reduced matrix of the original N×M matrix where the reduced matrix is of size S×S and contains coherent entries in the original N×M matrix. For example, considering S=3, the first reduced matrix R of the N×M original matrix comprises the entries i=1, 2, 3; j=1, 2, 3 such that the reduced matrix $(N \times M)_S$ is comprised of nine entries and the inner product with the kernel K is calculated which results in a single number. The next reduced matrix in the directions of the lines of the original N×M matrix is the matrix where i is increased by 1 (corresponding to the stride width), such that the next matrix in this direction is constituted of the items in the original N×M matrix where i=2, 3, 4; j=1, 2, 3. This matrix may then be used for calculating the next inner product with the kernel. It is noted that the given example of the S×S matrix with S=3 is only one example and other kernels may also be used.

In order to calculate the next reduced matrix R of the size $(N \times M)_S$ in the direction of the rows/columns, the index j of items in the original N×M matrix is increased by 1. This is done until the last reduced matrix in the direction of the lines where i=N−S+1, N−S+2, N−S+3 in the case for S=3. For the rows, this is done in a corresponding manner where j=M−S+1, M−S+2, M−S+3. By calculating those inner products, a new matrix, the matrix P is calculated that has the size (N−S+1)×(M−S+1). Its entries $P_{ij}$ correspond to the respective inner product calculated with the corresponding reduced matrix of the original N×M matrix and the kernel K. It is noted that a matrix of this size will, in fact, be forwarded to the pointwise convolutional layer of the layer 1600.

The kernel K constitutes entries that are obtained through a learning process where the neural network is trained in order to properly identify the intended objects. The kernel K used in the layer 1600 of the neural network is not necessarily identical in size and entries to the kernels used in other layers of the respective neural network. Additionally, the entries in the kernel do not need to be identical to each other but at least constitute numbers being larger or equal to 0. The entries may be considered to represent "weights" that are obtained through learning of the neural network.

The result of the processing of the matrix 1630 by the depthwise convolutional layer is the matrix 1631 having, as explained above, size (N−S+1)×(M−S+1) in case the kernel is moved in strides over the original N×M matrix that have a distance of Δi=1 in the direction of the lines and Δj=1 in the direction of the rows (this corresponds to the respective stride width). In case, however, those strides have a larger distance like Δi=2 or Δi=3 (and potentially, correspondingly for the rows), the dimension of the result 1631 will change correspondingly as explained above.

In the further processing, this result 1631 is forwarded to the first batch normalizer 1612 that follows in the processing order depicted with the arrows in FIG. 16 after the depthwise convolutional layer 1611. The batch normalizer attempts to normalize the received result matrix 1631. This is achieved by calculating the sum over each of the entries in the (N−S+1)×(M−S+1) matrix and dividing it by the number of entries in the (N−S+1)×(M−S+1) matrix. The mean value V for the (N−S+1)×(M−S+1) matrix (denoted as P in the following, with corresponding items $P_{ij}$ matrix is given as $$V = \frac{\sum_{ij} P_{ij}}{n \cdot m}$$

where n and m represent the number of lines and columns/rows in the N×M matrix or the number of lines and columns in the matrix P. The items $P_{ij}$ are the entries of the matrix P where a given item $P_{ij}$ is the element in the matrix in line i and column j.

The batch normalizer then calculates a reduced matrix P' by subtracting, from each entry $P_{ij}$ in the original matrix, the mean value V such that $P'_{ij}=P_{ij}-V$. Thereby, the values in the reduced matrix P' are normalized such that anomalies in the one or the other direction (extremely large values or extremely low values) are filtered out.

The result 1632 created by the first batch normalizer 1612 is a matrix still having (in the example given in FIG. 16) the size (N−S+1)×(M−S+1) since, until now, no further dimensional reduction of the matrix was performed.

The result 1632 is then provided to the first rectified linear unit 1613 that follows the first batch normalizer 1612.

The rectified linear unit modifies each entry in the matrix 1632 further by calculating new matrix entries $\overline{P}_{ij}$ where $$\overline{P}_{ij} = \begin{cases} 0 \vee P'_{ij} < 0 \\ P'_{ij} \vee P'_{ij} \geq 0 \end{cases}$$

This results in values that would be smaller than 0 after having passed the batch normalizer to be set to 0, thus having no further influence on the further processing in the depthwise convolutional layer that will be explained in the following. This means that, for example, color values that are below the mean value calculated in the batch normalizer are not considered further and only the values that at least correspond to the mean value V have influence on the outcome of the next step in the calculation.

The result 1633 thus output by the first rectified linear unit 1613 still is a matrix of shape/size (N−S+1)×(M−S+1) and this matrix is forwarded to the pointwise convolutional layer 1621.

This pointwise convolutional layer 1621 creates a result 1634. This result 1634 is created by the pointwise convolutional layer 1621 by taking each entry in the (N−S+1)×(M−S+1) matrix 1633 and multiplying this entry with a weight α. α may be a number that is greater than 0 in any case and this number is identical for each entry in the (N−S+1)×(M−S+1) matrix. The result 1634 that is obtained from the pointwise convolutional layer 1621 thus is a matrix having the same size (N−S+1)×(M−S+1) but where each entry is multiplied with the weight α.

Figure 17:
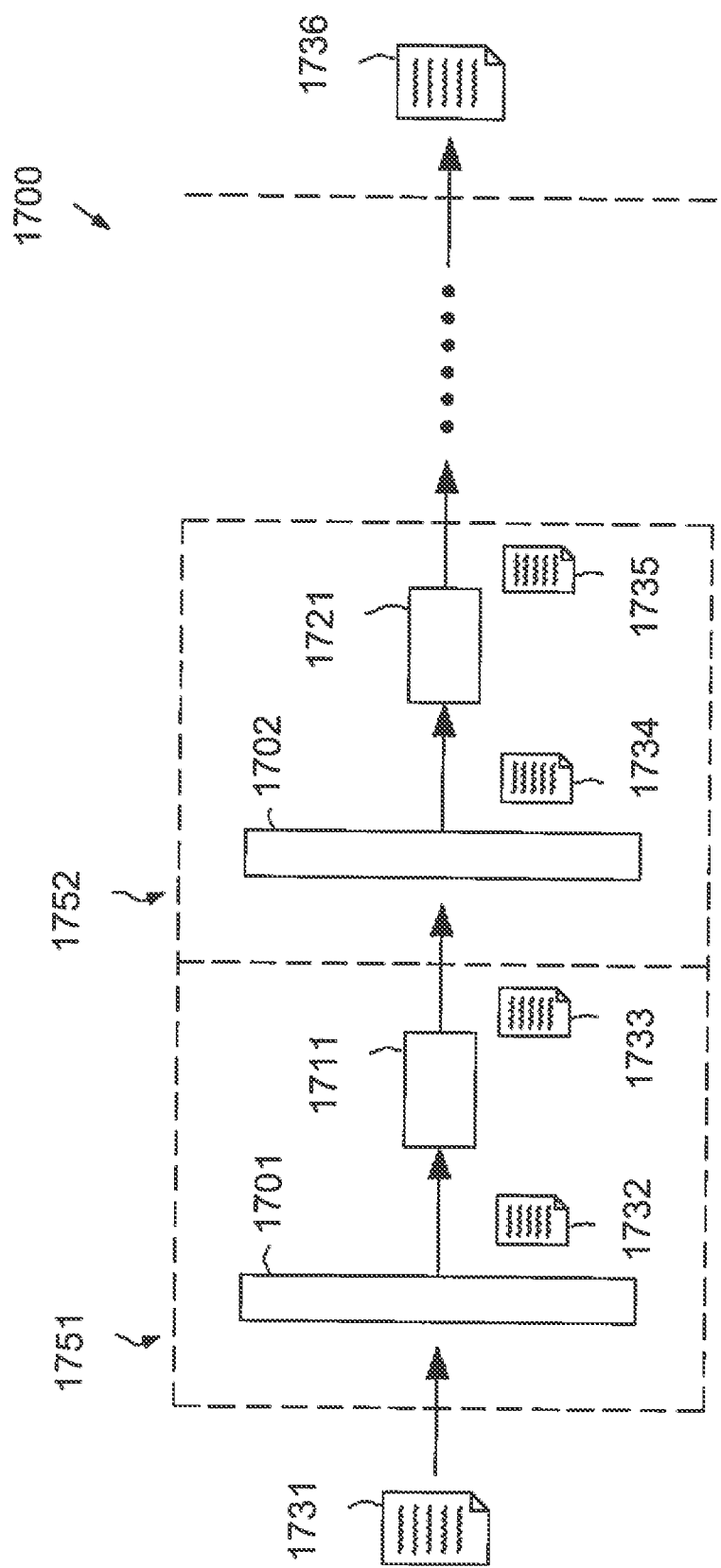
FIG. 17 shows a schematic depiction of the processing of an encoded image with the decoder of the neural network during the cropping step, according to some embodiments.

The result 1634 is then provided to the second batch normalizer 1622 where it is normalized in the manner as explained for the first batch normalizer 1612 and a normalized matrix P' of the same dimension as the result 1635 is calculated and this matrix/result 1635 is forwarded to the second rectified linear unit 1623 where a rectification function is applied to obtain a result/matrix $\overline{P}$ 1636 that is then forwarded to the next layer in the neural network or, if no other layer follows in the neural network, the result 1636 is provided as an output encoded image to be processed by the encoder as will be described in FIG. 17.

It is noted that, through the processing in the encoder, information that was available in the original image obtained by the optical sensor is lost since some of the transformations t applied in the encoder do not have an inverse transformation $t^{-1}$ for which the relation $t^o t^{-1}=1$ would hold. This, however, in fact is a result according to some embodiments since, through the training of the neural network described below, it is possible to limit or restrict this information loss basically to information that is not of interest, i.e. does not define the ROI. While this information is lost, the informational weight of the ROI is increased, thereby making the distinguishing of the ROI from remaining portions of the image possible.

It is a finding of the present invention that, for identifying fingertips, thirteen layers that are identical to the layer 1600 explained in FIG. 16 are most appropriate as they result in a comparably high identification accuracy of the fingertips and their location while only requiring reduced computer resources for implementation of the respective method which makes it more applicable to mobile devices.

With respect to FIG. 17, the process executed in the decoder upon receiving an encoded image form the encoder is described.

As already indicated for the encoder, the decoder should not be seen in the sense of "decoding" something in a manner that an encryption is decoded that was previously applied to an object. Rather, the decoder should be understood as a part of the neural network comprising one or more nodes or layers that expand the encoded image or at least transform the encoded image in a manner that after processing the encoded image by the decoder, the decoded output image has a size (in terms of pixels or entries in a matrix) that corresponds to the original input image. If, for example, the original input image had a size of A×B pixels, the decoded output image (or tensor) may also have the same size and number of pixels. As these can also be described in a form of a matrix (or tensor, more specifically) where each pixel is associated with an entry in the matrix and the value of the pixel is the value of the entry in the matrix, it is equivalent to say that the decoded output image in the form of a matrix has the size of the original input image. As an example, the original input image may have a size of 224×176×3 (the 3 corresponds to the number of color values). The decoded output image then has the same number of pixels/entries in the matrix constituting the decoded output image. Also other resolutions of the original input image (also comprising other numbers of color values) can be thought of.

As can be seen in FIG. 17, the decoder 1700 comprises one or more layers 1751 and 1752 (as well as other corresponding layers not shown) through which the encoded input image 1731 is processed one after the other. This means that the encoded input image 1731 is first processed by the first layer 1751 of the encoder 1700 and the intermediate decoded image 1733 is then provided to the next layer 1752 in the processing order of the encoded image in the encoder 1700 of the neural network. After having passed through each layer of the encoder, a final decoded output image 1736 is provided. This can then be processed further as will be described in further detail below.

As regards the processing of the encoded image by the layers 1751 and 1752, it is firstly noted that each of these layers comprise identical components which, in principle, is a deconvolution also called transposed convolution 1701 and 1702 and bilinear upsampling units 1711 and 1721. While the bilinear upsampling units are shown in processing order within the layer after the deconvolutions 1701 and 1702, it is also possible to provide the bilinear upsampling units in processing order of the input encoded image before the convolutions 1701 and 1702.

The deconvolutions 1701 and 1702 work in a manner that reverses the transformation of the convolutions.

In order to explain this in more detail, in is assumed that the encoded input image 1731 (or any intermediate decoded image 1733 and 1735) is represented in the form of an input matrix B with a specific size N'×M' where the entries in this input matrix are denoted with $B_{ij}$, where i≤N' and j≤M'.

In order to obtain, from this input matrix, an expanded matrix $\overline{B}$, each entry in the matrix is multiplied with a kernel $\overline{K}$ that has, like a kernel in the depthwise convolutional layers of the encoder, the form of a matrix with a specific size $\overline{S}\times\overline{T}$. For ease of discussion, it is assumed that $\overline{S}=\overline{T}$. This, however, is not limiting in any sense. In fact, any value of $\overline{S}$ and $\overline{T}$ is possible. This includes that $\overline{S}$ and $\overline{T}$=S and T of the kernel used in the encoder or $\overline{S}$ and/or $\overline{T}$ are different from S and/or T used in the encoder.

By multiplying an entry $B_{ij}$ of the original input matrix (like the encoded image 1731) with the kernel, a submatrix $\overline{B}^{sub,ij}$ with specific entries is provided. Considering a kernel $\overline{K}$ with entries $\overline{K}_{qp}$, the entries in the submatrix $\overline{B}^{sub,ij}$ are denoted with $\overline{B}_{qp}^{sub,ij}$. These are calculated by the product $B_{ij} \overline{K}_{qp}$.

By this, a single entry in the input matrix B is expanded to a submatrix with size $\overline{S}\times\overline{T}$. The values of the entries $\overline{B}_{qp}^{sub,ij}$ do not only depend on the entry in the matrix B but it also depend on the entries $\overline{K}_{qp}$ of the kernel $\overline{K}$. Following this procedure for each entry $B_{ij}$ will lead to $\overline{S}\overline{T}$ submatrices $\overline{B}_{qp}^{sub,ij}$.

Those values $\overline{K}_{qp}$ can be obtained through the training of the neural network as will be explained in further detail below. Though it would, in principle, be possible to provide different kernels $\overline{K}$ depending on the indices i and j of the entry $B_{ij}$ of the input matrix, it will be assumed, for ease of explanation, that each kernel $\overline{K}$ used is identical within the deconvolution. This means that each kernel $\overline{K}$ has the same size $\overline{S}=\overline{T}$ and as the same entries $\overline{K}_{qp} \forall q,p$. However, for another deconvolution in the encoder, this might not be the case and the kernel may have a different size and/or different entries.

Returning to the calculated submatrices $\overline{B}_{qp}^{sub,ij}$, the further procedure is as follows. For each entry $B_{ij}$ of the input matrix B, submatrices are calculated as explained above. In order to obtain a reasonable output form the deconvolution, those submatrices are combined in a specific manner in order to obtain an expanded matrix $\overline{B}$. This can be achieved in a plurality of ways.

For example, the submatrices can be "sticked together". This means, a first submatrix $\overline{B}_{qp}^{sub,ij}$ is combined with a submatrix $\overline{B}_{qp}^{sub,i+1,j}$ to the right of the submatrix $\overline{B}_{qp}^{sub,ij}$ and another submatrix $\overline{B}_{qp}^{sub,i,j+1}$ directly below the submatrix $\overline{B}_{qp}^{sub,ij}$. Additionally, a submatrix $\overline{B}_{qp}^{sub,i+1,j+1}$ is provided diagonally. In this manner, the expanded matrix is provided by continuing this pattern for all original entries $B_{ij}$ in the input matrix and the corresponding submatrices, starting the pattern with $B_{00}$.

Alternatively, it is also possible to combine the submatrices $\overline{B}_{qp}^{sub,ij}$ with an overlap. This means that the submatrices are not attached to each other in a manner as explained above but the submatrix $\overline{B}_{qp}^{sub,ij}$ and the submatrix $\overline{B}_{qp}^{sub,i+1,j}$ are combined by only shifting the submatrix $\overline{B}_{qp}^{sub,i+1,j}$ relative to the submatrix $\overline{B}_{qp}^{sub,ij}$ with a stride width W that is smaller than the size $\overline{S}$ of the respective kernel (as was the case in the previous paragraph). Thereby, in the resulting expanded matrix $\overline{B}$, the entries result from combinations of one or more submatrices $\overline{B}_{qp}^{sub,ij}$. It is clear that this overlapping can be provided in any direction. This means it can be provided (considering a matrix representation) from the left to the right, from the top to the bottom and in diagonal direction.

Considering the above, the size of the expanded matrix $\overline{B}$ will be (N'$\overline{S}$)×(M'$\overline{T}$) which simplifies to (N'$\overline{S}$)×(M'$\overline{S}$) for $\overline{S}$=$\overline{T}$. This is the case when the submatrices $\overline{B}_{qp}^{sub,ij}$ are placed besides each other as explained above which is equivalent to a stride width W=$\overline{S}$. In the case that there is an overlap and the stride width W is thus smaller than the size $\overline{S}$ of the kernel, one easily finds that the resulting size of the expanded matrix is (N'+(N'−1)W)×(M'+(M'−1)W). This is, of course, only the case if the stride width W is identical from left to right and top to bottom. If this is not the case, different values $W_a$ and $W_b$ can be used for calculating the respective width.

The result of the processing of the encoded image by the deconvolution is an expanded matrix where the entries are calculated from the discreet operations and calculations described above with respect to the input matrix B and the kernels K used.

After that, the size of the expanded matrix B is larger than that of the original input matrix B but might still not correspond to the size (i.e. number of pixels) of the original image.

In a further step, the intermediate expanded image corresponding to the expanded matrix $\overline{B}$ is then forwarded to the bilinear upsampling unit 1711. In this unit, the expanded matrix $\overline{B}$ is upsampled using the otherwise commonly known technique of bilinear upsampling. This means that between adjacent pixels, new pixels are constructed using bilinear upsampling. This means that the values of the intermediate pixels are calculated using commonly known bilinear upsampling techniques. Considering for example four adjacent entries in the expanded matrix $\overline{B}$, these entries being $\overline{B}_{ij}$, $\overline{B}_{i+1j}$, $\overline{B}_{ij+1}$ and $\overline{B}_{i+1j+1}$. With the bilinear upsampling, one or more pixels in between adjacent pixels can be calculated in order to further expand the matrix $\overline{B}$ to arrive to another matrix, denoted for example as $\overline{\overline{B}}$. Due to this bilinear upsampling, the intermediate values thereby calculated represent a more "smooth" connection between the entries in the matrix calculated using the deconvolution.

After the processing of the expanded matrix $\overline{\overline{B}}$ by the bilinear upsampling unit 1711, a further intermediate decoded image 1733 is obtained that is then forwarded to the next layer in the decoder. These procedures are repeated throughout all the layers of the decoder and, finally, a decoded output image 1736 is obtained.

Where the decoded output image corresponds to a matrix with values for the respective entries it might be called matrix O as output matrix. This output matrix O has the same size N×M as the original image and correspondingly has one entry for each pixel in the original image.

However, the decoded image is not identical to the original input image, as, through the processing in the neural network, information was lost by, for example, applying the transformations in the encoder.

The values in the output matrix O can range from $-\infty$ to $+\infty$. Without regard to the actual form of the output decoded image, it will be assumed that, for each entry (corresponding to each pixel) in the output, there exists a value x corresponding to the value of the respective entry. To each value, an activation function may be applied where the activation function S(x) has the form of $$\overline{x} = S(x) = \frac{1}{1+e^{-x}}.$$

This results in the values $\overline{x}$, compared to the original values x, being compressed to the interval between 0 and 1 where all new values $\overline{x}$ derived from values x<0 will be approximately 0 whereas other values $\overline{x}$ obtained from original values x>0 will be approximately 1.

This results in a new matrix $\overline{O}$ where the value associated with a specific pixel or entry has either the value $\overline{x}\approx 0$ or the value $\overline{x}\approx 1$.

In a further step, it is possible to further modify the matrix $\overline{O}$ by setting all values $\overline{x}$ that are smaller than 0.5 to 0 and all values $\overline{x}$ that are greater than 0.5 to 1.

The resulting matrix can be considered "black and white" image where the entries in the matrix having a value $\overline{x}=0$ might be considered to be white and the entries and the resulting matrix having values $\overline{x}=1$ may be considered black. The other way around is also possible and the reference to the "black and white" picture is only for exemplary purpose.

Due to the processing of the original image by the neural network, this will result in the region of interest being visible in the output matrix or output decoded image as having a specific shape for example an elliptical shape. This is because, due to the learned neural network and the processing of the input image, the ROI either corresponds to the values $\overline{x}=1$ or $\overline{x}=0$. The rest of the image will be faded out (corresponding to have the other value $\overline{x}$, respectively) which then allows to distinguish between the regions of interest and other portions or parts of the image.

In the next step, it is then possible to identify each pixel corresponding to the portion of the region of interest in the decoded output image with pixels in the original image as the size and arrangement of pixels in the decoded output image is the same as in the original input image. Thereby, the pixels in the original output image that are within the region of interest can be extracted.

During the processing of the original input image up to the decoded output image, it can occur that there are more than one region that are potential regions of interest. In order to distinguish between the real region of interest and other candidates for regions of interest, it is possible to choose the largest contiguous area within the decoded image and neglect all other areas as potential candidate regions of interest.

Due to the decoding procedure, the resulting number of pixels representing the region of interest may not be a smooth region but might contain steps or other distortions originating from the downsizing and upsizing and the information loss. This can be corrected by, for example, applying smoothing techniques as are commonly known in the art in order to obtain (almost elliptical) shape without steps.

The resulting region of interest in the decoded image and the pixels within this region of interest can then be matched as explained above to the original input image and the respective pixels of the original input image can be extracted as the actual region of interest and can then be further processed by, for example, storing the region of interest or proving it to a third party computing device for further processing in the manner as described, for example, with respect to FIGS. 13 and 14.

While, in relation to FIG. 17, the decoding was described making use of a specific order of deconvolutions and bilinear upsampling units, it is noted that also other combinations of these entities may be used. For example, the invention also encompasses that only a number of deconvolutions is used that process the image in succession as described above. Alternatively, only bilinear upsampling units may be used in succession for processing the image.

Moreover, there are also embodiments where the number of bilinear upsampling units does not correspond to the number of deconvolutions. For example, there may be a bilinear upsampling unit provided only after each second deconvolution or after each third convolution. The same holds for the case where there is more bilinear upsampling units than deconvolutions. For example, there may be a deconvolution only after each second or third bilinear upsampling unit.

The provision of the bilinear upsampling units or deconvolutions does also not need to be uniform through the decoder. For example, in processing order of the input encoded image, there may first be a deconvolution followed by a bilinear upsampling unit, followed by two deconvolutions which are followed by a bilinear upsampling unit. After that, there may once again be only a single deconvolution followed immediately by a bilinear upsampling unit. Also other combinations can be thought of.

Figure 18:
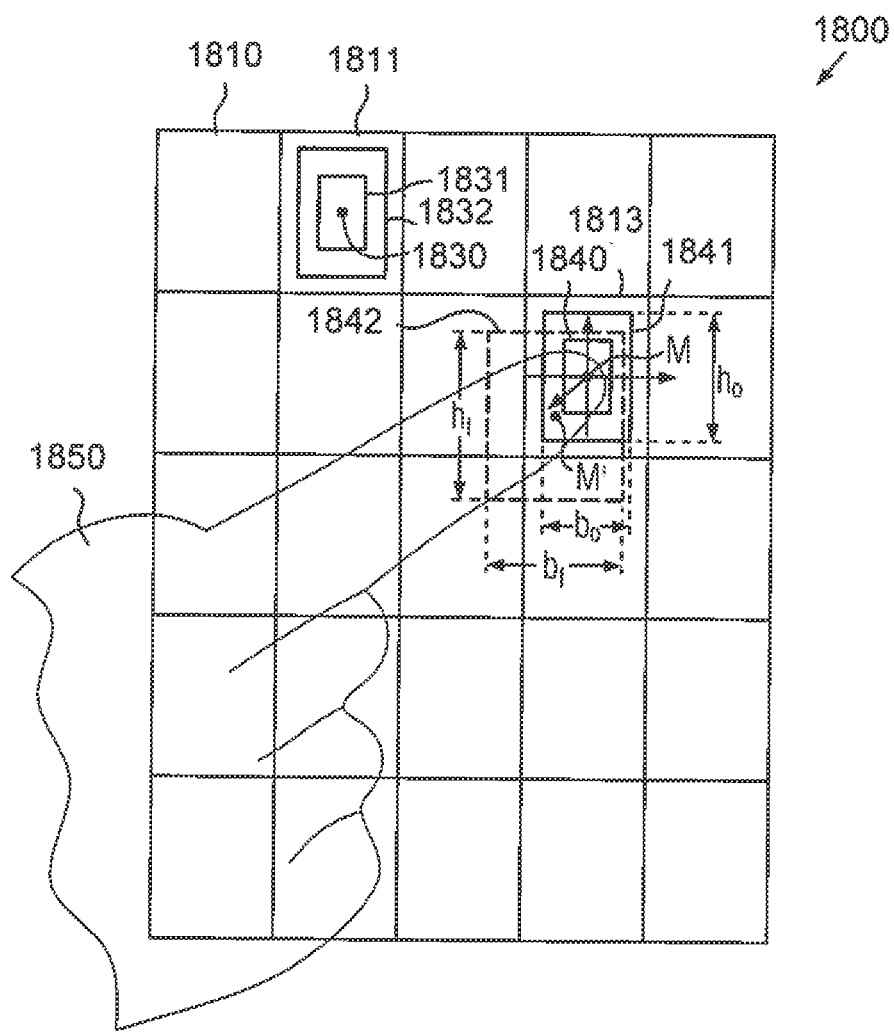
FIG. 18 is a schematic depiction of the creation and use of bounding boxes, according to some embodiments.

FIG. 18 shows a further embodiment that extends the concept described in FIG. 16 and FIG. 17 in order to allow for an identification of a fingertip (specifically the pixels in the original image constituting the fingertip) using a number of bounding boxes and a separation of the original image into grids. This can allow for reducing the size of the image that has to be processed by the neural network for finding the ROI, thereby saving computer resources and processing power of the neural network. It is noted that this can be achieved by using the bounding boxes explained with respect to the identification step 2 according to FIG. 1 and the corresponding description in the section referring to the identification step. However, for ease of explanation, the application of the bounding boxes to limit the part of the image that has to be processed for determining the ROI will be explained in further detail below.

It is noted that the steps described in the following can be performed before processing the original image in the cropping step in the neural network by the encoder and decoder.

The embodiment described in FIG. 18 can either be implemented using the neural network already described or it can be implemented using another neural network. In any case, the used neural network is trained to be able to identify a region having a specific shape (e.g., rectangular) that contains the object of interest that has the ROI. The respective neural network, however, does not need to be capable of separating the precise ROI from the rest of the image. It is thus less powerful in this regard as the neural network used for precisely identifying the ROI. This is because, for the neural network used in FIG. 18, the shape of the region to be separated from other regions is already defined (rectangular for example). The neural network is thus only able to properly position and scale this region, but it is not necessarily able to identify a completely unknown shaped ROI.

In accordance with the embodiment of FIG. 18, it will be assumed that the input received may be the original image. However, some preprocessing could have occurred already (color separation and the like, for example). Reference will thus only be made to "the image" although it is clear that instead of the image also one of the preprocessed images described earlier can be used.

In a first step, the image 1800 received is separated into a plurality of grid cells 1810, 1811 and 1813. The number of grid cells in each direction is not limited, but in an embodiment, the image 1800 is separated into 13 grid cells in horizontal direction and 13 grid cells in vertical direction such that instead of a general Q×R grid a 13×13 grid is created. Depending on the object from which the ROI is to be extracted, less or more grid cells can be used. In any case, the invention is not limited to the choosing of a specific number of grid cells.

In a next step, the center point 1830 of each grid cell is identified and used for establishing the origin of a coordinate system for each of the grid cells separate from any of the other grid cells. Around this center 1830, at least one bounding box 1831 and 1832 which will usually have the shape of a rectangle is arranged where those have, as can be seen in the grid cell 1813, an initial height $h_0$ and a width or breadth $b_0$. For a plurality of bounding boxes in each grid cell, those values can be different from each other. For example, initial values $h_0$ and $b_0$ can be taken for the smallest bounding box per grid cell and those values can be increased by a factor 1.5 or 2 or any other value in order to calculate the dimensions of the other bounding boxes in the respective grid cell.

It is noted that the position of a bounding box, for example the bounding box 1831 in the coordinate system of the respective grid cell will be represented by the position of the center point of the bounding box 1831 with respect to the center point 1830, i.e. the origin of the respective coordinate system, in the respective grid cell. Thus, the position of the respective bounding box in the grid cell 1811 can be represented by two coordinates x and y. The width and height of the bounding box are considered to represent geometrical characteristics of the bounding box which can be represented by two values larger than 0.

As those bonding boxes will later be used to identify the position of the ROI or to provide a corresponding part of the original image to the respective neural network for processing, it is also appropriate to associate, with each of those bounding boxes, a fifth value which is the probability of the bounding box to include the respective object that is assumed to carry the ROI.

Thus, each bounding box can be represented by a vector of dimension 5 in the form $$b = \begin{pmatrix} x\text{-position of bounding box} \\ y\text{-position of bounding box} \\ \text{width } b \text{ of bounding box} \\ \text{heigth } h \text{ of bounding box} \\ \text{probability} \end{pmatrix}.$$

This means that the grid cells together with their respective bounding boxes can be represented in the form of a tensor T having the dimensions Q×R×B×A, where A is the number of bounding boxes per grid cell. In a case for identifying fingertips, Q=R=13, B=5 (the dimension of vector b) and A can be set to an integer between 3 and 10, and may be 5.

As explained above, it is assumed that the neural network is already trained for identifying a specific object, such as a fingertip. This involves that the neural network is able to identify a specific pattern of pixels that are most likely representing a fingertip. This might refer to specific patterns of color values or other characteristics like the brightness of those spots. It is, however, clear that the image 600 may arbitrarily show a fingertip or other object with a biometric characteristic which might not correspond in size and arrangement to a fingertip that was used for training the neural network.

With the help of the bounding boxes and the grid, however, it is possible for the neural network to identify the specific bounding box that will most likely comprise the fingertip. In order to identify this specific bounding box, the neural network (or an associated component that processes the image 1800) compares the values of the pixels within each bounding box of each grid cell to a pattern of pixels that corresponds to a fingertip as was previously learned by the neural network. In this first stage, it is most unlikely that a perfect match will be found but there will be bounding boxes that are already more likely to contain at least a portion of a fingertip than other bounding boxes.

In the case depicted in FIG. 18, for example, the bounding box 1841 centered around the point M in grid cell 1813 includes a portion of the fingertip of the hand 1850. In contrast to this, none of the grid cells 1810 and 1811 comprise bounding boxes that include a portion of a fingertip. When the method continues to evaluate the pixel values within the bounding box 1841 and potentially the bounding box 1840, the process can determine that the bounding box 1841 includes even more of a pattern that corresponds to a fingertip than the bounding box 1840.

In view of this, the method can conclude that none of the bounding boxes 1831 and 1832 (and potentially other bounding boxes in other grid cells) includes a fingertip and can set their probability value in their corresponding B-vector to 0.

As both bounding boxes 1840 and 1841 as centered around the point M comprise at least a portion of a fingertip, they may be considered to be likely to in fact comprise a fingertip and the probability value will be greater than 0 in a first step.

While the smaller grid cell 1840 is almost completely filled with a pattern that could correspond to a fingertip, only the left border of the greater bounding box 1841 may be regarded by the process to include a pattern that corresponds to a fingertip.

With this, the method may continue to calculate a loss function that determines the difference between the pattern identified within each of the bounding boxes 1841 and 1840 to a pattern obtained from learning which indeed corresponds to a fingertip.

In the next step, the method will attempt to minimize this difference by modifying the size and the position of the respective bounding boxes. In this regard, it can be envisaged that the larger bounding box 1841 is used as the starting point and its position and shapes modified or the smaller bounding box 1840 is used as the starting point and its position and size are modified in order to minimize the differences to the learned pattern.

This minimizing process can firstly comprise modifying the position of the bounding box (in the following, it will be assumed that the bounding box 1841 is used for the further calculations) by moving it a small amount into orthogonal directions first along the x-axis and then along the y-axis (or vice versa) as depicted in FIG. 18 around the center point M of the respective grid cell. The movement will be along the positive and the negative x-axis and y-axis and at each position, a comparison will be made to determine a difference function between the pattern obtained from the learning and the actual pattern identified in the image. This allows for calculating a two-dimensional function that represents the difference d(x,y) depending on the coordinates.

Based on this, a gradient $\nabla_{xy}d$ can be calculated which allows for determining in which direction in the coordinate system, the bounding box has to be moved in order to increase and may maximize the match with the learned pattern (corresponding to minimizing the value of the function d(x,y)). This will be the case for $\nabla_{xy}d=0$.

This can result in the bounding box being moved along the direction r to a new center point M' where the function d(x,y) has a minimum. In a next step, the size of the respective bounding box at position M' can be increased and reduced in order to determine whether with increasing or reducing the size in one or two directions (i.e. the height and/or the width) changes the value of a further difference function compared to the original pattern which can be denoted with e(h,b) depending on the height h and width b. This function is minimized such that for a specific bounding box having a position M' and having a height $h_f$ and a width $b_f$, the difference to the learned pattern is minimized.

This bounding box will then be used as the final bounding box which has the greatest probability p of identifying those portions of the image 1800 that contain the respective fingertip or object carrying the biometric characteristic. The output vector for this bounding box will then have the form $$b = \begin{pmatrix} x \\ y \\ b_f \\ h_f \\ p \end{pmatrix}$$

As a result of this process, a tensor T with dimension Q×R×B×A can output where, for each bounding box in each grid cell, the x and y position with respect to the center of the grid cell as well as the width and the height of the respective bounding box and its probability to identify or comprise a fingertip is given.

In order to prevent the movement of bounding boxes of adjacent grid cell to be moved into the same direction such that they overlap each other and in order to prevent bounding boxes of different grid cells to move into other grid cells, the method can be provided such that the movement of the center of a bounding box is only possible within its original grid cell.

The result will thus be a tensor comprising a plurality of vectors B where one or more of those vectors have a high probability of identifying the fingertip whereas others have a low probability. Those with a low probability can be neglected completely by setting all their corresponding values to 0, thereby reducing the processing effort necessary in processing the tensor.

The vectors B with the highest probability will then be used in order to allow the further processing of the image by the neural network using the encoder and the decoder.

While the above approach allows for properly identifying the bounding box that will be used to further process the part of the image comprising the object carrying the biometric characteristic, like a fingerprint, a further explanation will be given regarding the bounding boxes that have to be discarded.

As explained above, the vector b of a bounding box comprises a probability p that indicates the likelihood that the respective bounding box includes or represents a fingertip. This can be used to sort all bounding boxes (or their vectors, respectively) in descending order beginning with those vectors b that have the highest probability value p.

Having done so, the list can be traversed in descending order beginning with the bounding box having the highest value p. This traversing can include selecting a specific bounding box with value p from the list and calculating, for this specific bounding box, the amount of intersection with all remaining bounding boxes. This means the area of the specific bounding box that is selected is compared to the area of the remaining bounding boxes and any areas they have in common (i.e. where the bounding boxes intersect) contributes to the calculated intersection.

The amount of intersection can be calculated as a ratio with respect to the area of the selected bounding box. Thereby, a dimensionless value is obtained for each calculated intersection that ranges from 0 (no intersection) to 1 (the considered remaining bounding box completely intersects or covers the area of the selected bounding box).

In a next step, a preset threshold can be used to neglect or discard bounding boxes or sort them out. In the above example, the threshold might be a calculated intersection of 0.75. For every calculated pair of a selected bounding box and a remaining bounding box for which the intersection exceeds this threshold, the bounding box having the lower value p can be neglected or sorted out from the list mentioned above.

This will finally result in only one bounding box remaining which will represent the part of the image comprising the ROI. This is, of course, not limited to a single bounding box as the invention can comprise using, for example, more than one finger and its ROI for identifying the user.

Figure 19:
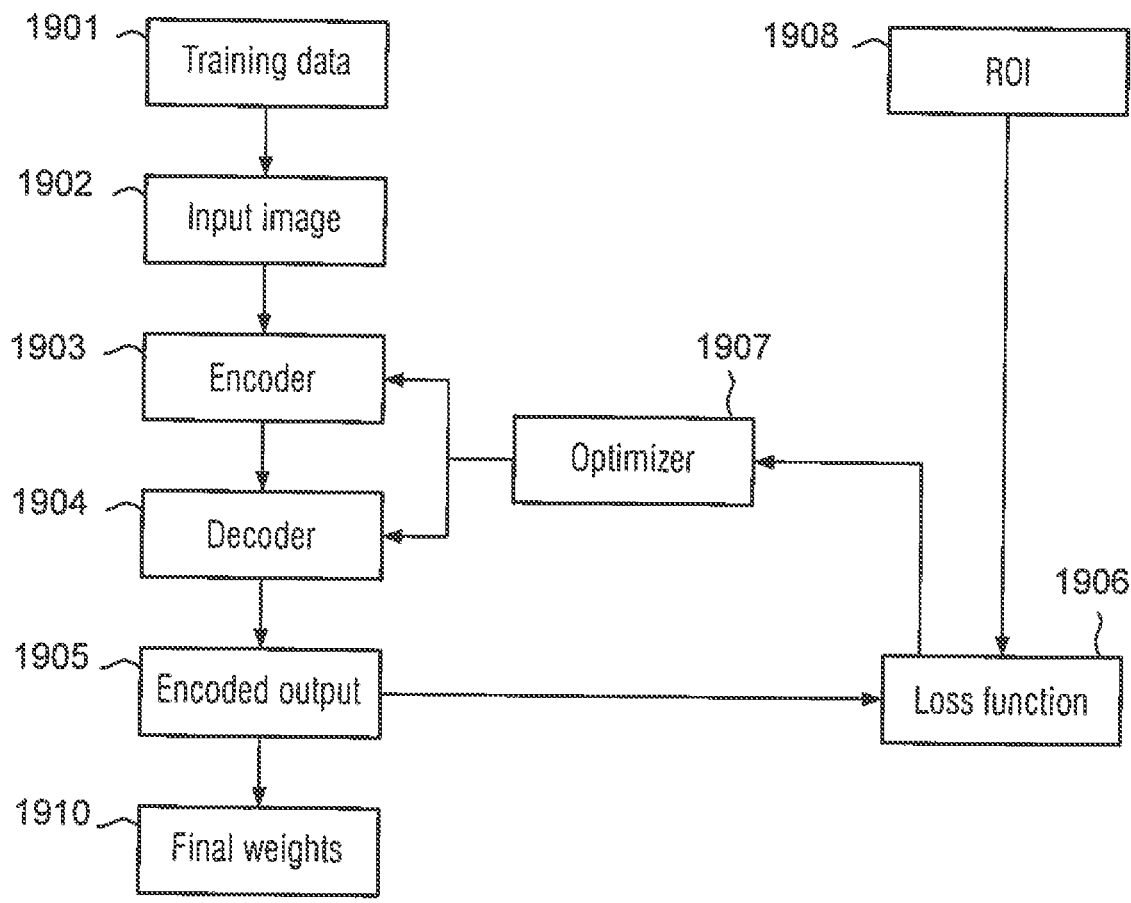
FIG. 19 presents a flowchart of the training of the neural network used in the cropping operation, according to some embodiments.

In FIG. 19, and explanation will now be given how the neural network can be properly trained such that the weights of the kernel K and the weight α of the encoder explained with respect to FIG. 16 as well as the values of the kernel K of the decoder are learned by the neural network.

While, in the following, reference will be made to training that neural network comprising the encoder and the decoder, the method can also be applied to training (that part of) the neural network that calculates the bounding boxes described in FIG. 18. This will basically only require changing the input data from preset ROIs to preset bounding boxes and corresponding values and providing the bounding boxes and corresponding values (specifically those defining the tensor T) to the respective neural network responsible for calculating the bounding boxes.

The method of FIG. 19 begins with the provision of training data 1901 and ROIs. The training data may be constituted by a plurality of images of, for example, fingertips or a plurality of fingers depicted in one image together with other objects, like those images described in relation to FIG. 13. The images may be multiplied by using, from the same image, rotated, highlighted, darkened, enlarged or otherwise modified copies that are introduced as training data. The ROIs provided according to item 1908 are ROIs corresponding to their respective image in the training data where those ROIs are the ROIs that are correctly associated with the object to be identified, i.e. have the correct size and the correct position as they would have if they were properly processed by the encoder and decoder. Such ROIs are provided for each and every image in the training data. They might be obtained by manually processing the training images. As the amount of training images can be artificially increased by providing the above mentioned modified copies, the number of images that have to be manually processed to define the ROIs for training can be reduced.

In the next step, one specific input image 1902 is provided to the neural network in a training environment where, in addition to the neural network, an optimizer 1907 and a loss function calculator 1906 are provided.

The input image is, in a first round, processed using the encoder 1903 as described in FIG. 16 and the decoder 1904 as described in FIG. 17. This means the steps or the sections 1903 and 1904 depicted in FIG. 19 are run through as described with reference to FIGS. 16 and 17 using, in the section 1903 the corresponding weights for the pointwise convolutional layer and the kernel K of the depthwise convolutional layer and in the section 1904 the respective kernel $\overline{K}$. The first and second batch normalizers as well as the rectified linear units of items 1603 and 1604 work in the manner as explained above with respect to FIG. 16. As these do not comprise trainable parameters, they will not be described in further detail below.

As a result, in line with FIG. 19, the output will be a first tensor encoded output image 1905 comprising a ROI. This result will then be provided to the loss function where it will be compared with the preset ROIs in order to identify the differences between the result 1905 and the correct ROI obtained from 1908. This difference obtained by the loss function 1906 is then provided to the optimizer 1907 which, in turn, will modify the weights of each pointwise convolutional layer and each depthwise convolutional layer, i.e. $\alpha$ and the entries in the kernel K for the encoder and the corresponding entries in the kernel $\overline{K}$ of the layers of the decoder. This means that, either for all layers in the network at once or for each layer in isolation, the weight a of the pointwise convolutional layer and the entries in the kernel K of the depthwise convolutional layer and the kernel $\overline{K}$ are manipulated.

With those new values, the cycle is repeated for the very same image and the resulting ROI is provided to the loss function and compared to the correct ROI, the result of which being then provided to the optimizer 1907 which, once again, modifies the weights.

This procedure is performed as long as the difference between the resulting decoded output image and specifically the identified ROI compared to the predefined ROI of item 1908 exceed a given threshold which, in essence, corresponds to the identification accuracy that is intended.

After that, the next input image 1902 is taken from the training data 1901 and the corresponding ROIs are provided to the loss function. Then, the process explained is repeated again for the new image and the optimal weights for the encoder and the decoder and their components are obtained. This is repeated until a specific combination of weights results in appropriate identification accuracy for all input images. The combination of weights that is then obtained is output as final weights 1910.

These final weights are then introduced into the application that executes the inventive method on the mobile device according to the description of the encoder and the decoder and, if applicable, after corresponding training of the neural network identifying the bounding boxes, also in the application of the neural network identifying the bounding box or part of the image comprising the ROI as explained in FIG. 18.

Therefore, in the concept of the present invention, the neural network that is provided to the mobile device is already fully adapted to the identification of ROIs and can thus be employed without any further learning being required which further reduces the computer resources required at the mobile devices.

In total, by using the neural network comprising the encoder and the decoder and by optionally using the separation of the original image into grid cells and identifying the corresponding bounding boxes in line with the description of FIG. 18, an application can be provided that is small in size, thus allowing for utilization on a mobile device in isolation even without any access to additional data sources via the internet or the like. This makes it suitable for application in environments where no access to wireless networks or the like is possible. Additionally, the processor power required for running this application is reduced to a minimum while still yielding appropriate identification results of the ROIs which can be used for later on performed identification of the user by the fingerprints associated with the fingertips, for example, as explained previously.

The above explanations focused on images of a hand or fingers that show the side of the fingers that carries the fingerprints. However, a user might also accidently or willingly present one or more fingers from the other side, i.e. the backhand, to the optical sensor. From such an image of a finger, a fingerprint cannot be extracted as it is not visible. The same holds, of course, also for other objects as explained. For example, instead of the palm of the hand, the user might show his backhand.

In order to distinguish an image of a fingertip that carries the fingerprint from an image of a fingertip that shows not the fingerprint but the nail or knuckles, the following procedure can be used that can extend the above explained methods to increase the identification accuracy. This can, of course, also be applied to other objects In the above examples, the bounding box was characterized by the vector $$b = \begin{pmatrix} x \\ y \\ b_f \\ h_f \\ p \end{pmatrix}$$

and the training was done using only images of fingers showing the side of the fingertips that carry the fingerprints.

When allowing images to be taken from both sides of the fingertips (i.e. the side bearing the fingerprint and the side bearing the nail or knuckles), it is advantageous to consider two classes of objects identified in images, namely those objects that constitute fingertips showing fingerprints and those objects that constitute fingertips showing nails or knuckles.

In this case, the vector mentioned above may be extended by one dimension c such that $$b = \begin{pmatrix} x \\ y \\ b_f \\ h_f \\ p \\ c \end{pmatrix}$$

where c represents a so called class. A first class may represent positive identification (a fingertip with a fingerprint can be identified) and the second class may represent a negative identification (the fingertip carries a nail or knuckle). The class may be represented by values, for example 1 for positive identification and 0 for negative identification. It is clear that, in contrast to the remaining values in the vector b, the class is a discrete value and can only take a limited number of different values corresponding to the number of classes.

The training mentioned above may then be performed in a manner that the neural network is provided with positive and negative identifications (instead of only the training data showing images with fingertips carrying fingerprints and bounding boxes 1908) in order to be able to distinguish between images belonging either to the first or to the second class. In this context, one can imagine a plurality of images of fingers that show anything but not the fingerprint. All such "objects" may be categorized in the second class (i.e. negative identification) such that the neural network is trained to distinguish images of fingertips carrying fingerprints from "any other" images of fingertips. The bounding boxes provided for training will, of course, also comprise the correct class c in order to allow for properly training the network.

In order to identify all regions containing ROIs in an image, the process described above will neglect all bounding boxes that represent the position of an object and which are considered to belong to the second class (i.e. negative identification), thereby preventing further processing of images or portions of images of objects that do not show the biometric characteristic.

It is noted that applying this teaching to the optional processing of the image to obtaining bounding boxes that include the ROI may be advantageous as the calculation of bounding boxes is easier compared to the determination of the ROI by the encoder and the decoder. However, the approach can likewise be adapted to the neural network comprising the encoder and the decoder as the processing of the image by the encoder and the decoder, after they have been trained, would lead to an encoded output image that does not comprise and ROI at all. This can then be used to establish that the image does not show an object in a way that the biometric characteristic can be extracted.

Example Mobile Device According to Some Embodiments

Figure 20:
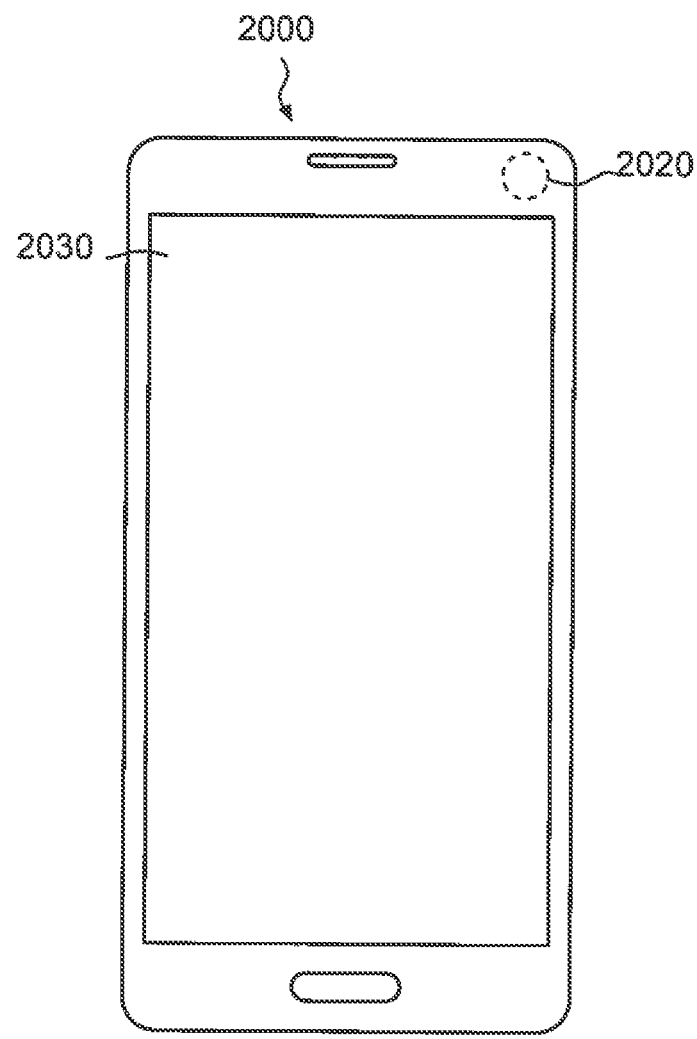
FIG. 20 shows a mobile device for obtaining an image and identifying an object within that image, according to some embodiments.

In order to give a context of a mobile computing device where the inventive method according to any of the above described embodiments with respect to FIGS. 1 to 190 can be carried out, FIG. 20 depicts a mobile device in the form of a smartphone according to one embodiment of the invention.

The mobile device 2000 is embodied as a smartphone as is presently known and widely used. It comprises an optical sensor 2020 on the backside of the camera which is opposite to the side of the mobile device 2000 on which the display 2030 is provided. The camera can be a camera having a resolution of 1 MP, 2 MP or even more, thus, for example an HD camera. While, for face recognition issues and obtaining a biometric characteristic from a face of a user, a camera with 1 MP or even less might be sufficient, a camera with 5 MP may be used in case a biometric characteristic is to be obtained from an image of a finger or fingerprint.

It can be provided with a flashlight but does not need to. A flash light or torch may be specifically advantageous in case the liveliness-detection is to be performed using a reflection pattern of light. It can also be adapted to take real-time images with a reduced resolution and once the camera is activated, the display 2030 may show a representation of what the camera actually "sees".

In one embodiment of the invention, once specific embodiments of the invention making use of bounding boxes are carried out for a taken image, the bounding boxes identifying the fingertips of the hand are augmented over the image of the hand displayed on the display 2030. As was further explained above, the identified bounding boxes do not need to be displayed but can also be processed further internal to the mobile device in order to, for example, process the portions of the image that correspond to the fingertips such that the ROIs can be extracted.

The mobile device or mobile computing device is adapted to perform the method according to FIG. 1, specifically up to the step 109 where the data comprising at least the biometric characteristic of the user is provided to the third party computing device. The third party computing device may perform further activities on the data received from the mobile computing device where the data comprises at least the biometric characteristic. For example, the third party computing device may be a third party computing device owned by the government of a country and may grant the citizens access upon correct identification by the biometric characteristic. If the third party computing device is company owned, it may grant access to company services, like streaming services, log-in services, access to bank accounts and the like.

It is noted in the context of the mobile device and also in the context of the invention in general, i.e. in view of each and every embodiment disclosed here, that the data that is provided from the mobile device to the third party computing device may be transmitted in an encrypted form. This ensures that man in the middle attacks can be prevented because a malicious attacker that somehow obtains the respective data is not able to decrypt it and use the encoded biometric characteristic.

It is to be understood that the above description is intended to be illustrative, and not restrictive. Other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for obtaining data from a single image of an object of a user that has a biometric characteristic of the user, wherein the object of the user comprises one or more of a fingerprint, a set of fingerprints, a palm, a face, an eye, or a bottom of a foot, the method comprising:
on a mobile device, performing the following operations:
obtaining, by an optical sensor of the mobile device, the single image of the object, wherein the single image contains either a spoof or a real object;
processing, in an identification operation, the single image to identify one or more of the object in the single image or a position of the object in the single image;
wherein processing the single image further comprises a liveliness-detection operation, comprising calculating at least one of:
a distance map representative of a distance of a first plurality of pixels to the optical sensor, the first plurality of pixels comprising at least a first portion of the object within the single image; or
a reflection pattern representative of light reflection associated with a second plurality of pixels comprising at least a second portion of the object within the single image;
and wherein processing the single image further comprises a comparison operation comprising comparing at least one of the calculated distance map or the calculated reflection pattern with a known distance map or a known reflection pattern to determine, based on an outcome of the comparing, that the single image contains either the spoof or the real object;
obtaining, from the single image, after the processing, data comprising at least the biometric characteristic, by performing a cropping operation comprising:
processing the single image or a part of the single image by a neural network, comprising processing the single image by an encoder to obtain an encoded image and processing the encoded image by a decoder to obtain a decoded output image, wherein the single image or the part of the single image provided to the neural network for processing comprises N×M pixels and the encoded image comprises n×m pixels, where n<N, m<M and the decoded output image comprises N×M pixels;
distinguishing a first portion of the single image or the part of the single image comprising a region of interest (ROI) from a second portion of the single image;
extracting, from the single image or the part of the single image, the ROI; and
storing the first portion comprising the ROI in a storage device on the mobile device; and
sending, to a third party computing device, the data comprising at least the biometric characteristic.

2. The method according to claim 1, wherein a second neural network is used in at least one of the identification operation, the liveliness-detection operation or the comparison operation.

3. The method according to claim 1, wherein the third party computing device is configured to process the data comprising the at least one biometric characteristic and determine, based on the processing, that the biometric characteristic identifies the user.

4. The method according to claim 1, wherein the identification operation comprises:
using a second neural network and processing the single image, in the identification operation, as input by the second neural network;
processing, by a first layer of the second neural network, the input to create a first intermediate output; and
processing, by one or more following layers of the second neural network, an output of a preceding layer, wherein the second neural network comprises a plurality of layers, each layer of the plurality of layers being a depthwise separable convolution comprising, in a processing order of the input within the layer, a depthwise convolutional layer, a first batch normalizer, a first rectified linear unit, a pointwise convolutional layer, a second batch normalizer, and a second rectified linear unit; wherein, by processing the input using the plurality of layers, the second neural network obtains, as an output, an identification of the object within the single image and a location of the object within the single image.

5. The method according to claim 1, wherein:
the liveliness-detection operation comprises using a second neural network; and
at least one of a) the distance map is calculated and compared to the known distance map or b) the reflection pattern is calculated and compared to the known reflection pattern to determine, based on the outcome of the comparing, that the single image contains either the spoof or the real object.

6. The method according to claim 1, wherein the single image is obtained by the optical sensor while using a flash associated with the optical sensor and wherein the optical sensor is a camera.

7. The method according to claim 5, wherein the second neural network comprises a plurality of layers and a last layer of the plurality of layers comprises a first node and a second node, wherein the first node provides output regarding the real object being determined during the processing and the second node provides an output regarding the spoof being determined during the processing.

8. The method according to claim 7, wherein:
each node of the first node and the second node provides an output upon processing of the single image, the output ranging from −∞ to +∞; and
the output of each node is passed to an output normalizer, wherein the output normalizer takes an output xi of each node and calculates one or more reduced values $S(x_i)$ by $$S(x) = \frac{e^x}{1+e^x}$$

where i=1 for the first node and i=2 for the second node, and provides the one or more reduced values $S(x_i)$ to a normalization function $$\sigma(S(x_j)) = \frac{e^{S(x_j)}}{\sum_i e^{S(x_i)}}$$

to obtain normalized values $\sigma(S(x_1)) \equiv \sigma_1$ and $\sigma(S(x_2)) \equiv \sigma_2$.

9. The method according to claim 8, wherein, if $\sigma_1 > 0.5$, it is determined that the single image contains the real object and, if $\sigma_2 > 0.5$, it is determined that the single image contains the spoof.

10. The method according to claim 1, wherein sending, to the third party computing device, the data comprising at least the biometric characteristic comprises sending the first portion of the single image comprising the ROI to the third party computing device.

11. The method according to claim 1, wherein distinguishing the first portion of the single image or the part of the single image comprises distinguishing a first portion of the decoded output image from a second portion of the decoded output image.

12. The method according to claim 11, wherein extracting the ROI comprises:
identifying one or more pixels in the decoded output image that are within the first portion of the decoded output image; and
identifying the one or more pixels in the decoded output image that are within the first portion of the decoded output image with corresponding one or more pixels in the single image or the part of the single image and extracting, from the single image or the part of the single image, the corresponding one or more pixels, the extracted corresponding one or more pixels comprising the first portion of the single image or the part of the single image comprising the biometric characteristic.

13. The method according to claim 11, wherein each pixel of the decoded output image has a value $x \in ]-\infty; +\infty[$ and, before the distinguishing of the first portion of the decoded image, an activation function $$S(x) = \frac{1}{1 + e^{-x}}$$

is applied to each pixel of the one or more pixels in the decoded image and a normalized value $\bar{x} = S(x)$ is associated with each pixel of the one or more pixels in the decoded image, wherein the distinguishing is performed on one or more pixels with the values $\bar{x}$.

14. The method according to claim 1, wherein the data comprising at least the biometric characteristic is encrypted on the mobile device to obtain encrypted data and the encrypted data is sent to the third party computing device.

15. A mobile device comprising a processor, a storage device, data transmission means and an optical sensor, wherein the mobile device is adapted to:
obtain, by the optical sensor, a single image of an object, wherein the single image contains either a spoof or a real object;
process, in an identification operation, the single image to identify one or more of the object in the single image or a position of the object in the single image;
wherein processing the single image further comprises a liveness-detection operation, comprising calculating at least one of:
a distance map representative of a distance of a first plurality of pixels to the optical sensor, the first plurality of pixels comprising at least a first portion of the object within the single image;
a reflection pattern representative of light reflection associated with a plurality of second pixels comprising at least a second portion of the object within the single image;
and wherein processing the single image further comprises a comparison operation comprising comparing at least one of the calculated distance map or the calculated reflection pattern with a known distance map or a known reflection pattern to determine, based on an outcome of the comparing, that the single image contains either the spoof or the real object;
obtain, from the single image, after the processing, data comprising at least a biometric characteristic of a user, the biometric characteristic comprising at least one of a fingerprint, a set of fingerprints, a palm, a face, an eye, or a bottom of a foot, wherein obtaining the biometric characteristic of the user comprises a cropping operation comprising:
processing the single image or a part of the single image by a neural network, comprising processing the single image by an encoder to obtain an encoded image and processing the encoded image by a decoder to obtain a decoded output image, wherein the single image or the part of the single image provided to the neural network for processing comprises N×M pixels and the encoded image comprises n×m pixels, where n<N, m<M and the decoded output image comprises N×M pixels;
distinguishing a first portion of the single image or the part of the single image comprising a region of interest (ROI) from a second portion of the single image;
extracting, from the single image or the part of the single image, the ROI; and
storing the first portion comprising the ROI in the storage device on the mobile device; and
send, to a third party computing device, data comprising at least the biometric characteristic.

16. The mobile device according to claim 15, wherein a second neural network is used in at least one of the identification operation, the liveness-detection operation or the comparison operation.

17. The method according to claim 1, further comprising:
storing, in the storage device, the data comprising at least the biometric characteristic.

* * * * *